United States Patent
Oshino et al.

(10) Patent No.: US 6,628,820 B2
(45) Date of Patent: Sep. 30, 2003

(54) IMAGE FORMING METHOD AND APPARATUS

(75) Inventors: Takahiro Oshino, Yokohama (JP);
Hideyuki Tamura, Yokohama (JP);
Akihiro Katayama, Yokosuka (JP);
Hiroyuki Yamamoto, Chigasaki (JP);
Koichiro Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/866,669

(22) Filed: May 30, 2001

(65) Prior Publication Data
US 2001/0043739 A1 Nov. 22, 2001

Related U.S. Application Data

(62) Division of application No. 08/838,177, filed on Apr. 16, 1997, now Pat. No. 6,263,100, which is a continuation of application No. 08/426,192, filed on Apr. 21, 1995, now abandoned.

(30) Foreign Application Priority Data

Apr. 22, 1994 (JP) .............................. 6-107853
Apr. 22, 1994 (JP) .............................. 6-107854
Apr. 22, 1994 (JP) .............................. 6-107855

(51) Int. Cl.$^7$ ........................... G06K 9/00; G06K 9/32; H04N 1/387
(52) U.S. Cl. ...................... 382/154; 358/450; 382/300
(58) Field of Search .......................... 382/154, 276, 382/293, 294, 300, 275; 348/42, 46, 47, 48; 358/450, 909.1; 345/629

(56) References Cited

U.S. PATENT DOCUMENTS

| | | | | |
|---|---|---|---|---|
| 4,825,393 A | | 4/1989 | Nishiya ........................ 364/560 |
| 5,140,647 A | * | 8/1992 | Ise et al. .................. 250/578.1 |
| 5,424,773 A | | 6/1995 | Saito .......................... 348/218 |
| 5,455,689 A | * | 10/1995 | Taylor et al. ............... 358/428 |
| 5,473,441 A | | 12/1995 | Inuiya et al. ............... 358/312 |
| 5,655,033 A | * | 8/1997 | Inoguchi et al. ............ 382/276 |
| 5,703,961 A | | 12/1997 | Rogina et al. .............. 382/154 |
| 5,764,236 A | * | 6/1998 | Tanaka et al. .............. 345/606 |
| 5,764,871 A | | 6/1998 | Fogel ........................ 395/127 |
| 6,191,808 B1 | * | 2/2001 | Katayama et al. ............ 348/39 |
| 6,215,899 B1 | * | 4/2001 | Morimura et al. ............ 348/47 |

FOREIGN PATENT DOCUMENTS

GB  2244621 A  12/1991  ........... G01C/11/00

OTHER PUBLICATIONS

"An In–Betweening Method of Gray–Valued Images Using Density Contour Lines", E.A. Agui, Systems & Computers in Japan, vol. 17, No. 2, Feb. 1986, New York, US, pp. 89–96.

* cited by examiner

*Primary Examiner*—Amelia M. Au
*Assistant Examiner*—Martin Miller
(74) *Attorney, Agent, or Firm*—Fitzpatrick, Cella, Harper & Scinto

(57) ABSTRACT

Upon observation of multi-viewpoint images, even when the viewpoint moves continuously, the image cannot normally be displayed in correspondence with the continuous movement of the viewpoint, and an image from a viewpoint closest to the current viewpoint is displayed. To prevent this, each two adjacent images of the multi-viewpoint images are interpolated by detecting corresponding pixels and generating an interpolated image in accordance with the correspondences among pixels. The interpolated image is generated in such a manner that an epipolar plane image is generated by juxtaposing corresponding lines of the multi-viewpoint image, straight lines are detected from the epipolar plane image, and the intersecting points between interpolated lines and the detected straight lines are detected as interpolated pixels. In this case, as for a point for which a straight line cannot be detected, a straight line passing the point is estimated, thereby generating an interpolated pixel. When a plurality of straight lines are detected for a pixel of interest, the priority level is assigned to the pixel of interest in correspondence with the number of detected straight lines. When the priority level is smaller than that of another pixel through which the detected straight line passes, the straight line is ignored, and an interpolated pixel is not generated.

13 Claims, 45 Drawing Sheets

FIG. 6 j-TH EPI

| | 1 | 2 | 3 | 4 | 5 | 6 | 7 | 8 | 9 | 10 | 11 | 12 | 13 | ... | nx |
|---|---|---|---|---|---|---|---|---|---|---|---|---|---|---|---|
| 1 | | | | | a1 | | | | | | | | | ... | |
| 2 | | | | | a1 | c2 | | | b1 | | | b1 | | ... | |
| 3 | | | | a1 | c2 | b1 | | | | | | | | ... | |
| 4 | | | b1 | a1 | c2 | | | | | | | | | ... | |

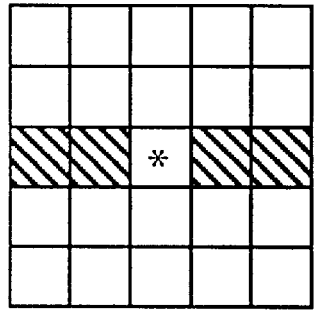
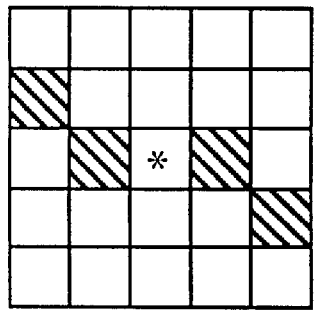
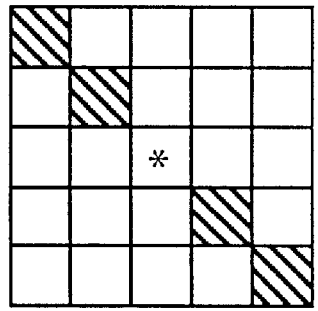
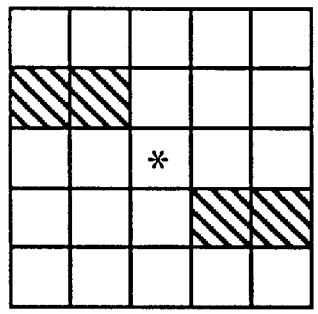
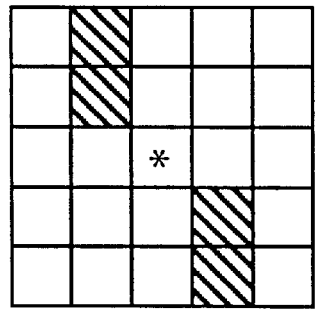

j-TH EPIPOLAR PLANE

EPj(x,2)

FIG. 41 j-TH EPIPOLAR PLANE

| | 1 | 2 | 3 | 4 | 5 | 6 | 7 | 8 | 9 | 10 | ... | nx |
|---|---|---|---|---|---|---|---|---|---|---|---|---|
| 10 | | | | | | | | c2 | a | a1 | ... | |
| 9 | | | | | | | c | c | a | | ... | |
| 8 | | | | | | a | c | a1 | | | ... | |
| 7 | | | | | a | c | a1 | | | | ... | |
| 6 | | | | b | a | c2 | c | | | | ... | |
| 5 | b2 | b | | | a | | | c | c2 | | ... | |
| 4 | | b | b2 | b | a1 | | | | | | ... | |
| 3 | | | b | b2 | a | | | | | | ... | |
| 2 | | | | | | | | | a | b2 | ... | |
| 1 | | | | | | | | | | a1 | ... | |

↑ INTERPOLATED RASTER j-2
↑ INTERPOLATED RASTER j-3
↑ INTERPOLATED RASTER j-5
↑ INTERPOLATED RASTER j-6
↑ INTERPOLATED RASTER j-8
↑ INTERPOLATED RASTER j-9

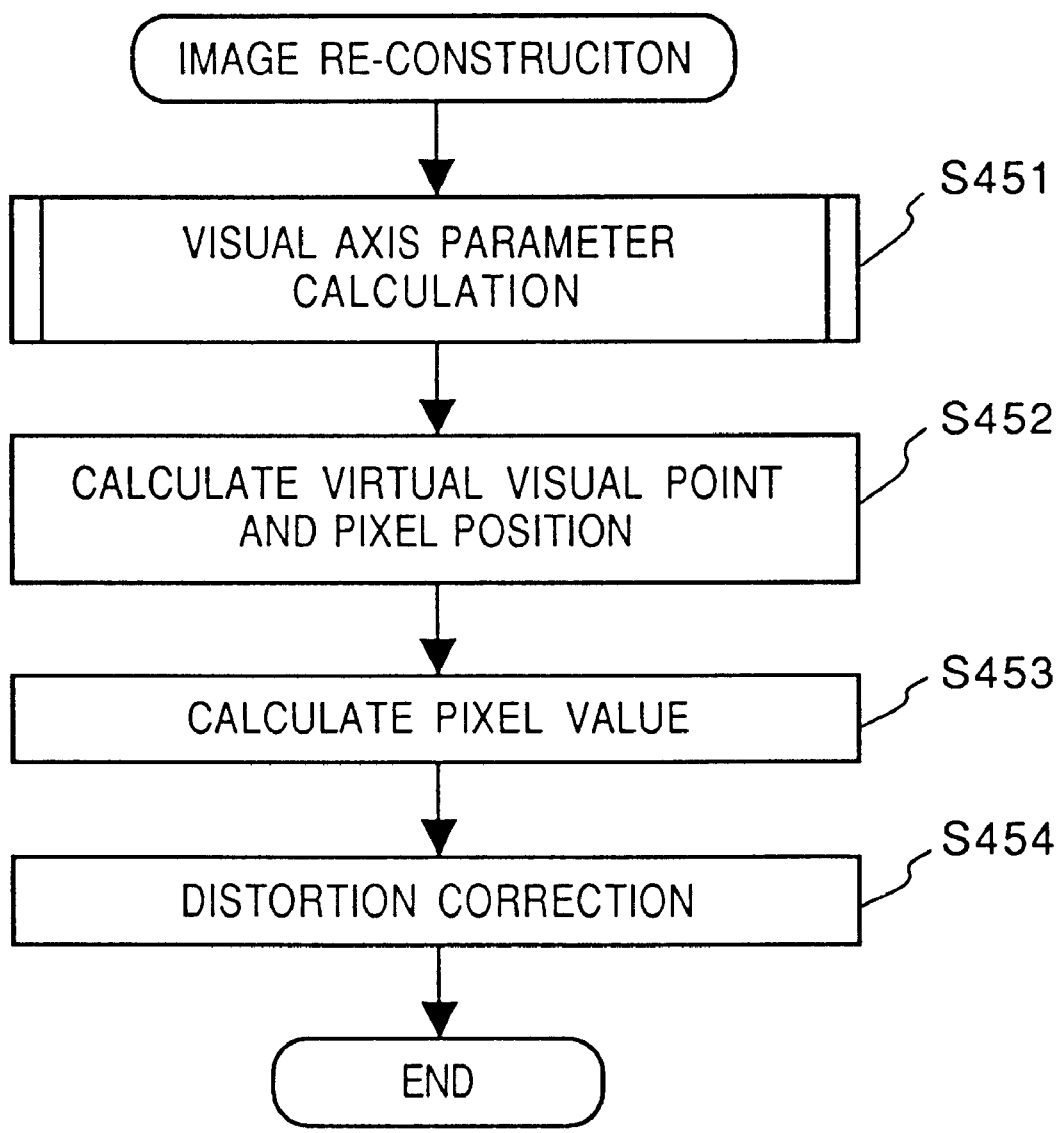

IMAGE FORMING METHOD AND APPARATUS

This application is a divisional of application Ser. No. 08/838,177 filed Apr. 16, 1997 now U.S. Pat. No. 6,263,100, which is a continuation of application Ser. No. 08/426,192 filed Apr. 21, 1995 now abandoned.

BACKGROUND OF THE INVENTION

The present invention relates to an image processing method and apparatus for generating an image from the viewpoint of an observer on the basis of images obtained from a plurality of viewpoints.

Conventionally, as an apparatus for stereoscopically displaying images viewed from a plurality of viewpoints, a stereoscopic display, a lenticular display, and the like are known. The stereoscopic display displays images which are obtained from two cameras, and which are alternately switched at a high speed. An observer can stereoscopically observe the displayed image using shutter glasses which is synchronized with the switching operation of the images or polarization glasses. In the lenticular display, images from, e.g., four cameras are re-arranged in units of pixels, and by adhering a lenticular sheet to the front surface, an image from four viewpoints can be stereoscopically expressed.

However, with the above-mentioned conventional stereoscopic display, only a stereoscopic image in the photographing directions of the cameras upon photographing of an image can be observed. More specifically, since the two cameras are fixed in position to photograph an object, an observer observes only an identical image even when he or she moves his or her viewpoint (the position of the eyes), and viewpoint movement on the observer side is not reflected in a displayed image, resulting in an unnatural image. On the other hand, the lenticular display can cope with movement of the viewpoint of the observer in the right-and-left direction, but cannot cope with continuous viewpoint movement since it allows only sequential observation of discrete images from the cameras. In addition, in the lenticular display, the viewpoint cannot be moved in the back-and-forth direction, i.e., a direction along the line of sight. A viewpoint movement in the back-and-forth direction is realized only when a stereoscopic view is achieved based on images generated by computer graphics. However, such images generated by computer graphics are special ones since they are simple and the coordinate values, in a corresponding three-dimensional space, of all the points in the images are known. For this reason, the possibility of a viewpoint movement in the back-and-forth direction has not been examined so far when images photographed by the cameras are to be stereoscopically observed.

SUMMARY OF THE INVENTION

The present invention has been made in consideration of the above-mentioned prior art, and has at its object to provide an image display apparatus and method, which can display an image from a desired viewpoint such as an image from a viewpoint which continuously moves upon movement of an observer.

It is another object of the present invention to provide an image display apparatus which generates and displays an image having the sharpness of an original image when an image is displayed from a desired viewpoint on the basis of multi-viewpoint images.

It is still another object of the present invention to provide an image display apparatus and method, which can display an image in correspondence with the position of a viewpoint even when the viewpoint moves in a direction along a line of sight which is used for generating the displayed image.

In order to achieve the above objects, an image processing method of the present invention comprises the following arrangement.

An image processing method comprises:
- the detection step of detecting correspondences among pixels between each two adjacent images of multi-viewpoint images;
- the first generation step of generating pixels constituting interpolated images on the basis of the detected correspondences; and
- the construction step of constructing the interpolated image on the basis of the pixels generated in the first generation step.

Alternatively, an image processing method for processing multi-viewpoint images, comprises:
- the viewpoint detection step of detecting a position of a viewpoint;
- the generation step of generating, on the basis of the multi-viewpoint images, an image which has, as a virtual viewpoint, an intersecting point between a line of sight from the viewpoint detected in the viewpoint detection step and a viewpoint array corresponding to the multi-viewpoint images; and
- the correction step of correcting a distortion of an image caused by a deviation between the viewpoint detected in the viewpoint detection step and the virtual viewpoint on the basis of an amount of the deviation.

Alternatively, an image processing method comprises:
- the detection step of detecting correspondences among pixels between each two adjacent images of multi-viewpoint images;
- the first generation step of generating pixels constituting an interpolated image on the basis of the detected correspondences;
- the estimation step of estimating correspondences among non-processed pixels, from which correspondences cannot be detected in the detection step, between each two adjacent images of the multi-viewpoint images;
- the second generation step of further generating pixels constituting the interpolated image on the basis of the correspondences estimated in the estimation step; and
- the construction step of constructing the interpolated image on the basis of the pixels generated in the first generation step.

Alternatively, an image processing method comprises:
- the detection step of detecting correspondences among pixels between each two adjacent images of multi-viewpoint images;
- the generation step of generating pixels constituting an interpolated image on the basis of the detected correspondences; and
- the construction step of constructing the interpolated image on the basis of the pixels generated in the generation step,
- wherein the detection step includes the step of ignoring a correspondence between a pixel of interest and a corresponding pixel when the corresponding pixel which has the correspondence with the pixel of interest also has a correspondence with another pixel, and the number of correspondences for the pixel of interest is larger than the number of correspondences for the corresponding pixel.

An image processing apparatus of the present invention comprises the following arrangement.

An image processing apparatus comprises:

detection means for detecting correspondences among pixels between each two adjacent images of multi-viewpoint images;

first generation means for generating pixels constituting an interpolated images on the basis of the detected correspondences; and construction means for constructing the interpolated image on the basis of the pixels generated by the first generation means.

Alternatively, an image processing apparatus for processing multi-viewpoint images, comprises:

viewpoint detection means for detecting a position of a viewpoint;

generation means for generating, on the basis of the multi-viewpoint images, an image which has, as a virtual viewpoint, an intersecting point between a line of sight from the viewpoint detected by the viewpoint detection means and a viewpoint array corresponding to the multi-viewpoint images; and correction means for correcting a distortion of an image caused by a deviation between the viewpoint detected by the viewpoint detection means and the virtual viewpoint on the basis of an amount of the deviation.

Alternatively, an image processing apparatus comprises:

detection means for detecting correspondences among pixels between each two adjacent images of multi-viewpoint images;

first generation means for generating pixels constituting an interpolated image on the basis of the detected correspondences;

estimation means for estimating correspondences among non-processed pixels, from which correspondences cannot be detected by the detection means, between each two adjacent images of the multi-viewpoint images;

second generation means for further generating pixels constituting the interpolated image on the basis of the correspondences estimated by the estimation means; and construction means for constructing the interpolated image on the basis of the pixels generated by the first generation means.

Alternatively, an image processing apparatus comprises:

detection means for detecting correspondences among pixels between each two adjacent images of multi-viewpoint images;

generation means for generating pixels constituting an interpolated image on the basis of the detected correspondences; and construction means for constructing the interpolated image on the basis of the pixels generated by the generation means, wherein the detection means ignores a correspondence between a pixel of interest and a corresponding pixel when the corresponding pixel which has the correspondence with the pixel of interest also has a correspondence with another pixel, and the number of correspondences for the pixel of interest is larger than the number of correspondences for the corresponding pixel.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view showing an example of detected corresponding points;

FIGS. 11A to 11E are views for explaining the estimation of unknown pixel values;

FIG. 41 is a view for explaining the interpolation processing algorithm by the corresponding point searching processing by the image processing apparatus of the sixth embodiment;

FIG. 45 is a flow chart showing image re-construction processing of the sixth embodiment.

DETAILED DESCRIPTION OF THE PREFERRED EMBODIMENTS

[First Embodiment]

The first embodiment of the present invention will be described below with reference to the accompanying drawings.

<Arrangement of Apparatus>

Figure 1:
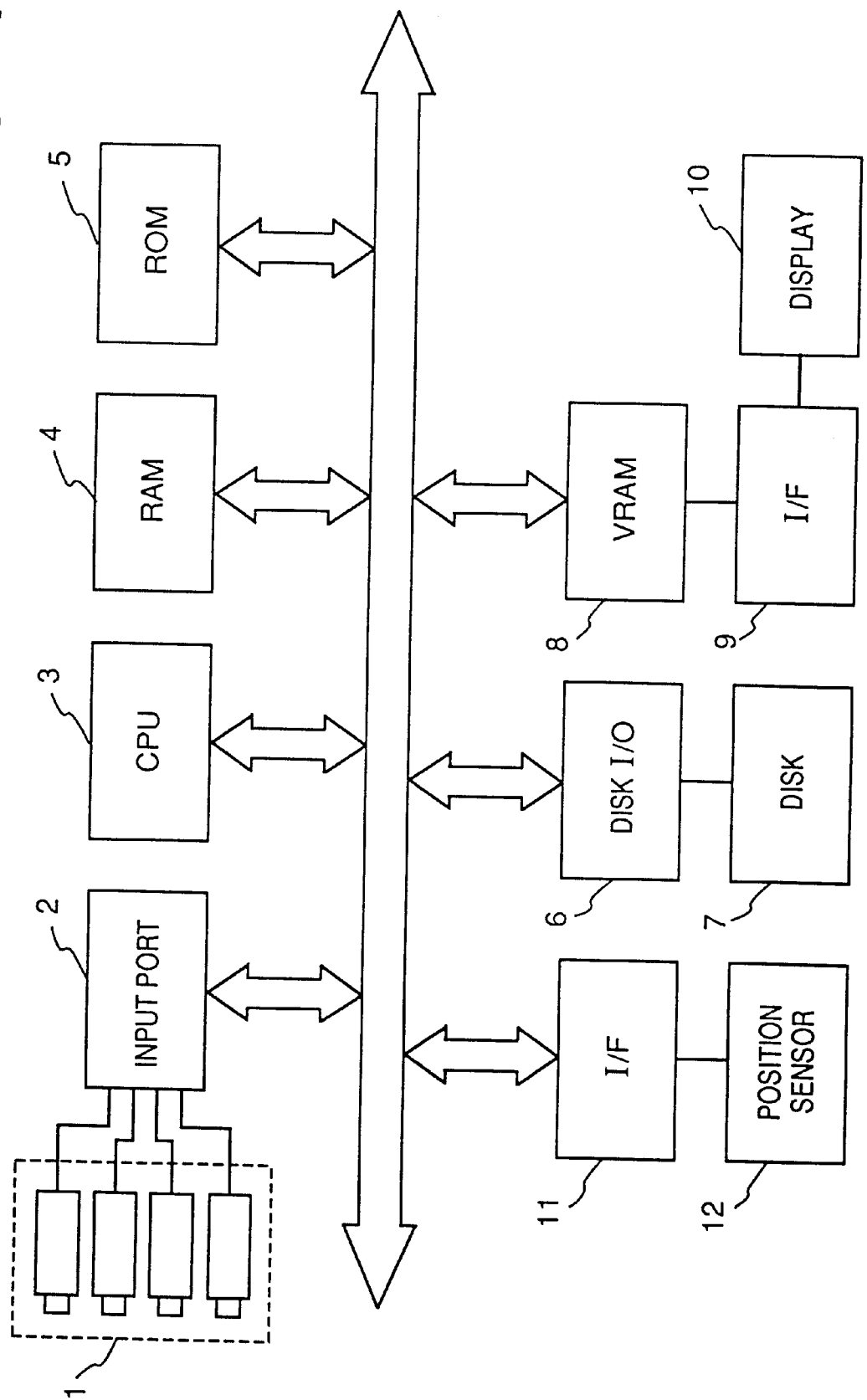
FIG. 1 is a block diagram of an image processing apparatus according to the first embodiment of the present invention.

FIG. 1 exemplifies an image processing apparatus which uses four cameras in an image input unit. Referring to FIG. 1, an image input unit 1 includes four cameras, and inputs photographed images to the apparatus via an input port 2 as digital image signals. A CPU 3 is a processor for controlling the entire image processing apparatus, and executes predetermined control sequences by executing programs stored in a ROM 5 or a RAM 4. The RAM 4 and the ROM 5 also store data in addition to the programs. Furthermore, the RAM 4 stores digital image data input from the image input unit 1. A hard disk 7 exchanges data with the CPU 3, the RAM 4, and the like via a disk I/O port 6. Image data are also stored in the disk 7. Photographed image data or processed image data are developed in a VRAM 8, and are displayed on a stereoscopic display 10 via a video signal output I/F 9. A position sensor 12 detects the position of the viewpoint of an observer, and inputs detected information to the CPU 3 via a position sensor connection I/F 9. In this embodiment, the four cameras are used. However, the present invention is not limited to the four cameras.

<Generation of Interpolated Image>

Figure 2:
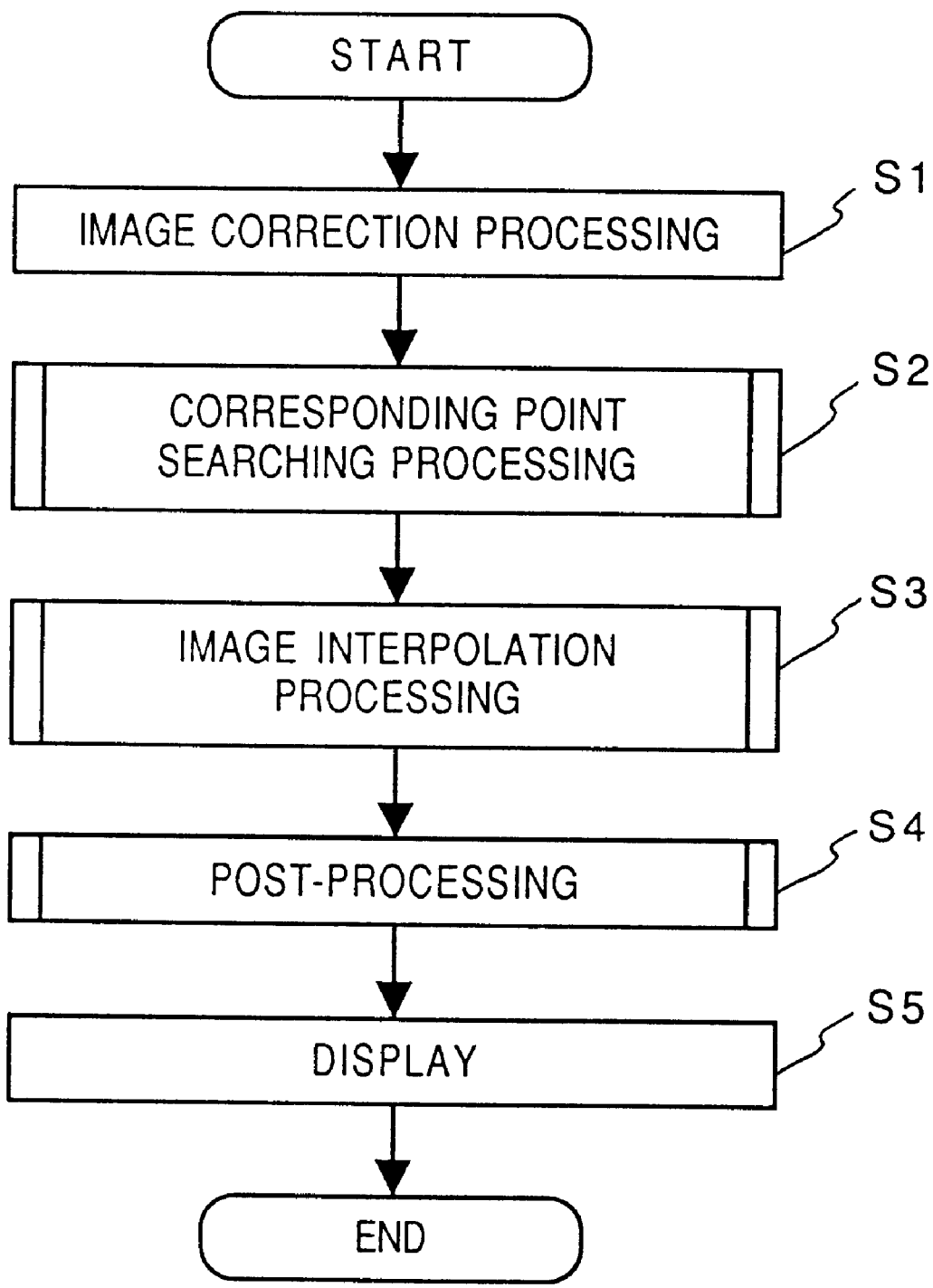
FIG. 2 is a flow chart showing processing for generating and displaying an interpolated image.

FIG. 2 is a flow chart showing the control flow of processing for generating an interpolated image by the CPU 3 of this embodiment.

Original images input from the image input unit 1 such as cameras are stored in the RAM 4 as digital image data.

In step S1, geometric correction processing of, e.g., the chromatic aberration and distortion of lenses, the deviation of the optical axis, the postures and positions of the cameras, and the like, and correction processing of any sensitivity nonuniformity of CCD sensors, and the like are executed. These correction processing operations are performed at high speed by a table look-up operation if correction data are recorded in advance in the ROM 5 or the RAM 4 as calibration data. On the other hand, if correction data are obtained each time before images are input, correction is more accurately achieved.

Upon completion of these correction processing operations, the flow advances to step S2 to perform corresponding point searching (motion vector detection) processing among images.

Upon completion of the corresponding point searching processing, the flow advances to step S3 to perform interpolation processing of images.

The flow then advances to step S4 to estimate pixel values which could not be obtained in the interpolation processing.

After all pixel values are determined, the flow advances to step S5. In step S5, an image viewed from the viewpoint position is selected from the input images or interpolated images on the basis of information from the viewpoint position sensor, and the selected image is displayed on the stereoscopic display. An observer observes the image with glasses and the like, which match the system of the stereoscopic display.

<Corresponding Point Searching Processing>

Figure 3:
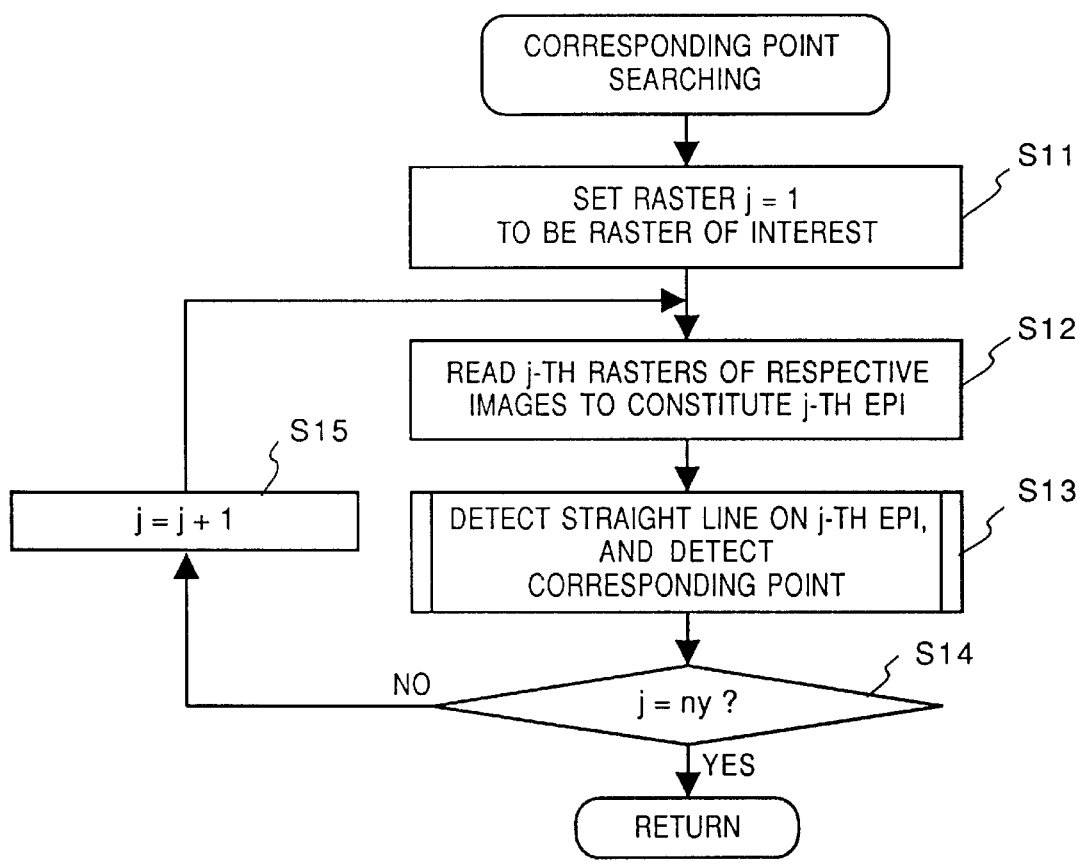
FIG. 3 is a flow chart showing corresponding point searching processing.

FIG. 3 is a flow chart of the corresponding point searching processing in step S2. In step S11, the first raster of each image is initially set to be the raster of interest. Note that the raster of interest is represented by a raster j of interest (where j is the ordinal number of the raster of interest).

Figure 4:
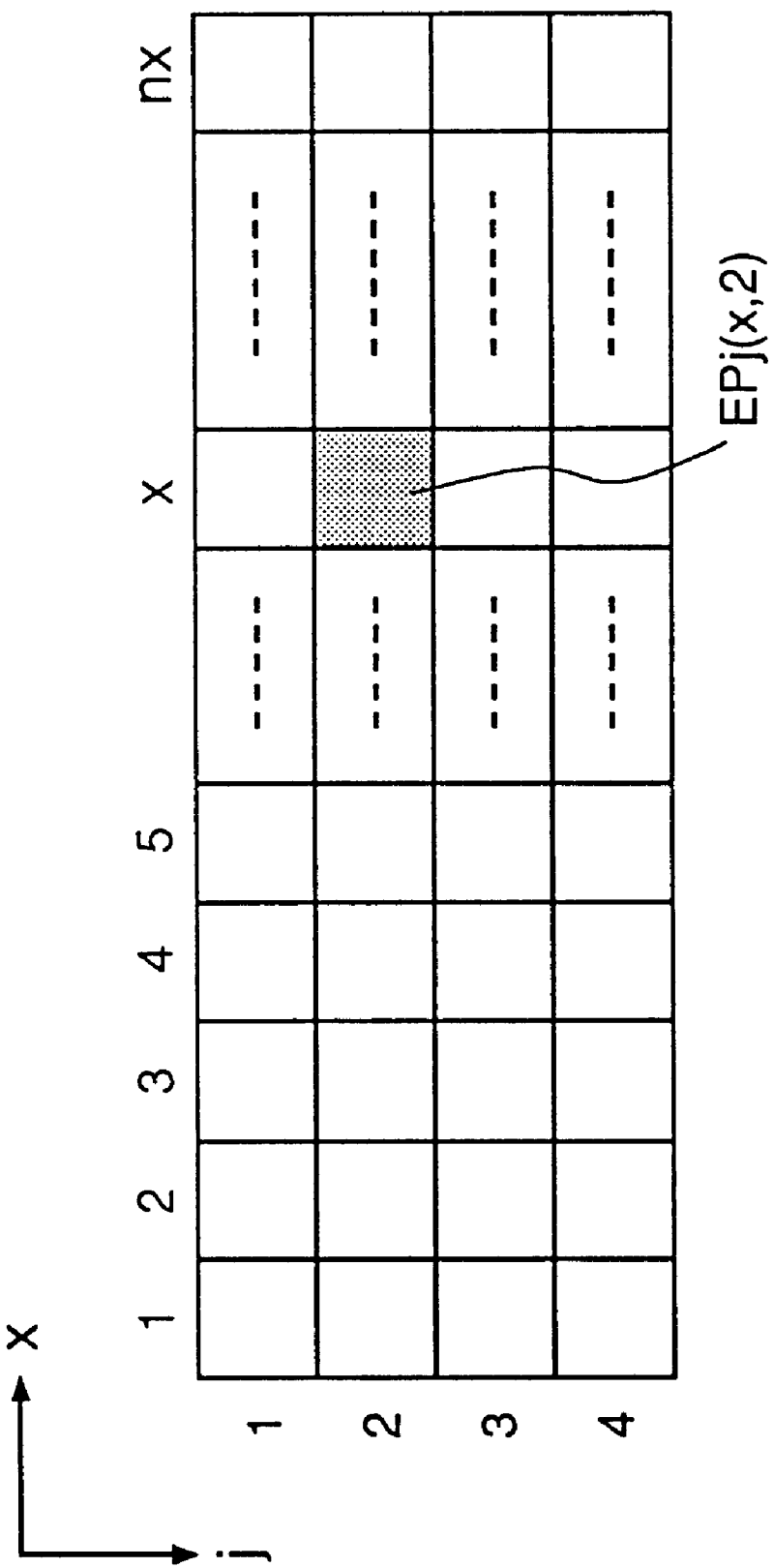
FIG. 4 is a view for explaining an EPI.

In step S12, rasters j of interest of the respective images are read out to work memory to virtually constitute a j-th epipolar plane image (EPI). The j-th epipolar plane image is a set of points $Ep_j(x,i)$ on an image plane, as shown in FIG. 4, which satisfy:

$$EP_j(x,i)=N_i(x,j)$$

where $N_i(x,j)$ represents an x-th pixel value on a j-th line of an i-th image (i=1 to 4 in this embodiment), i.e., the value of a pixel whose coordinates are expressed by (x,j) in the i-th image.

More specifically, an image constituted by juxtaposing identical lines extracted from multi-viewpoint images in turn is called an epipolar plane image.

When input devices (cameras) are set parallel to each other at equal intervals, all the corresponding points on the epipolar plane image align on straight lines. Therefore, corresponding points can be detected by detecting straight lines, and images can be interpolated on the detected straight lines.

In step S13, straight lines on which corresponding points are present are extracted, and the corresponding points are calculated from the extracted straight lines. The calculated points are stored. The detailed straight line detection algorithm is described below with reference to the flow chart in FIG. 5.

<Straight Line Detection Processing>

In step S21, a priority level n=1 is set, and a raster r=1 is set as the raster of interest. The flow advances to step S22. In step S22, the pixel of interest is represented by EPj(x,r), and all "m"s which satisfy the following formula within a range of m=k1 to k1+k2 and x=1 to nx are calculated:

$$Ej(x, r) = \sum_{i=r+1}^{N} \{EPj(x + m \times (i - r), i) - EPj(x, r)\}^2 < TH2 \quad (1)$$

Formula (1) calculates pixels which are present on a straight line having the pixels of interest as on a straight line having the pixel of interest as an end point and an inclination m, and in each of which the square of error from the pixel of interest is smaller than TH2. In this case, since m may assume real number values, corresponding x-coordinates are determined by rounding values x+m x (i-r). TH2 is a threshold value for finding the corresponding points, and is set to be 1200 in this embodiment. The value "1200" has the following meaning. That is, since N=4 due to the 4-line EPI, the difference in formula (1) is calculated three times, and under the assumption that each difference value corresponds to substantially the same color if it is equal to or smaller than about 20, $3 \times 20^2 = 1200$ is set. If the input system is an ideal one, and no specular components are present in images (corresponding points of respective images have the same pixel values), TH2=0 may be set. However, in a practical input system, corresponding points of respective images suffer variations in pixel values. Therefore, the difference value is set to be 20 to provide a given margin. For this reason, as the accuracy of the input system increases, the difference value becomes small. Conversely, if the input system has lower accuracy, a larger difference value must be set.

The above-mentioned technique is performed for each of R, G, and B pixel values. In addition, the above-mentioned technique can be applied when images are converted to various other calorimetric systems such as YIQ, HSI, and the like, and threshold values suitable therefor can be set and used. k1 is a value determined by the input system. When images are photographed by cameras which are arranged parallel to each other at equal intervals, k1=0. k2 is a value determined by the camera interval and the distance to an object, and k2=20 is set (i.e., assume that a movement exceeding 20 pixels is not made). nx is the number of pixels, in the main scanning direction, of an image, and N is the number of cameras.

If EPj(x+m×(i-r), i) is not present, it is determined that no corresponding point for this m is present, and the processing is continued. If EPj(x+m×(i-r), i) has already been processed in step S22, EPj(x+m×(i-r), i)−EPj(x,r)=0 is set, and the processing is continued.

The flow advances to step S23. In step S23, a corresponding point of the priority level n is calculated from the straight line of the inclination m calculated in step S22, and is stored in the memory. If a plurality of corresponding points are obtained, all the points are stored as corresponding points of the priority level n for the sake of simplicity. Pixels calculated as the corresponding points are set to be processed pixels. If the corresponding point calculated based on the straight line of the inclination m in step S23 has already been processed, this point is excluded from the corresponding points. Furthermore, the number of non-processed pixels is set in w.

Figure 5:
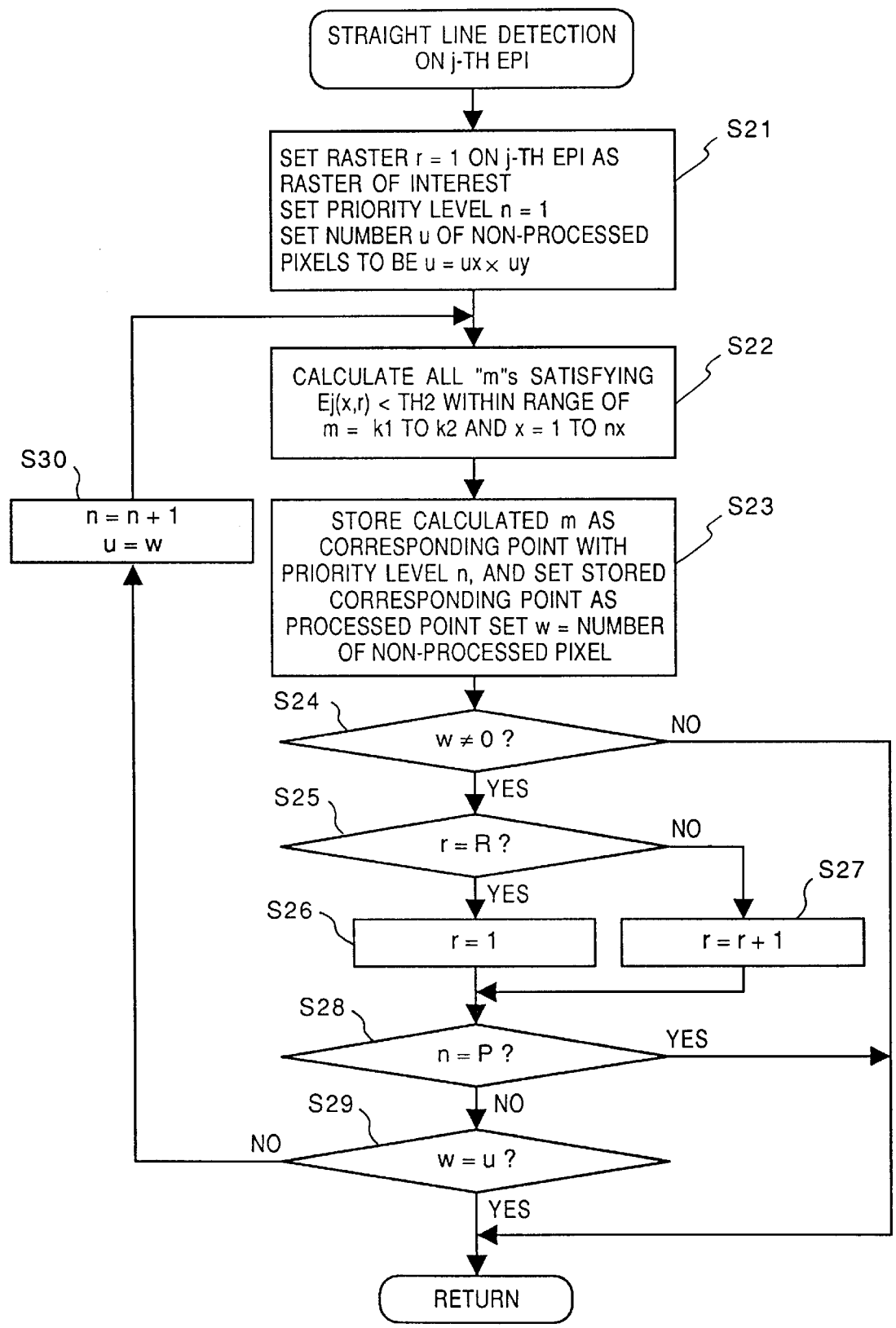
FIG. 5 is a flow chart showing straight line detection processing on the EPI.

The flow then advances to step S24 to check if the number w of non-processed pixels is 0. If w=0, the processing ends, and the flow returns to step S14. If w≠0, the flow advances to step S25 to check if the raster r of interest is the final raster. If the raster of interest is the final raster, r=1 (first raster) is set in step S26; otherwise, the value of the raster of interest is incremented by one in step S27. R in FIG. 5 represents the number of constituting rasters (in this embodiment, R=4).

The flow then advances to step S28 to check if n representing the priority level is equal to P. Note that P represents the complexity of a phenomenon in which objects conceal each other (occlusion). More specifically, if P is large, it represents a state wherein a large number of objects overlap each other; if P is small, the overlapping state of objects is small. The value P is set depending on the degree of occlusion to be reproduced. In this embodiment, P=(R−1)× 10, i.e., P=30 is set as an empirical value.

If n≠P in step S28, the flow advances to step S29. In step S29, it is checked if the number of non-processed pixels is smaller than that in the previous processing. If the number of non-processed pixels is smaller than that in the previous processing, the flow advances to step S30; otherwise, the straight line detection processing of the j-th EPI ends, and the flow returns to step S14. If n P, the flow returns to step S14.

When the processing is performed with the above-mentioned algorithm, corresponding points, which cannot be obtained from two images, can be obtained, and occlusion can also be dealt with, thus improving the accuracy of corresponding point searching processing.

In step S14, it is checked if processing is performed for all the rasters of input images. If NO in step S14, the value j is incremented by one in step S15, and the flow returns to step S12; otherwise, the flow advances to step S3. Note that ny is the total number of rasters of input images.

In step S3, image interpolation processing is performed. The image interpolation processing is performed using the corresponding points calculated in step S2.

<Image Interpolation Processing>

Figure 7:
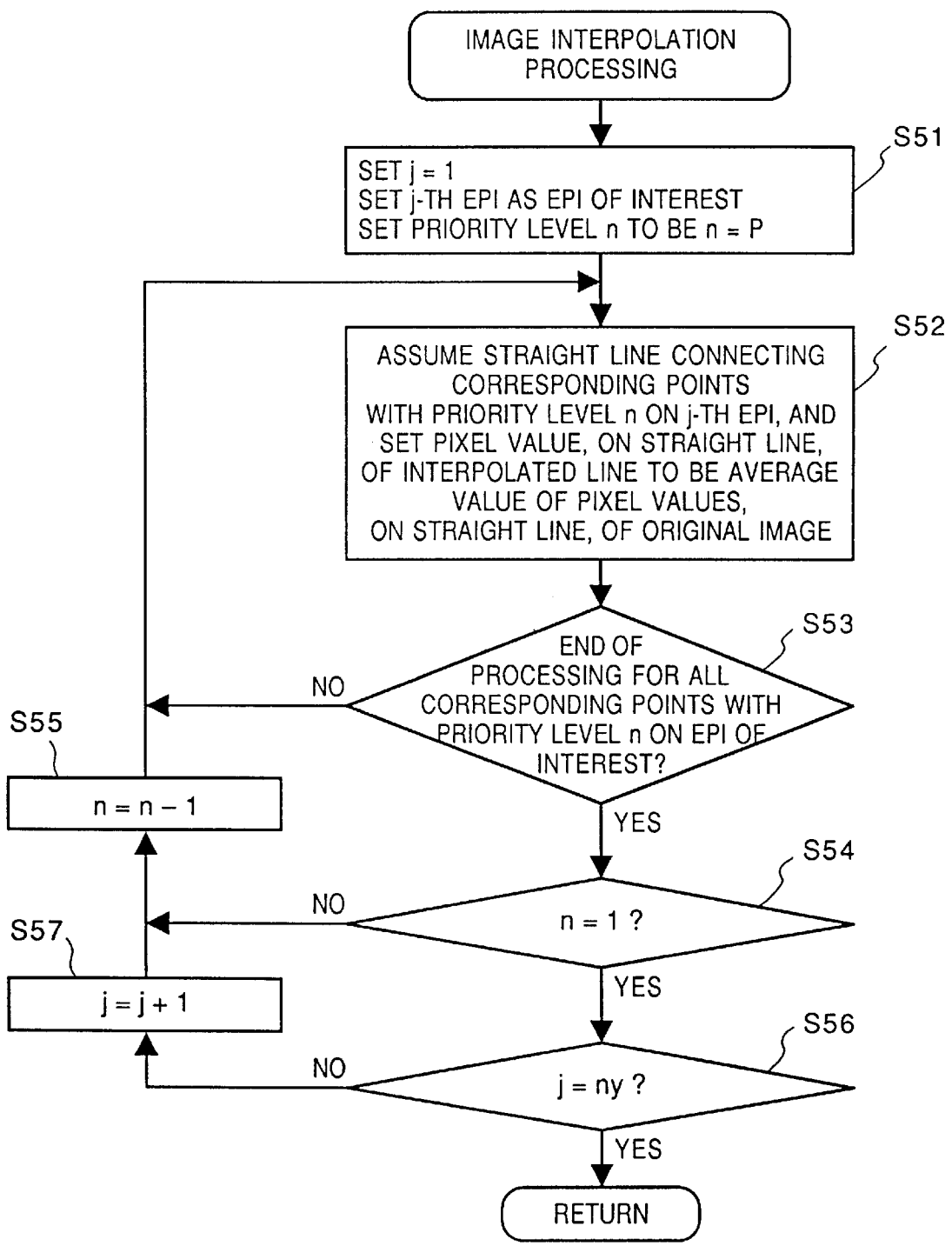
FIG. 7 is a flow chart showing image interpolation processing.
Figure 8:
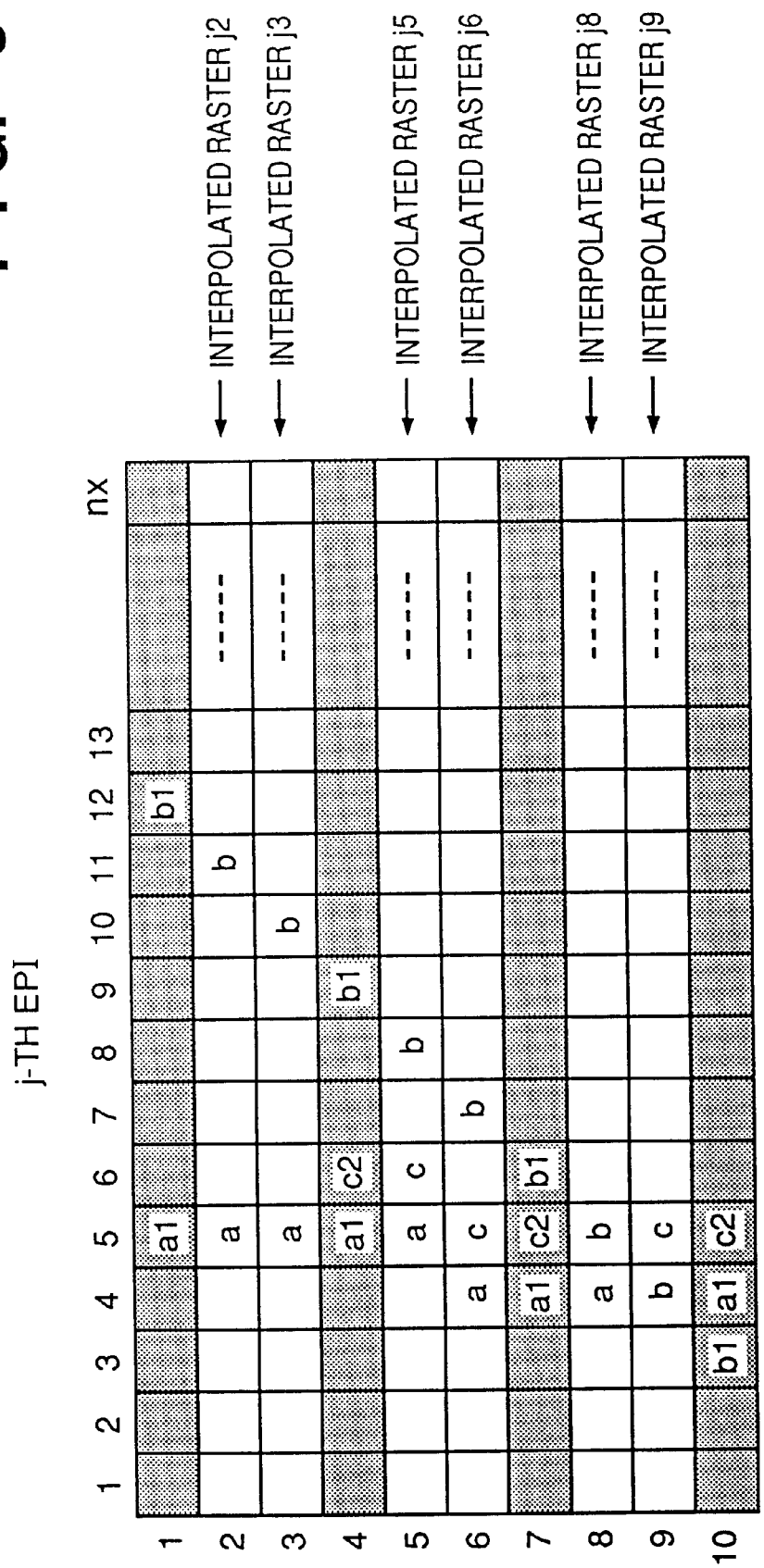
FIG. 8 is a view showing an example subjected to interpolation processing based on detected corresponding points.

FIG. 6 shows an example of the j-th epipolar plane image. a1 and b1 represent the corresponding points of priority level 1, and c2 represents corresponding points of priority level 2. A case is examined below wherein n images are interpolated at equal intervals between input images. For the sake of simplicity, the number of interpolated images is assumed to be 2. When such interpolation is to be performed on the j-th epipolar plane image, as shown in FIG. 8, two rasters are interpolated between each two adjacent lines of the epipolar plane image, and the pixel values of the interpolated rasters, which are present on straight lines connecting the corresponding points on the original epipolar plane image, is set to an average value of the corresponding points. This processing is described below with reference to the flow chart in FIG. 7.

In step S51, initialization for the image interpolation processing is performed. That is, j=1 is set, i.e., the j-th EPI is set as the EPI of interest. The priority level n is set to be n=P. Note that P is the same as P (P=30, for example) used in step S28 in FIG. 5.

The flow advances to step S52. In step S52, a straight line connecting the corresponding points of the priority level n on the j-th EPI is assumed, and the pixel values of interpolated rasters, which are present on this straight line, are set to be an average value of pixel values on the original images present on the straight line. If there are a plurality of corresponding points with the same priority level, processing is performed in the order from a straight line connecting the corresponding points and having a smaller inclination (a straight line perpendicular to a raster is assumed to be one with an inclination "0").

Upon completion of this processing, the flow advances to step S53 to check if the processing in step S52 is completed for all the corresponding points with the priority level n on the EPI of interest. If NO in step S53, the flow returns to step S52; otherwise, the flow advances to step S54 to check if the priority level which is being processed currently is 1. If the priority level is not 1, the priority level is decremented by one (n=n−1) in step S55, and the flow returns to step S52; otherwise, it is checked in step S56 if the EPI of interest is the last EPI. Note that ny is the same as ny used in step S14 in FIG. 3, and represents the total number of rasters of input images.

If the raster of interest is not the last EPI, the next EPI is set to be the EPI of interest (j=j+1), and the flow returns to step S55. If the raster of interest is the last EPI, the image interpolation processing ends, and the flow returns to step S4.

As described above, the processing is performed in the order from corresponding points with lower priority levels (with larger values n), and corresponding points with higher priority levels are overwritten on those with lower priority levels, thus achieving interpolation processing which can take occlusion into account, as shown in FIG. 8. Note that a, b, and c represent pixels interpolated based on the corresponding points a1, b1, and c2, respectively.

Figure 9:
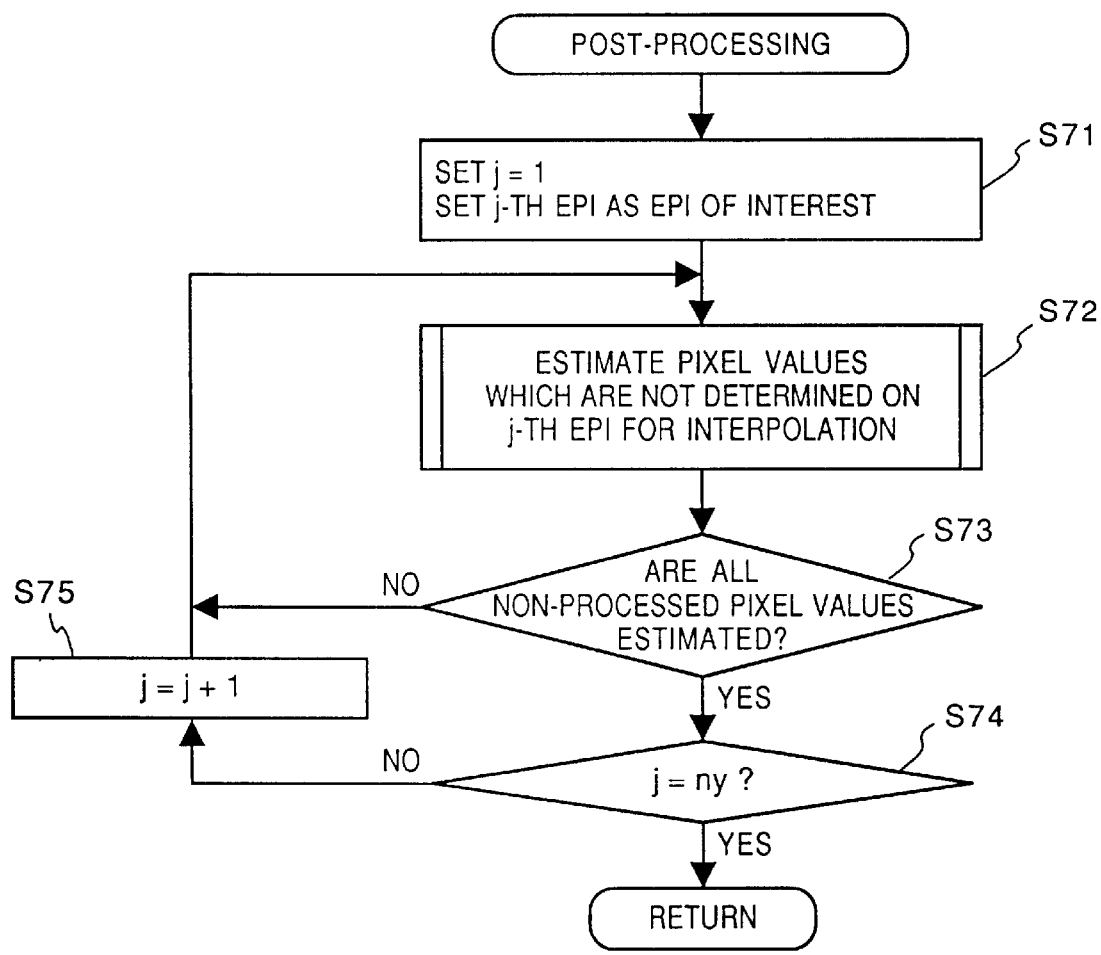
FIG. 9 is a flow chart showing post-processing.

Upon completion of the interpolation processing, the flow advances to step S4, and post-processing is performed for the images which have been subjected to the interpolation processing in step S3. Pixels for which no corresponding points can be obtained even after the processing in step S3 are left without being interpolated. The values of pixels which are left without being interpolated are estimated by the post-processing. The flow of this processing is explained below with reference to the flow chart in FIG. 9.

<Estimation of Non-interpolated Pixels>

Figure 10:
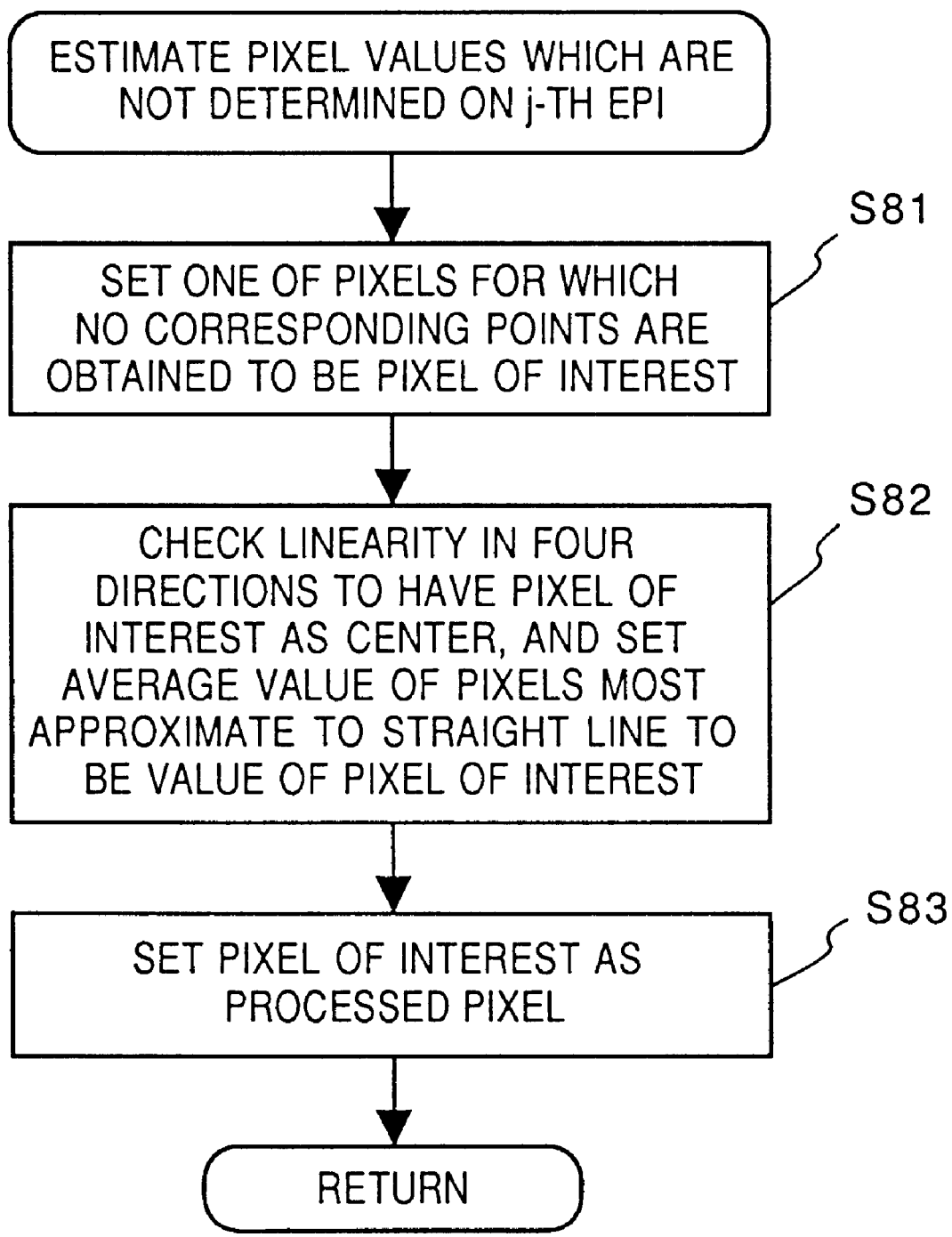
FIG. 10 is a flow chart showing processing for estimating unknown pixel values after the interpolation processing.

In step S71, j=1 is set to set the J-th EPI as the EPI of interest. The flow advances to step S72 to estimate the values of pixels whose value are not determined on the j-th EPI for interpolation in which rasters are interpolated. The estimation method is explained below with reference to the flow chart in FIG. 10 while taking FIGS. 11A to 11E as an example.

Referring to FIGS. 11A to 11E, one of pixels whose values are not determined in the j-th EPI for interpolation in which rasters are interpolated is set to be the pixel * of interest (step S81). 5×5 pixels having the pixel * of interest as the center are assumed, and a sum of differences between the pixels of interest and pixels located at hatched positions is calculated for each of the pixels shown in FIGS. 11A to 11E. The sums of the differences in FIGS. 11A to 11E are compared, and an average value of the hatched pixels corresponding to the minimum sum is set to be an estimated value (step S82).

This is because the path of corresponding points on the EPI becomes a straight line with an inclination falling within a certain range. More specifically, when the EPI is constituted by juxtaposing input images in turn from one obtained by the left-end camera, the straight line extends obliquely upward from the left to the right, and its inclination becomes smaller (closer to a horizontal state) as the distance between the camera to an object is smaller. For this reason, by examining the straight line pattern which extends obliquely upward from the left to the right while changing its inclination, an unknown pixel can be estimated with higher accuracy than that estimated by simply calculating an average value of surrounding pixels. When images are juxtaposed in turn from the one obtained by the right-end camera, estimation is performed using mirror images of the patterns shown in FIGS. 11A to 11E.

When the value of a hatched pixel is unknown, it is excluded from the difference calculation. When the number of hatched pixels is less than 2, the known pixel value closest to that of the pixel of interest is set to be the value of the pixel of interest. After the value of the pixel of interest is estimated, the flow advances to step S73 to check if all the pixel values on the j-th EPI for interpolation in which rasters are interpolated are estimated.

If YES in step S73, the flow advances to step S74; otherwise, the flow returns to step S72. In step S74, it is checked if the processing is performed for all the EPIs. If NO in step S74, the next EPI is set as the EPI of interest (the value j is incremented by one), and the flow returns to step S72; otherwise, the post-processing ends, and the flow advances to step S5.

Figure 12:
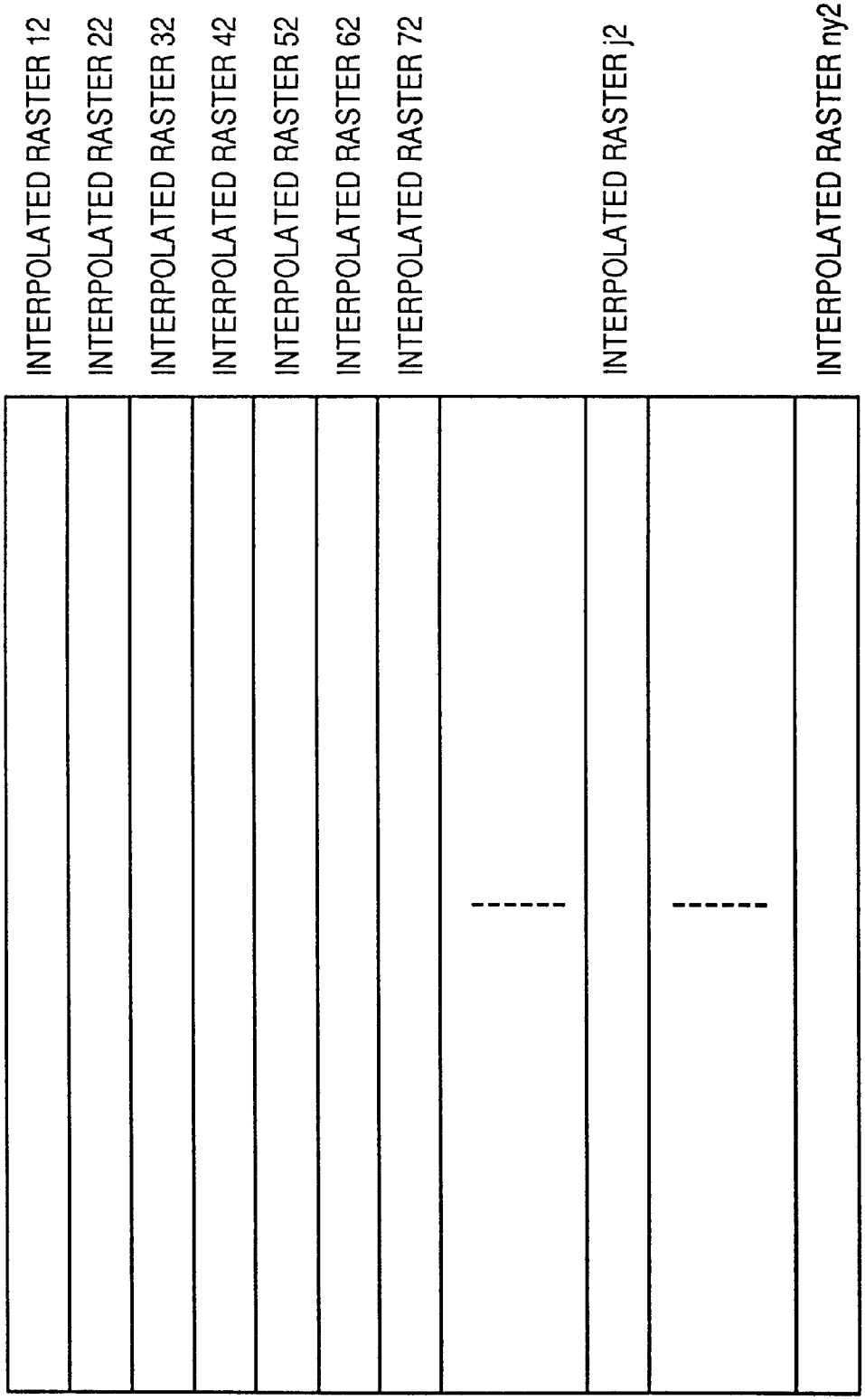
FIG. 12 is a view for explaining a method of re-constructing an interpolated image.

If the lines interpolated by the above processing are represented by j2, j3, j5, j6, j8, and j9, as shown in FIG. 8, for example, interpolated image 2 can be constituted by juxtaposing interpolated lines j2 (j=1 to ny) (see FIG. 12). The same applies to interpolated images 3, 5, 6, 8, and 9.

After the interpolated images are generated, as described above, an image corresponding to the viewpoint position is selected from the interpolated images and input images on the basis of the output from the viewpoint sensor 12, and the selected image is displayed in step S5. In this case, when two images at the photographing positions separated by the interval between the eyes of an observer are stereoscopically displayed, the observer can observe a stereoscopic image.

Note that the viewpoint position can be determined based on the camera interval.

With the above-mentioned processing, since interpolated images are generated by relating continuity between neighboring pixels as lines, high-quality interpolated images which are free from deterioration of edges, and the like are generated, and an image from a viewpoint from which no images are photographed in practice is displayed.

Note that the image input unit is not limited to one for inputting photographed images in real time but may input images which are photographed in advance or may input images from a database which stores images created by, e.g., a computer. If a change in an object over time can be ignored, such an object may be photographed by moving a single camera.

<Processing for Blurred Images>

Searching corresponding points among images photographed from different viewpoints is often disturbed since the color even at a single point changes depending on input images to which the point belongs due to a blur (due to averaging at density edge and color edge portions in an image) of images caused by the performance of photographing devices (optical systems, analog systems in the devices, and the like). In such a case, a corresponding point cannot be found. In this case, by increasing the threshold value TH2 for discriminating linearity in step S22 to some extent, an error can be absorbed. More specifically, a small value TH2 is initially set, and when no more corresponding points are found, the value TH2 is increased. Thus, a corresponding point, which is not found for the above-mentioned reason is obtained. The apparatus of this embodiment uses the arrangement shown in FIG. 1, and searches for more corresponding points by changing the threshold value in the corresponding point searching processing.

Figure 13:
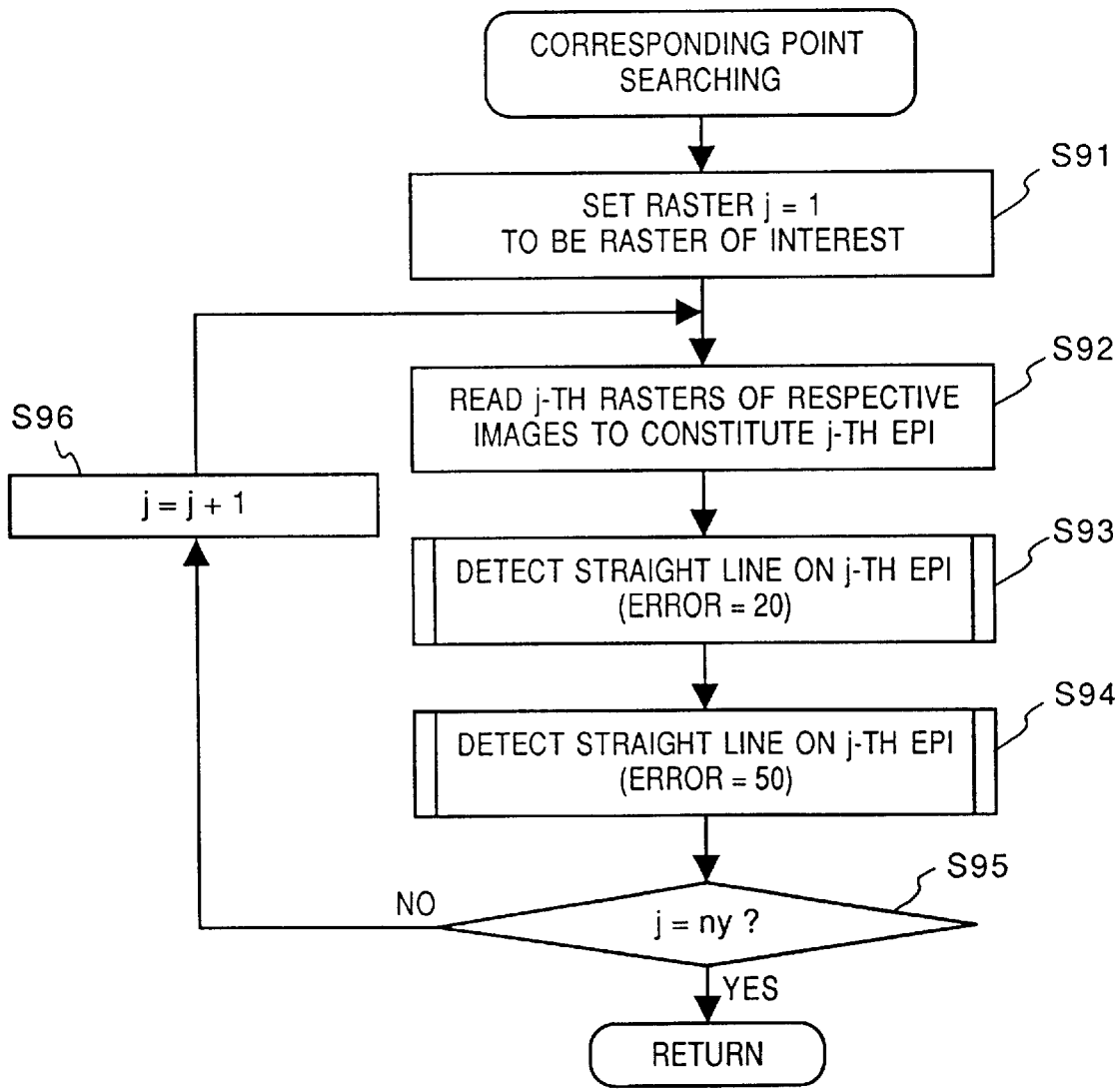
FIG. 13 is a flow chart showing corresponding point searching processing according to the second embodiment of the present invention.

FIG. 13 is a flow chart showing the corresponding point searching processing in which some steps in FIG. 3 are changed. Steps S91, S92, S93, S95, and S96 execute the same processing operations as in steps S11, S12, S13, S14, and S15, respectively.

Although step S94 is basically the same as step S13, the error of each pixel value is set to be 50, so that the threshold value TH2 for discriminating linearity is set to be $3 \times 50^2 =$ 7500, thereby calculating corresponding points. By inserting this processing step, the above-mentioned variations in input image are absorbed. Processing except for this corresponding point searching processing is as described above.

In step S94, a straight line constituted by points with larger errors than in step S93 is detected. For this reason, even when images are blurred, corresponding points are detected.

<Prevention of Error Accumulation>

Figure 14:
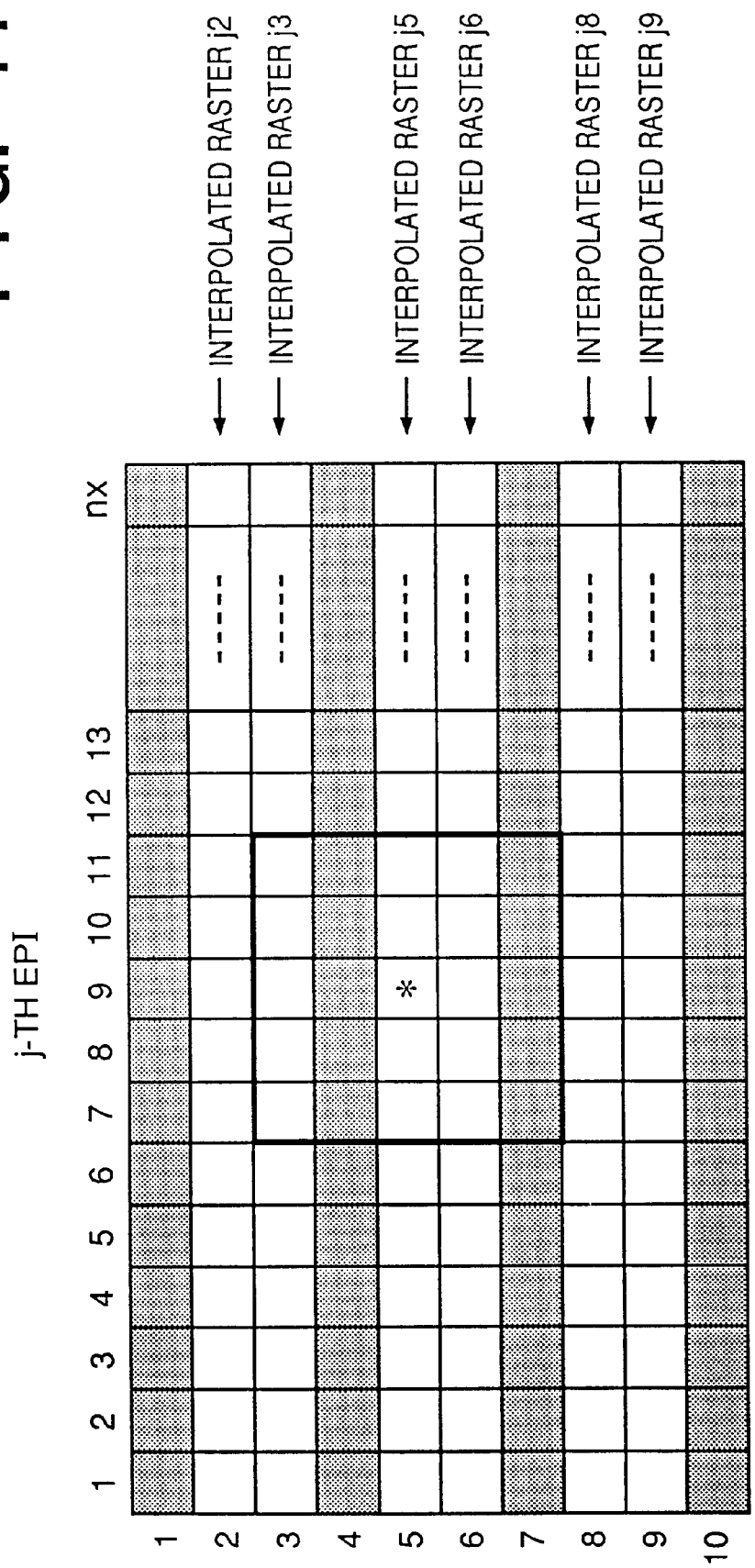
FIG. 14 is a view for explaining estimation of unknown pixel values.

In the above embodiment, 5×5 pixel blocks are defined to have the pixel * of interest in, e.g., FIG. 14 as the center. However, if a pixel obtained by interpolation is used for estimating an unknown pixel value, an error included in the estimated pixel may increase. In this case, a raster used for estimating an unknown pixel value is selected from only original images. More specifically, in order to estimate the value of the pixel * of interest, a plane is constituted by juxtaposing rasters 1, 4, 5, 7, and 10 in turn to have a raster (the fifth raster in FIG. 14) where the pixel * of interest is present as the center. In this state, the same processing as in the estimation processing described above with reference to FIGS. 10 to 11E is performed, thus preventing estimation errors from being accumulated.

[Second Embodiment]

The second embodiment of the present invention is described below with reference to the accompanying drawings.

<Arrangement of Apparatus>

Figure 15:
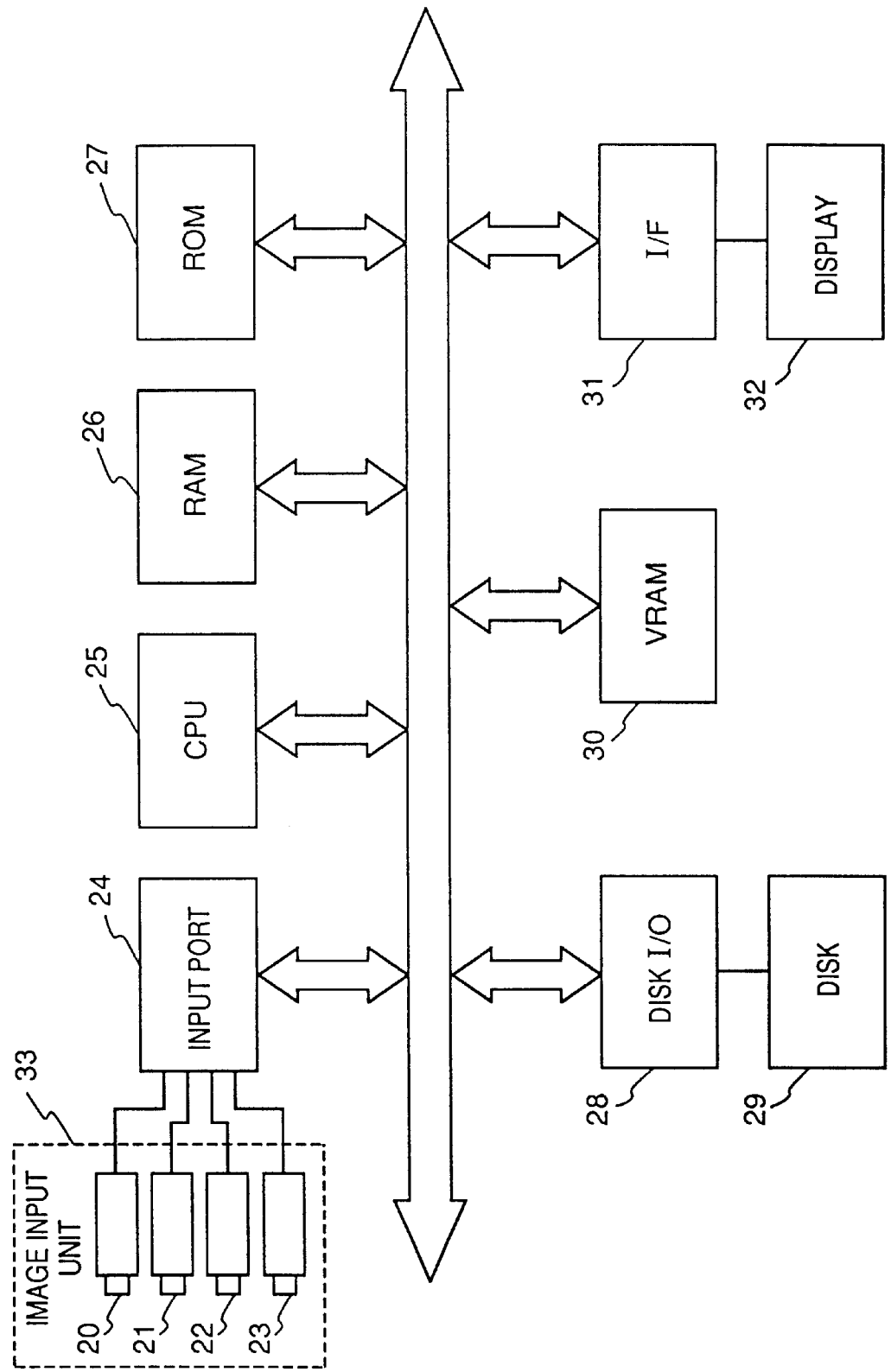
FIG. 15 is a block diagram showing an image display apparatus according to the second embodiment of the present invention.

FIG. 15 exemplifies an image processing apparatus which uses four cameras in an image input unit. Referring to FIG. 15, an image input unit 33 includes four cameras 20 to 23, and inputs photographed images to the apparatus via an input port 24 as digital image signals. A CPU 25 is a processor for controlling the entire image processing apparatus, and executes predetermined control sequences by executing programs stored in a ROM 27 or a RAM 26. The RAM 26 and the ROM 27 also store data in addition to the programs. Furthermore, the RAM 26 stores digital image data input from the image input unit 33. A hard disk 29 exchanges data with the CPU 25, the RAM 26, and the like via a disk I/O port 28. Image data are also stored in the disk 29. Photographed image data or processed image data are developed on a VRAM 30, and are displayed on a stereoscopic display 32 via a video signal output I/F 31. In this embodiment, the four cameras are used. However, the present invention is not limited to the four cameras.

<Generation of Interpolated Image>

Figure 16:
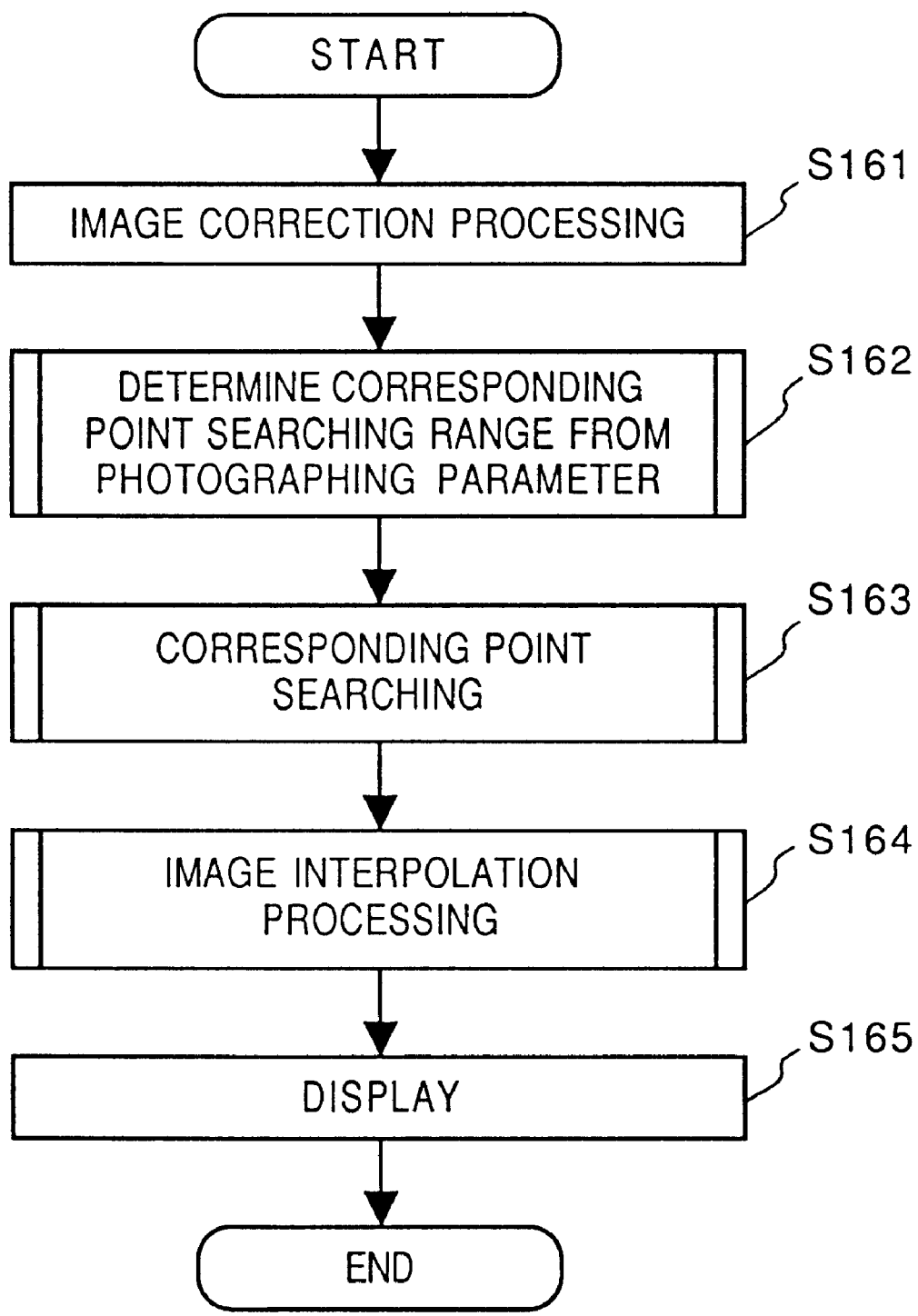
FIG. 16 is a flow chart showing image interpolation processing of the second embodiment.

FIG. 16 is a flow chart showing the flow of interpolated image generation processing by the image processing apparatus of this embodiment.

In step S161, original images input from the cameras 20 to 23 are subjected to geometric correction processing of, e.g., the chromatic aberration and distortion of lenses, the deviation of the optical axis, the postures and positions of the cameras, and the like, and correction processing of sensitivity nonuniformity of CCD sensors, and the like. These correction processing operations are performed at high speed by a table look-up operations if correction data are recorded in advance in the ROM or RAM as calibration data. On the other hand, if correction data are obtained each time before images are input, correction is more accurately achieved. Upon completion of these correction precessing operations, the flow advances to step S162, and a range for corresponding point searching processing is determined based on photographing parameters. The flow then advances to step S163, and the corresponding point searching processing among images is performed using the determination result in step S162. Upon completion of the corresponding point searching processing, the flow advances to step S164, and image interpolation processing is performed. Thereafter, in step S165, corrected input images and interpolated images are displayed on lenticular display.

The processing operations in the above steps is explained in detail below.

<Calculation of Corresponding Point Searching Range>

The calculation processing of the corresponding point searching range is described below with reference to FIGS. 17A and 17B.

Figure 17A:
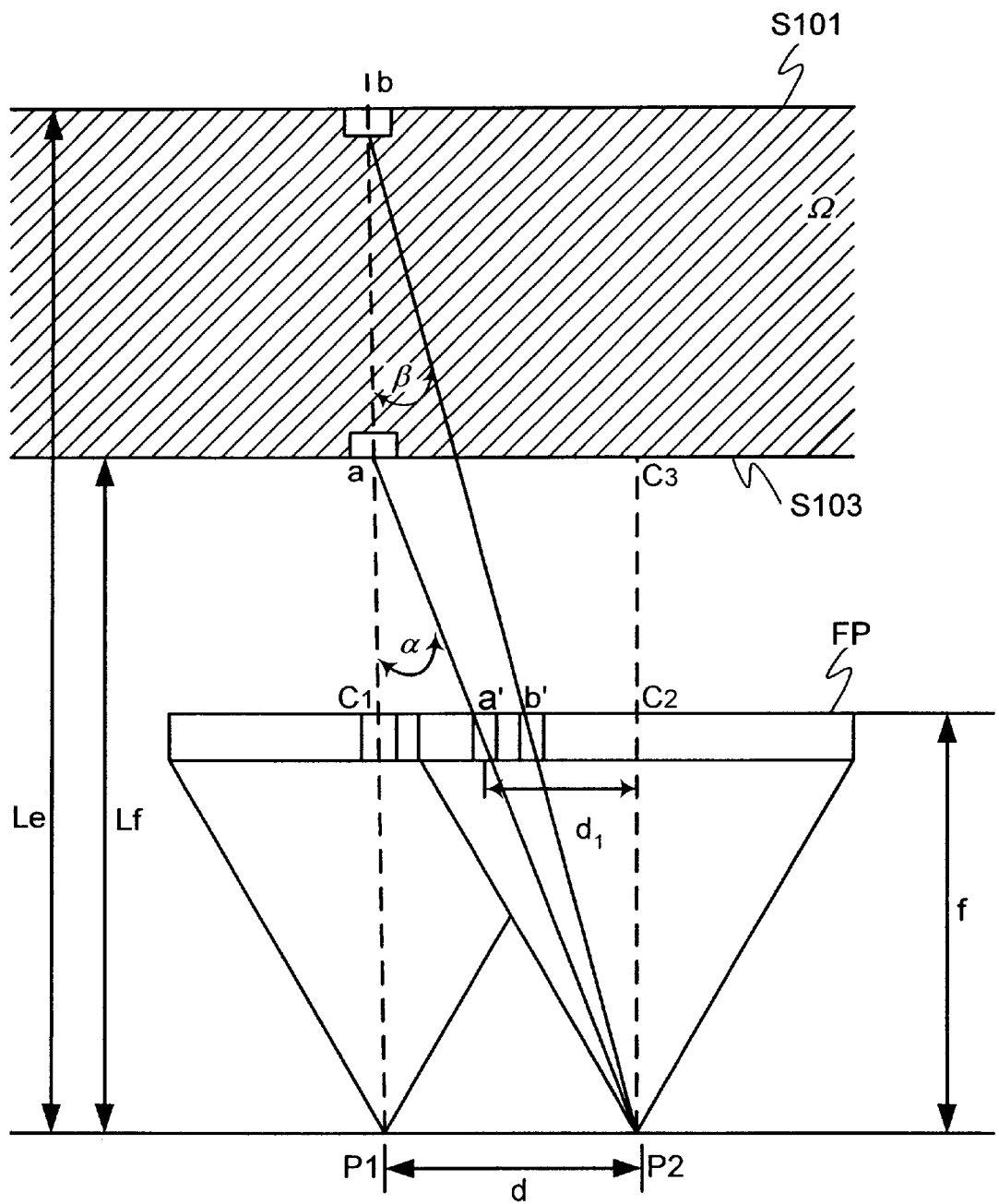
FIGS. 17A and 17B are views showing the calculation principle of a corresponding point searching range on the basis of photographing parameters in step S162 in FIG. 16.
Figure 17B:
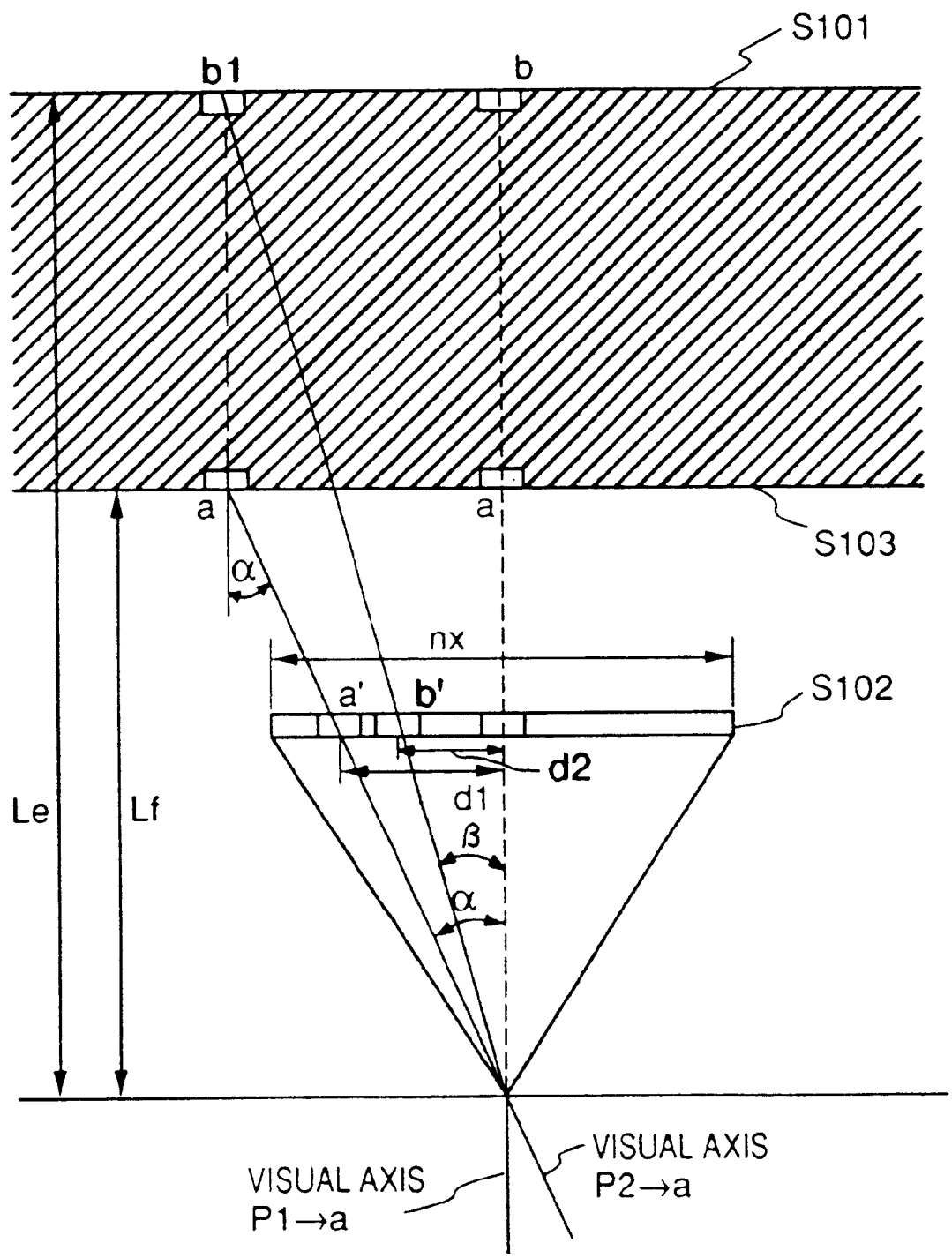

FIGS. 17A and 17B are views showing the calculation principle of the corresponding point searching range. In FIGS. 17A and 17B, S101 is the rearmost surface of a space to be photographed, S103 is the frontmost surface of the space to be photographed, and the space between these surfaces is a photographing space S Ω. Le is the distance to the rearmost surface of the space to be photographed, and Lf is the distance to the frontmost surface of the space to be photographed. The angle, α, is an angle defined by a perpendicular from a photographing position p1 to an imaging plane FP, and a straight line connecting between a photographing position p2 separated from the photographing position p1 by a distance d, and a photographing object a located on the frontmost surface S103 of the photographing space Ω. The angle, β, is similarly an angle defined by a straight line connecting between a photographing object b located on the rearmost surface S103 of the photographing space Ω and the point p2, and a perpendicular from the viewpoint (photographing) position p1 to the imaging plane FP. The focal length, f, is the distance between the photographing position and the imaging plane FP. Images a' and b' are images of the objects a and b on the imaging plane FP, which are photographed from the point p2. According to FIG. 17A, the distance between images a' and b' in the imaging plane as the corresponding point searching range is calculated.

The moving distance, d1, on the imaging plane, of the frontmost object a in the photographing space Ω, which object is photographed from the photographing positions p1 and p2, is calculated. The moving distance d1 is calculated using the following formula from FIGS. 17A and 17B. Note that the number of pixels, in the main scanning direction (the lateral direction in FIG. 17A), of the imaging plane is represented by nx. Positions c1 and c2 are intersecting points of perpendiculars from the positions p1 and p2 to the imaging plane FP, respectively. A position c3 is an intersecting position of a perpendicular from the position p2 to the rearmost surface S103. The positions c1 and c2 are centers of the imaging plane FP in the main scanning direction. When the object a and b are photographed from the position p1, the images are projected on the position c1 of the imaging plane FP. On the other hand, when the objects a and b are photographed from position p2, the images of object a is projected on the position a' and the image of the object b is projected on the position b' of the imaging plane.

On the imaging plane FP, the image of the object moves $|a'-c2|$ long in case that the viewpoint moves to the position p2 from the position p1. Triangle p2-a-c3 is similar to a triangle p2-a'-c2, then the moving distance $|a'-c2|$ is expressed by following formula:

$$|a'-c2|=(d \cdot f)/Lf$$
$$|a'-c2|=d1 \cdot p$$

where p means a pixel pitch of the imaging plane. On the basis of above formulas, the moving distance d1 is expressed by formula (2):

$$d1=(d \cdot f)/(Lf \cdot p) \quad (2)$$

Similarly, moving distance of an image on the imaging plane FP of the rearmost object b is expressed by formula (3) when the viewpoint moves to position p2 from the position p1:

$$d2=(d \cdot f)/(Le \cdot p) \quad (3)$$

More specifically, an image viewed from the position pi and an image viewed from the position p2 may deviate from each other by a minimum of d2 and a maximum of d1.

From these distances, the range of the inclination of a straight line for searching for corresponding points between images at the viewpoints p1 and p2 on an epipolar plane image can be changed between d1 and d2.

The searching pitch, s, is obtained using the following equation based on the number N of cameras:

$$S=1/N$$

As described above, when the space to be photographed is limited to the frontmost and rearmost surfaces, the range for searching for corresponding points is prevented from being inadvertently widened, and high-speed searching processing is realized. In addition, since the searching pitch is calculated based on the number of cameras, the searching processing time is prevented from being prolonged by inadvertently setting a small searching pitch.

<Corresponding Point Searching Processing>

Figure 18:
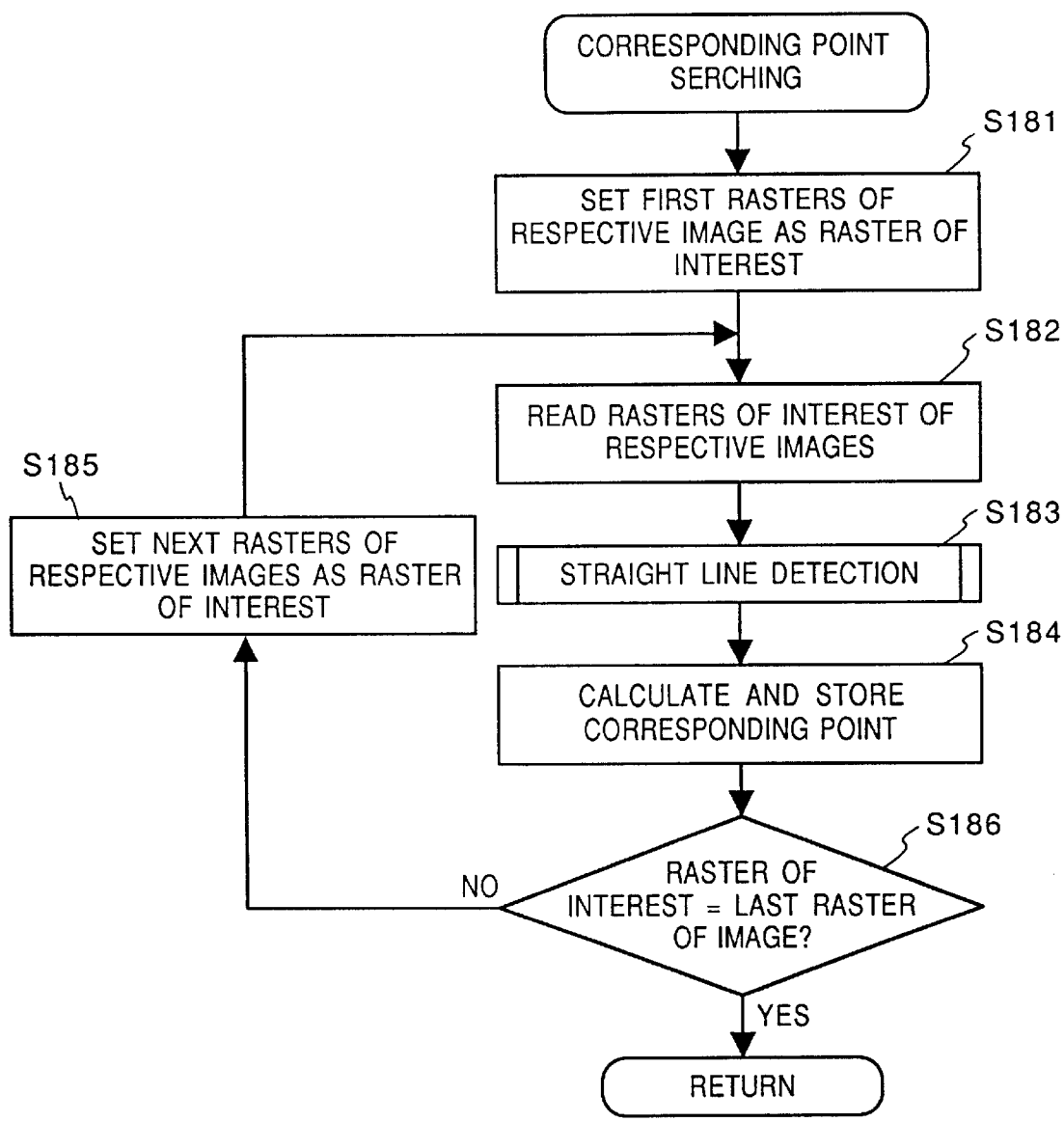
FIG. 18 is a flow chart showing corresponding point searching processing in step S163 in FIG. 16.

The corresponding point searching processing using the calculated corresponding point searching parameters is described below with reference to FIG. 18. FIG. 18 is a flow chart showing the corresponding point searching processing in step S162 in FIG. 16.

In step s181, the first raster of each image is initially set to be the raster of interest.

Figure 19:
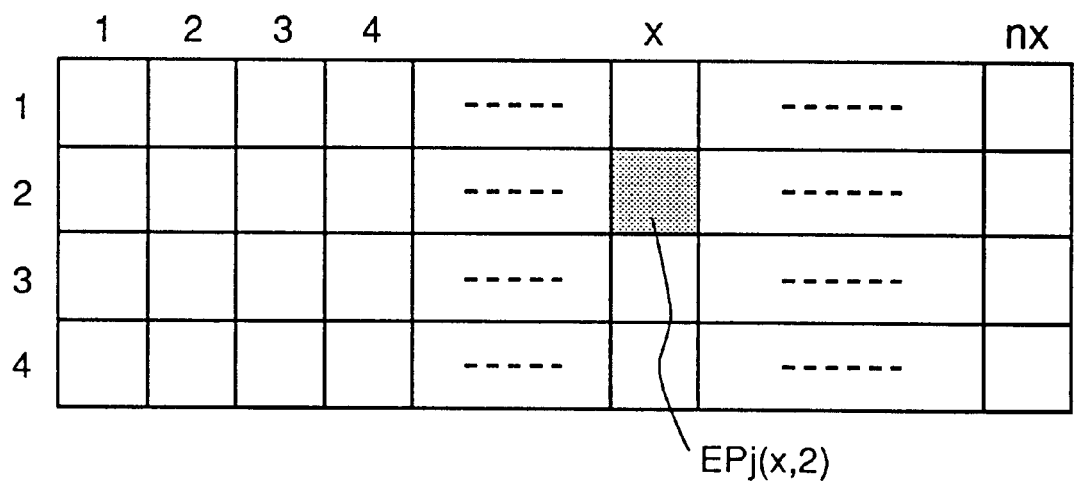
FIG. 19 is a view showing a j-th epipolar plane image.

In step S182, the rasters of interest of the respective images are read out to work memory to virtually constitute a j-th epipolar plane image (EPI). Note that the j-th EPI is a set of points EPj(x,i) on an image plane, as shown in FIG. 19, which satisfy:

$$EPj(x,i)=Ni(x,j)$$

where Ni(x,j) represents an x-th pixel value on a j-th line of an i-th image (i=1 to 4 in this embodiment), i.e., the value of a pixel whose coordinates are expressed by (x,j) in the i-th image.

When input devices (cameras) are set parallel to each other at equal intervals, all the corresponding points on the epipolar plane image align on straight lines. Therefore, corresponding points are detected by detecting straight lines, and images are interpolated on the detected straight lines. Thus, straight lines are detected in step S183, and corresponding points are calculated and stored based on the detected straight lines in step S184.

Figure 20:
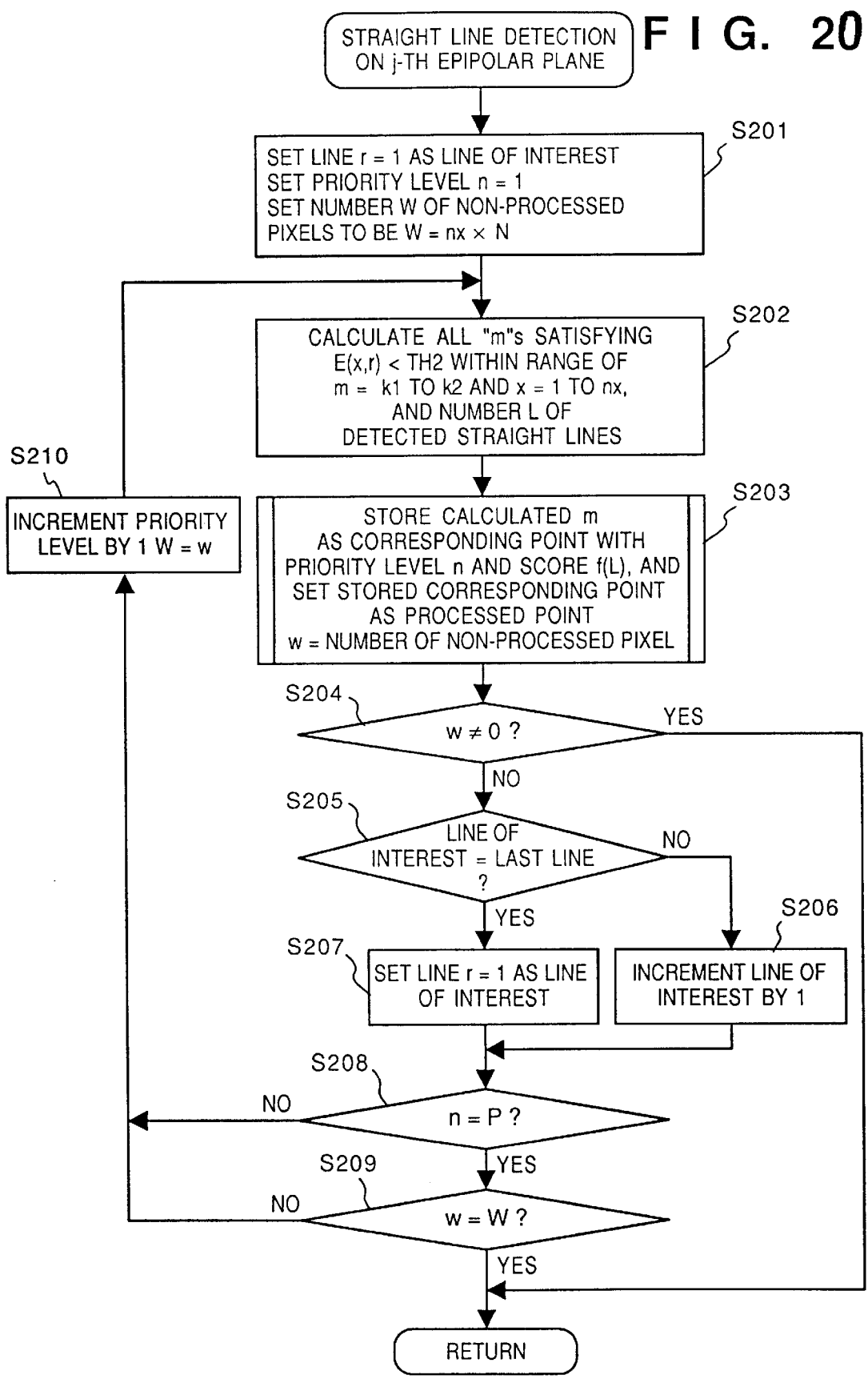
FIG. 20 is a flow chart showing straight line detection processing in step S164 in FIG. 16.

The detailed straight line detection algorithm on the EPI is described below with reference to the flow chart in FIG. 20.

In step S201, a priority level n=1 and a line r=1 of the pixel of interest are set. The flow advances to step S202. In step S202, the pixel of interest is represented by EPj(x,r), and all "m"s which satisfy the following formula within a range of m=k1 to k1+k2 and x=1 to nx are calculated:

$$Ej(x,r) = \sum_{i=r+1}^{4} \{EPj(x+m\times(i-r), i) - Epj(x,r)\}^2 < TH2$$

The total number of detected straight lines is stored as L. In this case, since m may assume real number values, corresponding x-coordinates are determined by rounding values x+m+(i−r). TH2 is a threshold value for finding the corresponding points, and is set to be 1200 in this embodiment. The value "1200" has the following meaning. That is, since N=4 and r=1 due to the 4-line EPI, the difference in formula (1) is calculated three times, and under the assumption that each difference value corresponds to substantially the same color if it is equal to or smaller than about 20, $3 \times 20^2 = 1200$ is set. If the input system is an ideal one, and no specular components are present in images (corresponding points of respective images have the same pixel values), TH2=0 may be set. However, in a practical input system, corresponding points of respective images suffer variations in pixel values. Therefore, the difference value is set to be 20 to provide a given margin. For this reason, as the accuracy of the input system increases, the difference value becomes small. Conversely, if the input system has lower accuracy, a larger difference value must be set.

The above-mentioned technique is performed for each of R, G, and B pixel values. In addition, the above-mentioned technique is applied when images are converted to various other colorimetric systems such as YIQ, HSI, and the like, and threshold values suitable therefor are set and used. On the other hand, k1 and k2 respectively use the parameters d1 and d2 calculated in step S162 in FIG. 16 (i.e., k1=d2, k2=d1). If EPj(x+m×(i−r),i) is not present, it is determined that no corresponding point for this m is present, and the processing is continued. If EPj(x+m×(i−r),i) has already been processed in step S202, EPj(x+m×(i−r), i)−EPj(x,r)=0 is set, and the processing is continued.

The flow advances to step S203. In step S203, a corresponding point of the priority level n is calculated from the straight line of the inclination m calculated in step S202, and is stored in the memory as (n, f(L)) together with the value of a score f(L). Note that L is the number of detected straight lines, and f L is a function indicating a small value when the number of straight lines is large, and indicating a large value when the number of straight lines is small.

When a plurality of corresponding points are obtained in correspondence with the pixel of interest, all the calculated points are stored as corresponding points of the priority level n for the sake of simplicity. Pixels calculated as the corresponding points are set to be processed pixels. If the corresponding point calculated based on the straight line of the inclination m has already been processed, and the value of a score f(L') of (n, f(L'), stored in correspondence with the already processed corresponding point is larger than the score associated with the pixel of interest, this point is excluded from the corresponding points. More specifically, the score represents the number of corresponding points in association with a given point. The score also serves as a measure indicating the probability of the correspondence associated with the point of interest. If two points are caused to correspond to each other, the probability of the correspondence is discriminated using this measure. When a certain pixel is determined to have a correspondence with another pixel, if the pixel already has a more probable correspondence, another correspondence is inhibited from being set. Thus, an improbable correspondence is eliminated, and a more probable correspondence is. Furthermore, in step S203, the number of non-processed pixels is set in w.

Figure 21:
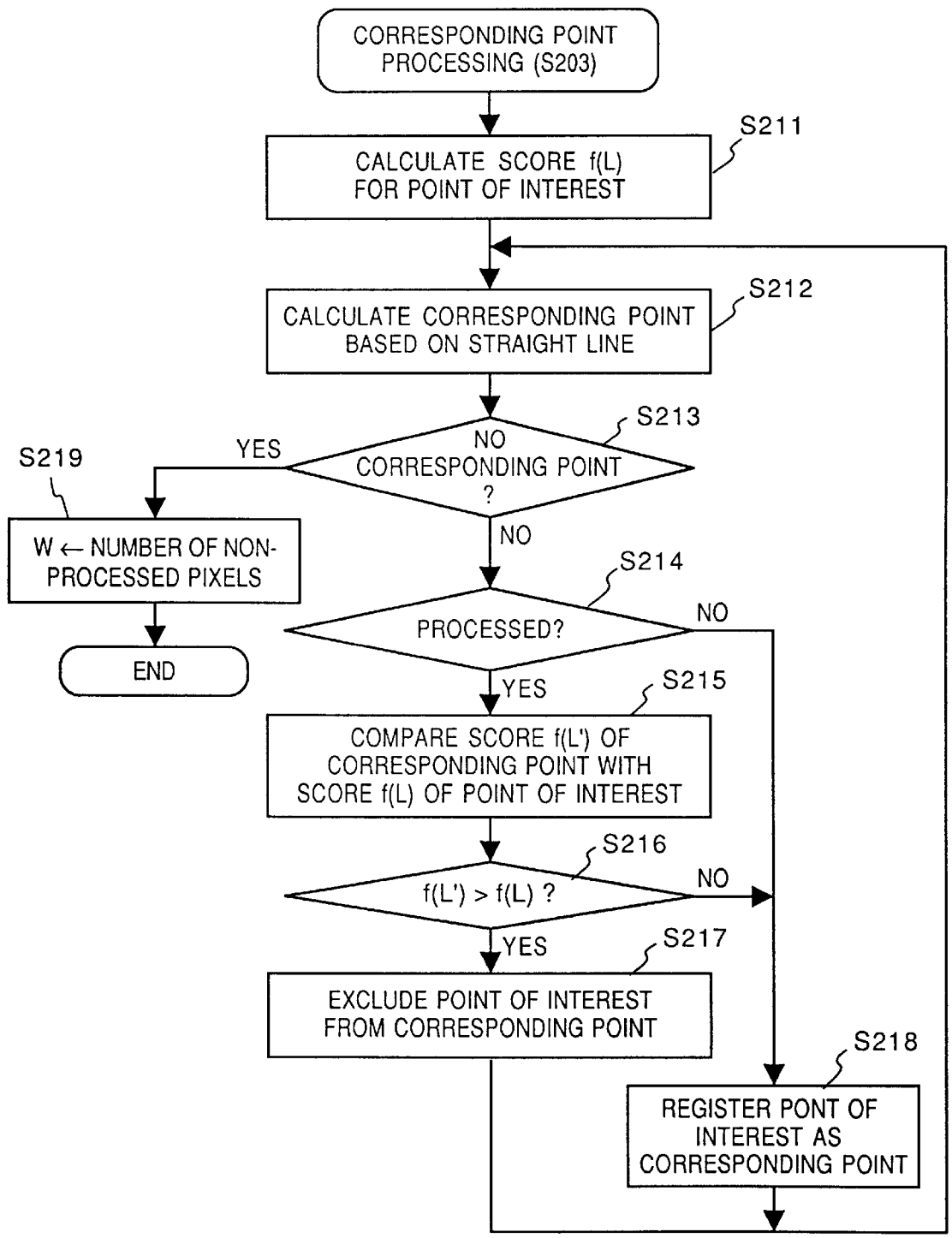
FIG. 21 is a flow chart showing corresponding point detection processing.

FIG. 21 is a flow chart showing in more detail the processing in step S203.

The score f(L) is calculated based on the straight line detected in step S202 (S211). One corresponding point is obtained based on the straight line (S212). If no corresponding point is obtained, the number of non-processed pixels is set in w, and the processing in step S203 ends (S219). If a corresponding point is found, it is checked if the point has already been processed (S214). If the corresponding point is not processed yet, it is stored as a corresponding point (S218). If the corresponding point has already been processed, the score f(L') of the corresponding point is compared with the score f(L) of the point of interest (S215). If f(L')>f(L), i.e., the correspondence already set for the corresponding point is more probable, another correspondence is not set for the corresponding point, and the point is excluded from corresponding points (S217). However, if f(L')<f(L), since the correspondence between the corresponding point and the point of interest is more probable than the correspondence already set for the correspondence, the point is registered as a corresponding point (S218). The above-mentioned processing is repeated while obtaining a corresponding point. In this manner, the processing in step S203 ends.

The flow then advances to step S204 to check if the number w of non-processed pixels is 0. If w=0, the processing on the j-th epipolar plane image ends; otherwise, the flow advances to step S205 to check if the line r of interest is the last line. If YES in step S205, r=1 (start line) is set in step S207; otherwise, the value of the line r of interest is incremented by one in step S206. Note that N in FIG. 20 represents the number of lines constituting the EPI (in this embodiment, N=4).

The flow then advances to step S208 to check if n representing the priority level is equal to P. Note that P represents the complexity of a phenomenon in which objects conceal each other (occlusion). More specifically, if P is large, it represents a state wherein a large number of objects overlap each other; if P is small, the overlapping state of the objects is small. The value P is set depending on the degree of occlusion to be reproduced. In this embodiment, P=(N−1)×10=30 is set as an empirical value. If n≠P in step S208, the flow advances to step S210. In step S210, the priority level n is incremented by one, and W is set in the value w. Thereafter, the flow returns to step S202. On the other hand, if n=P, the flow advances to step S209 to check if the number of non-processed pixels is smaller than that in the previous processing. If the number of non-processed pixels is smaller than that in the previous processing, the flow advances to step S210; otherwise, the straight line detection processing on the j-th EPI, i.e., step S184 in FIG. 18 ends.

Thereafter, the flow returns to step S186 to start processing for the next EPI. In step S186, it is checked if processing is performed for all the rasters of input images. If NO in step S186, the value j is incremented by one, and the flow returns to step S182; otherwise, i.e., if step S163 in FIG. 16 ends, the flow advances to step S164.

With the above-mentioned processing, corresponding points, which cannot be obtained from two images, are obtained, and occlusion is also dealt with. For this reason, the positional relationship between objects in the direction of the line of sight is normally processed, and the accuracy of corresponding point searching processing is improved. On the other hand, the number of straight lines detected based on a certain pixel of interest is expressed as a score indicating the probability of the pixel of interest being a corresponding point, and a more probable corresponding point is obtained by comparing scores. For this reason, the corresponding point searching processing is performed without reversing the positional relationship between an object in a uniform color and a small object present in front of the former object in the direction of the line of sight.

<Image Interpolation Processing>

The flow advances to step S164 to perform image interpolation processing. The image interpolation processing is performed using the corresponding points obtained in step S163. The detailed algorithm is explained below while taking FIG. 22 as an example.

Figure 22:
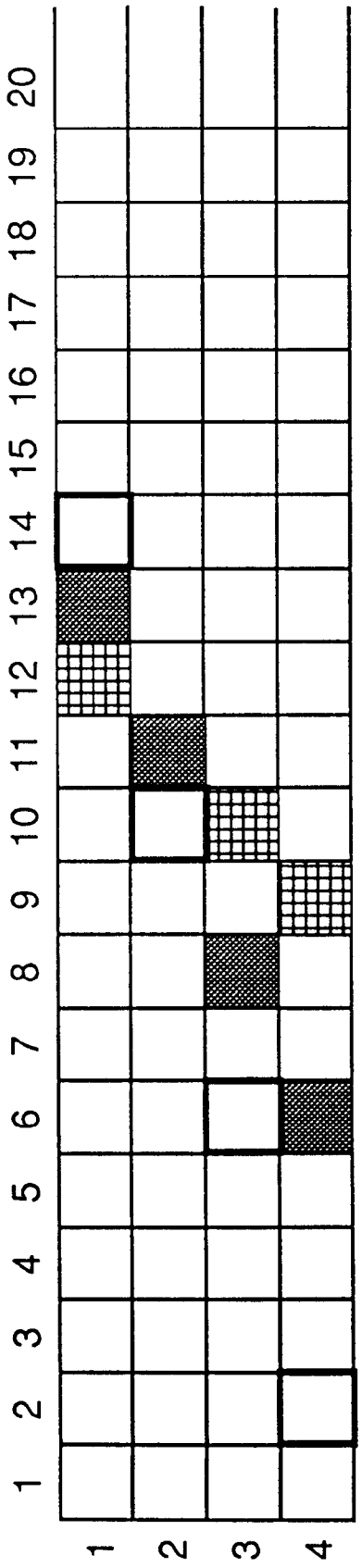
FIG. 22 is a view for explaining interpolation processing.
Figure 23:
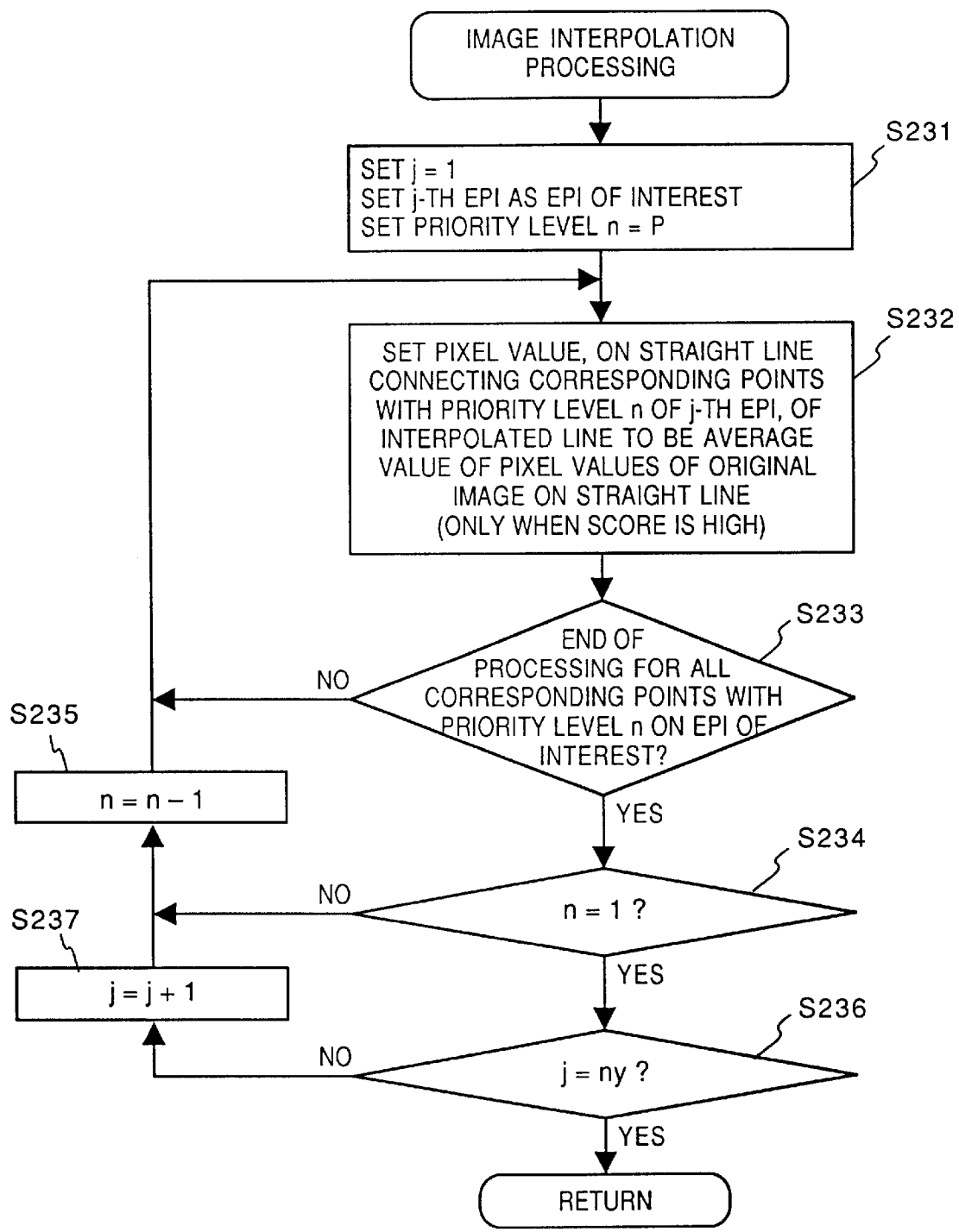
FIG. 23 is a flow chart showing the interpolation processing.
Figure 24:
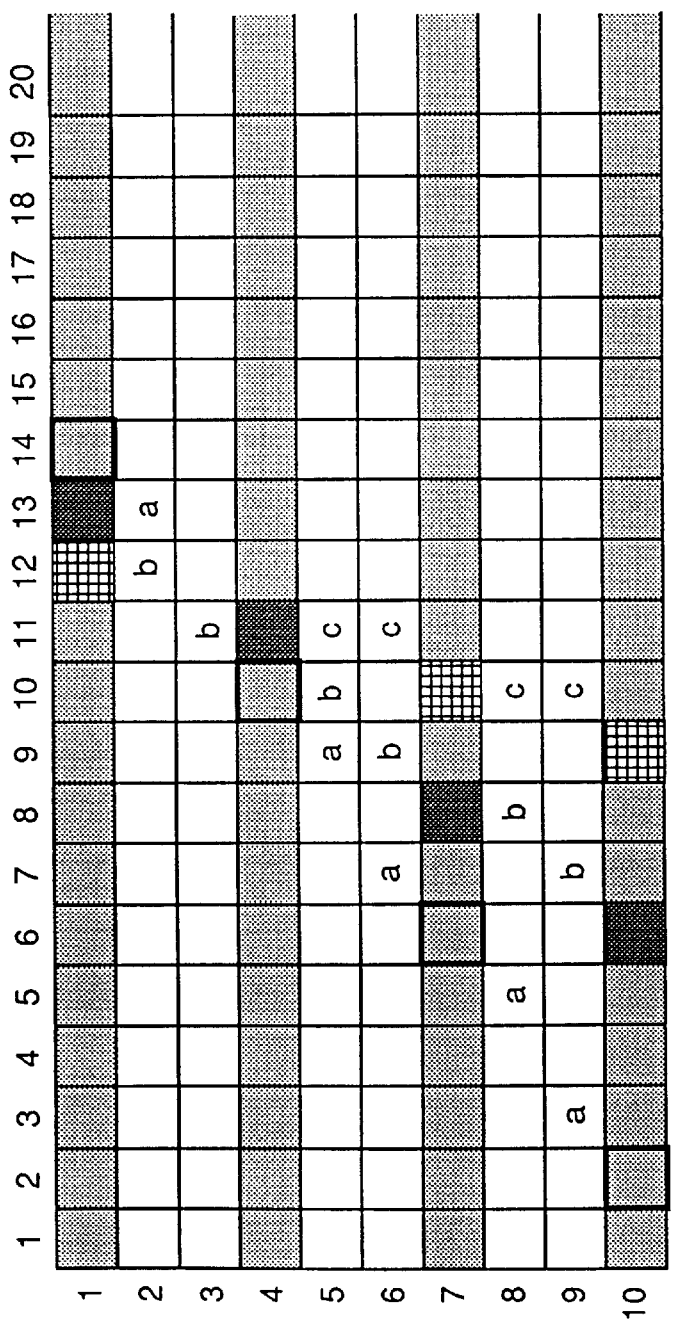
FIG. 24 is a view for explaining the interpolation processing.

FIG. 22 shows the j-th EPI. a1 represents corresponding points with priority level 1 and score f(L)=1, b1 represents corresponding points with priority level 1 and score 20, and c2 represents corresponding points with priority level 2 and score 20. A case is examined below wherein n images are interpolated at equal intervals between input images. For the sake of simplicity, the number n of interpolated lines is assumed to be 2. When such interpolation is to be performed on the j-th EPI, as shown in FIG. 24, two lines are interpolated between each two adjacent lines of the EPI, and the pixel values of the interpolated lines, which are present on straight lines connecting the corresponding points on the original epipolar plane image, are to be an average value of the corresponding points. This processing is described below with reference to the flow chart in FIG. 23. FIG. 23 is a flow chart showing in detail the processing in step S164 in FIG. 16.

In step S231, initialization for the image interpolation processing is performed. That is, j=1 is set, i.e., the j-th EPI is set as the EPI of interest. The priority level n is set to be n=P. Note that P is the same as P (P=30) used in step S208 in FIG. 20.

The flow advances to step S232. In step S232, a straight line connecting the corresponding points of the priority level n on the j-th EPI is assumed, and the pixel values of interpolated lines, which are present on this straight line, are set to be an average value of pixel values on the original images present on the straight line. In this case, if a value has already been set as a corresponding point on the interpolated line, when the score of another corresponding point is higher than that of the already stored point, the pixel value of the interpolated line is overwritten. On the other hand, if the score is lower, overwriting is inhibited. When the corresponding points a1 and b1 in FIG. 24 are taken as an example, the pixel values of points a and b on straight lines connecting the corresponding points are set to be an average value of pixel values indicated by a1 and b1, respectively. A point at coordinates (11, 3) corresponds to both a1 and b1, but is set with an average value b of pixel values on the straight line as a corresponding point of b1 with a higher score.

Upon completion of this processing, the flow advances to step S233 to check if the processing in step S232 is completed for all the corresponding points with the priority level n on the EPI of interest. If NO in step S233, the flow returns to step S232; otherwise, the flow advances to step S234 to check if the priority level which is being processed currently is 1.

If it is determined in step S234 that the priority level is not 1, the priority level is decremented by one (n=n−1) in step S235, and the flow advances to step S232; otherwise, it is checked in step S236 if the EPI of interest is the last EPI. Note that ny is the total number of rasters of input images. If the raster of interest is not the last EPI, the next EPI (j=j+1) is set to be the EPI of interest, and the flow returns to step S235. Otherwise, the image interpolation processing ends, and the flow returns to step S165 in FIG. 16.

Figure 25:
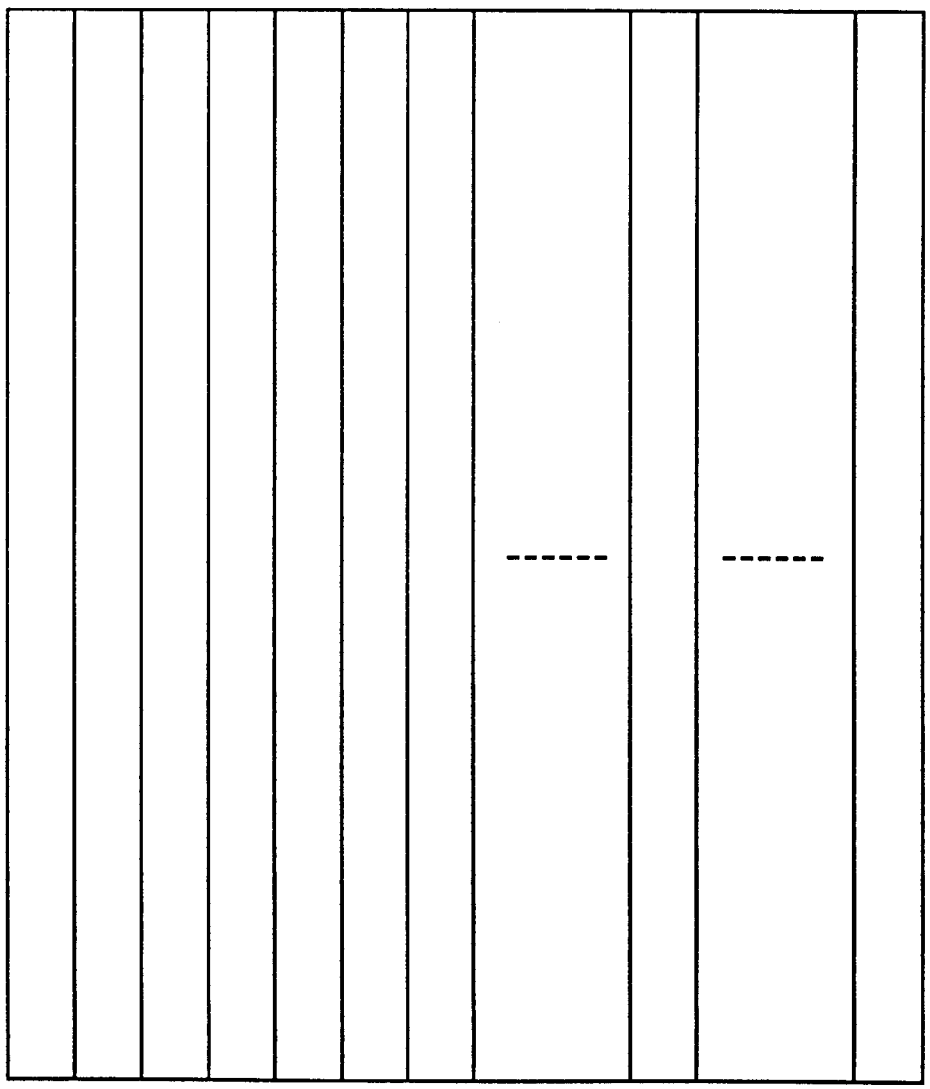
FIG. 25 is a view for explaining the interpolation processing.

If the lines interpolated by the above processing are represented by j2, j3, j5, j6, j8, and j9, as shown in FIG. 24, for example, interpolated image 2 is constituted by juxtaposing interpolated lines j2 (j=1 to ny) (see FIG. 25). The same applies to interpolated images 3, 5, 6, 8, and 9.

As described above, the processing is performed in the order from corresponding points with lower priority levels (with larger values n), and corresponding points with higher priority levels or with higher scores if the priority level remains the same are overwritten on those with lower priority levels, thus achieving interpolation processing which can take occlusion into account, as shown in FIG. 24. Note that a, b, and c represent pixels interpolated based on the corresponding points a1, b1, and c2, respectively.

When interpolated images are generated from a large number of input images using the above-mentioned arrangement and method, corresponding points, which could not be obtained from two images, are obtained, thus improving interpolation accuracy. Upon execution of the corresponding point searching processing, since the searching parameters are automatically determined using the photographing parameters, high-speed searching processing is realized. Since corresponding points are obtained from a large number of images, the problem of occlusion is solved, and the positional relationship between photographed objects in the direction of the line of sight is prevented from being reversed by the interpolation method utilizing the number of detected straight lines.

In the above description, the parallax in the up-and-down direction is omitted. However, multi-viewpoint images photographed from photographing positions in a matrix pattern on a plane, which are separated by a relatively large viewpoint interval, are held, these multi-viewpoint images are interpolated between viewpoints in the right-and-left direction, and are then interpolated between viewpoints in the up-and-down direction, thus generating images which take the parallax in the up-and-down direction into account.

A method of realizing higher-speed corresponding point searching processing in the image processing apparatus of this embodiment is described below.

In the corresponding point searching processing of this embodiment, the straight line searching is realized not only from the first line to the last line of the epipolar plane image but also from the last line to the first line. In this case, the searching range, the searching pitch, and the inclination of the straight line as the searching parameters for the latter searching process is obtained by attaching opposite signs to those for the former searching process to achieve straight line searching in two directions. In this manner, when corresponding points are searched upward and downward for one EPI, the corresponding point searching processing is performed at higher speed.

[Third Embodiment]

In an image processing apparatus to be exemplified below, even when a user moves his or her viewpoint in the up-and-down, back-and-forth, and right-and-left directions by changing his or her head position in the back-and-forth direction, the viewpoint position of an observer is detected and an image viewed from the observer is re-constructed so as to cope with smooth up-and-down, back-and-forth, and right-and-left movements of the viewpoint of the observer. For the sake of simplicity, the parallax in the up-and-down direction is omitted in the following description.

Figure 26:
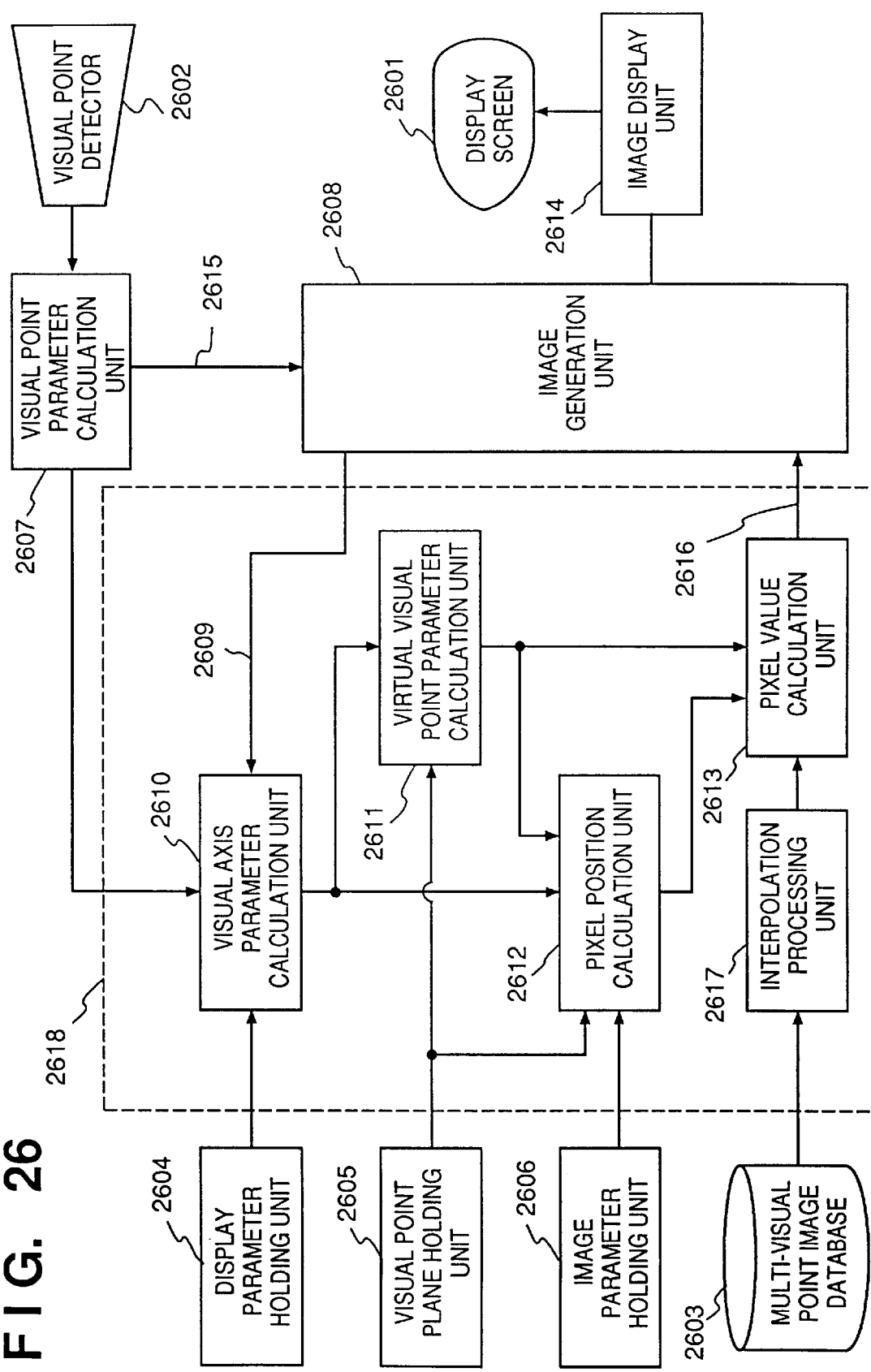
FIG. 26 is a block diagram showing an image display apparatus according to the third embodiment of the present invention.

FIG. 26 is a block diagram showing the arrangement of an image display apparatus according to the third embodiment of the present invention. Referring to FIG. 26, reference numeral 2601 denotes a display screen which is fixed in position, and displays images; 2602, a viewpoint detector for detecting the position of the eye of a user who watches the display screen 2601; and 2603, a multi-viewpoint image database which stores multi-viewpoint images obtained by photographing an object from viewpoints set on a plane at coarse intervals.

Reference numeral 2604 denotes a display parameter holding unit which holds parameters associated with the display screen 2601; 2605, a viewpoint plane holding unit which holds the plane (viewpoint plane) where the viewpoints are set upon photographing of images to be stored in the image database 2603; and 2606, an image parameter holding unit which holds image parameters of the images stored in the image database 2603 and images interpolated using the stored images.

Reference numeral 2607 denotes a viewpoint parameter calculation unit for calculating viewpoint parameters on the basis of a signal from the viewpoint detector 2602; 2608, an image generation unit for generating images corresponding to the movement of the viewpoint; 2609, an index signal indicating a pixel of interest; 2610, a line of sight parameter calculation unit for calculating the direction of the line of sight corresponding to the pixel indicated by the index signal 2609; 2611, a virtual viewpoint parameter calculation unit for calculating the intersecting point (virtual viewpoint) between the line of sight represented by the line of sight parameters and the viewpoint plane; 2612, a pixel position calculation unit for calculating a pixel position corresponding to the direction of the line of sight of an image at the virtual viewpoint on the basis of the line of sight parameters, the viewpoint plane, the virtual viewpoint parameters, and the image parameters; 2613, a pixel value calculation unit for calculating a corresponding pixel value on the basis of images held in the image database and images interpolated using the held images; and 2614, an image display unit for displaying images on the display screen 2601.

Reference numeral 2615 denotes an updating signal indicating that the viewpoint parameters are updated; and 2616, a pixel value signal indicating a pixel value. Reference numeral 2617 is an interpolation processing unit which is used in the second embodiment, and generates images at sufficiently fine viewpoint intervals using multi-viewpoint images photographed from viewpoints at coarse intervals.

The line of sight parameter calculation unit 2610, the virtual viewpoint parameter calculation unit 2611, the pixel position calculation unit 2612, the pixel value calculation unit 2613, and the interpolation processing unit 2617 together constitute a pixel value generation unit 2618.

The operation of the image display apparatus with the arrangement shown in FIG. 26 is briefly described below. When a user who watches the display screen 2601 moves his or her viewpoint by changing his or her head position, a signal from the viewpoint detector 2602 changes, and the viewpoint parameter calculation unit 2607 supplies an updating signal 2615 to the image generation unit 2608 in response to the change in signal. Upon reception of the updating signal 2615, the image generation unit 2608 begins to generate a new image corresponding to the viewpoint movement. The image generation unit 2608 acquires pixel value signals 2616 corresponding to index signals 2609 for all the pixels from the pixel value generation unit 2618. The pixel value generation unit 2618 acquires display parameters from the display parameter holding unit 2604, and calculates line of sight parameters corresponding to the index signals 2609. The virtual viewpoint parameter calculation unit 2611 acquires a viewpoint plane from the viewpoint plane holding unit 2605, and calculates virtual viewpoint parameters representing the intersecting point (virtual viewpoint) between the line of sight represented by the line of sight parameters, and the viewpoint plane.

On the other hand, the pixel position calculation unit 2612 acquires image parameters from the image parameter holding unit 2606, and calculates a pixel position corresponding to the direction of the line of sight of an image at the virtual viewpoint position on the basis of the line of sight parameters, the viewpoint plane, and the virtual viewpoint parameters in addition to the acquired image parameters. The pixel value calculation unit 2613 calculates a corresponding pixel value signal 2616 from images from the image database 2603 and interpolated images generated by the interpolation processing unit 2617 based on the images from the database 2603 on the basis of the pixel position and the virtual viewpoint parameters. When the image generation unit 2608 acquires pixel value signals 2616 for all the pixels from the pixel value calculation unit 2613, it sends the signals to the image display unit 2614. The image display unit 2614 displays the generated image corresponding to the new viewpoint on the display screen 2601.

As a result, even when a user moves his or her viewpoint in the back-and-forth, up-and-down, and right-and-left directions to a position other than the viewpoint positions where the images held in the image database 2603 are photographed, he or she can watch the image of the object corresponding to the viewpoint movement on the display screen 2601.

The processing operations of the respective units is described in detail below.

The processing of the line of sight parameter calculation unit 2610 is explained below with reference to FIGS. 27 and 28.

Figure 27:
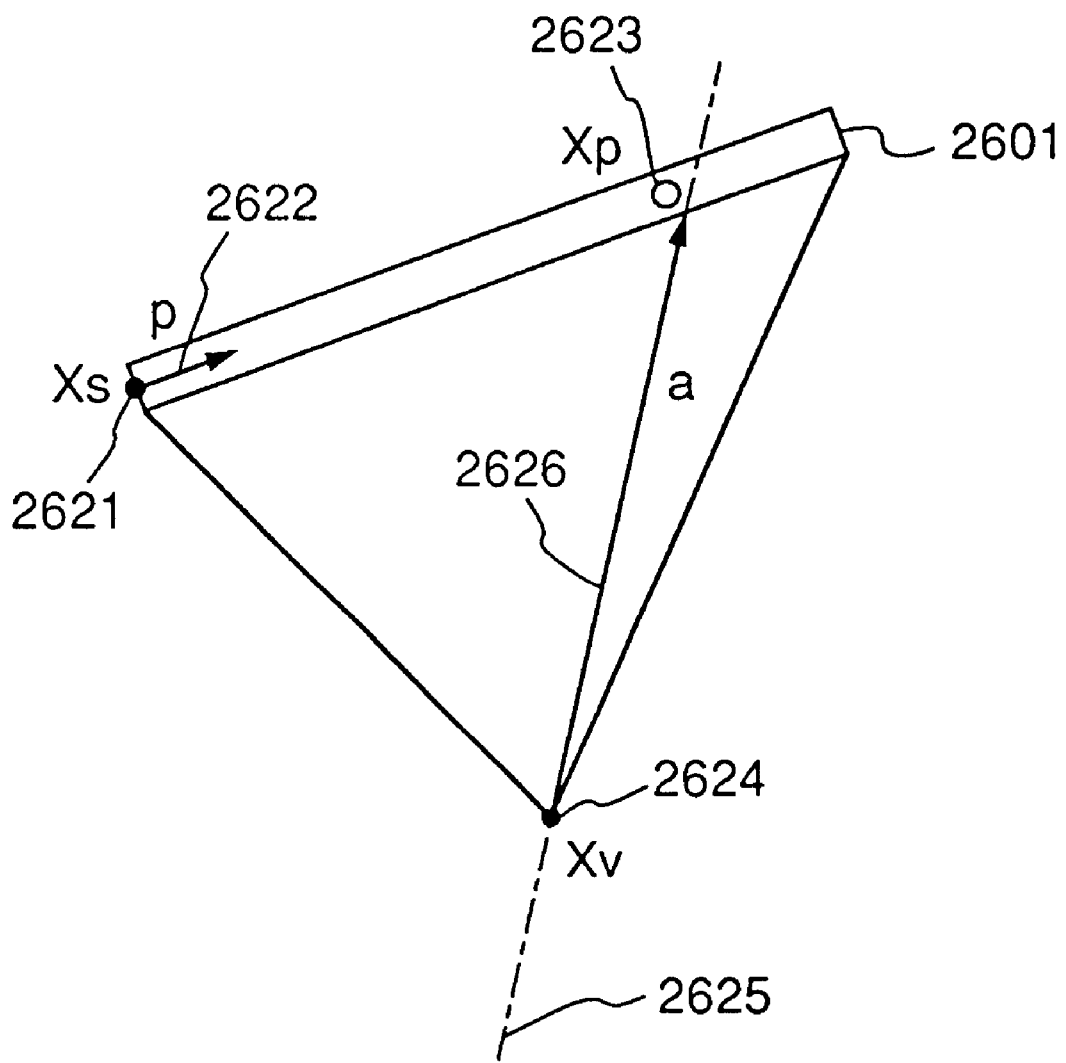
FIG. 27 is a view showing the calculation principle of a line of sight parameter calculation unit 2610 of the third embodiment.

FIG. 27 shows the calculation principle of the line of sight parameter calculation unit 2610. Reference numeral 2601 denotes a display screen; 2621, an end point (indicated by a position vector Xs) of the display screen 2601; 2622, a vector (indicated by a display screen vector p) which has a length matching the pixel pitch of the display screen 2601, and an inclination matching that of the display screen 2601; 2623, the position (indicated by a position vector Xp) of a pixel of interest on the display screen 2601; 2624, the viewpoint position (indicated by a position vector Xv) of a user; 2625, a line of sight corresponding to the position 2623 of the pixel of interest; and 2626, a line of sight vector (indicated by a vector a) representing the inclination of the line of sight 2625.

Figure 28:
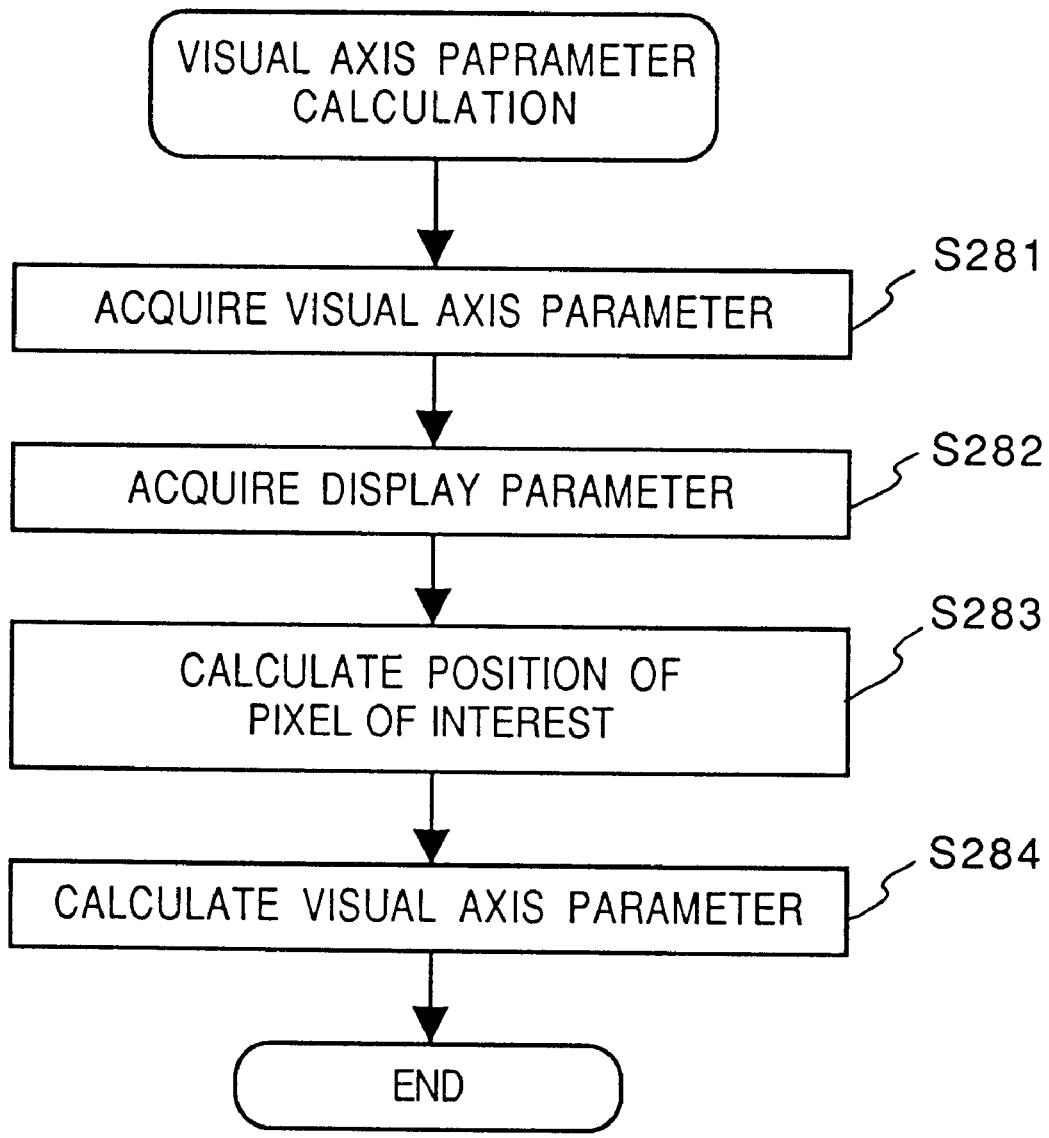
FIG. 28 is a flow chart showing the processing of the line of sight parameter calculation unit 2610.

FIG. 28 is a flow chart showing the processing of the line of sight parameter calculation unit 2610.

In step S281, viewpoint parameters are acquired from the viewpoint parameter calculation unit 2607. In this case, the viewpoint parameters include the viewpoint position 2624 of the user shown in FIG. 27. In step S182, display parameters are acquired from the display parameter holding unit 2604. In this case, the display parameters include the end point 2621 (vector Xs) of the display screen 2601, and the display screen vector 2622 (vector p). The display screen vector 2622 is determined by the inclination, actual size, and pixel size of the display screen. In step S183, the position 2623 of the pixel of interest on the display screen 2601 corresponding to the index signal 2609 is calculated using formula (4) below in accordance with the geometry shown in FIG. 27. Note that the index signal 2609 is represented by i:

$$Xp = Xs + i \cdot P \qquad (4)$$

In step S284, line of sight parameters corresponding to the direction of the pixel position 2623 viewed from the viewpoint position 2624 are calculated. The line of sight parameters include a set (Xv, a) of the viewpoint position 2624 and the line of sight vector 2626. The line of sight 2625 is defined by a straight line passing two points, i.e., the pixel position 2623 (vector Xp) and the viewpoint position 2624 (vector Xv) according to the geometry shown in FIG. 27, and the line of sight vector 2626 is calculated using formula (5) below:

$$a = Xp - Xv \qquad (5)$$

In this manner, the line of sight parameter calculation unit 2610 calculates the line of sight parameters.

The processing of the virtual viewpoint parameter calculation unit 2611 and the pixel position calculation unit 2612 is described below with reference to FIG. 29.

Figure 29:
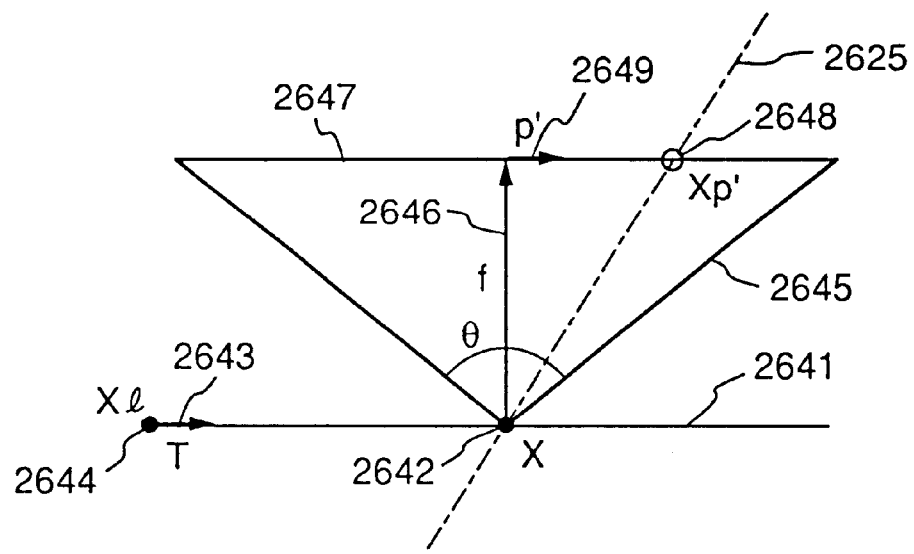
FIG. 29 is a view showing the calculation principle of a virtual viewpoint parameter calculation unit 2611 and a pixel position calculation unit 2612.

FIG. 29 shows the calculation principle of the virtual viewpoint parameter calculation unit 2611 and the pixel position calculation unit 2612. Reference numeral 2625 denotes the line of sight; 2641, a straight line representing a viewpoint array included in the viewpoint plane upon photographing of multi-viewpoint images stored in the image database 2603; 2642, the intersecting point (virtual viewpoint; indicated by a position vector X) between the line of sight 2625 and the straight line 2641; 2643, a vector (indicated by a viewpoint array vector T) representing the inclination of the straight line 2641; and 2644, an end point (indicated by a position vector X1) of the straight line 2641. Reference numeral 2645 denotes a view field with a field angle θ at the virtual viewpoint 2642; 2646, a vector (indicated by a focal point vector f) which has a length matching the focal length of the camera which photographs the multi-viewpoint images, and an inclination matching that of the camera; 2647, a virtual imaging plane at the virtual viewpoint 2642; 2648, a pixel position (indicated by a position vector Xp') as the intersecting point between the virtual imaging plane 2647 and the line of sight 2625; and 2649, a vector (indicated by an imaging plane vector p') which has a length matching the pixel pitch of the virtual imaging plane 2647 and has an inclination matching that of the virtual imaging plane 2647.

Note that the viewpoint array vector 2643 and the end point 2644 of the straight line 2641 are held in the viewpoint plane holding unit 2605 as values representing a photographing viewpoint array. The focal point vector 2646 and the imaging plane vector 2649 are held in the image parameter holding unit 2606 as image parameters. The focal point vector 2646 is determined by the focal length and the inclination of the camera which photographs multi-viewpoint images. The imaging plane vector 2649 is a vector which intersects the focal point vector 2646, and has a size equal to the cell size (the size of one pixel) of the imaging plane.

The processing of the virtual viewpoint parameter calculation unit 2611 is explained below with reference to FIG. 29. According to the geometry shown in FIG. 29, the virtual viewpoint 2642 is expressed by formulas (6) and (7) below:

$$X = Xl + t \sim T \quad (6)$$

$$X = Xv + \alpha \cdot a \quad (7)$$

where t is a virtual viewpoint parameter which uniquely represents the virtual viewpoint, and a is a coefficient of the direction of the line of sight. The parameter t is calculated by solving formulas (6) and (7) to calculate the virtual viewpoint X.

The processing of the pixel position calculation unit 2612 is described below with reference to FIG. 29. According to the geometry shown in FIG. 29, the pixel position 2648 is expressed by formulas (8) and (9) below:

$$XP' = x + f = i' \cdot p \quad (8)$$

$$XP' = x + \beta \cdot a \quad (9)$$

where i' is a pixel position parameter which uniquely represents the pixel position 2648, and β is a coefficient of the direction of the line of sight. The parameter i' is calculated by solving formulas (8) and (9), and is used as the output from the pixel position calculation unit 2612.

The processing of the pixel value calculation unit 2613 is described in detail below.

In this embodiment, the image database 2603 holds a plurality of images obtained by photographing a single object from viewpoints at coarse intervals, and the interpolation processing unit 2617 obtains interpolated images which are interpolated at sufficiently fine intervals using the held images. The interpolation processing is performed in a manner described in the second embodiment. First, as an approximate image of the image from the virtual viewpoint 2642 represented by the virtual viewpoint parameter t calculated by the virtual viewpoint parameter calculation unit 2611, an image photographed from a viewpoint closest to the virtual viewpoint 2642 is acquired from the image database 2603. The interpolation processing unit 2617 generates an interpolated image based on the acquired image. Of this image, the value of a pixel at a position closest to the pixel position 2648 calculated by the pixel position calculation unit 2612 is acquired, and is output as the pixel value signal 2616.

In the above description, the parallax in the up-and-down direction is omitted for the sake of simplicity. When images photographed while moving the viewpoint in the up-and-down direction are prepared, a binocular stereoscopic display apparatus which moves the viewpoint in the up-and-down and right-and-left directions while taking the parallax in the up-and-down direction into account, is realized by the above-mentioned method.

When interpolated images are generated from a large number of input images using the above-mentioned arrangement and method, corresponding points, which cannot be obtained from two images, is detected, thus improving interpolation accuracy. Upon execution of corresponding point searching processing, since searching parameters are automatically determined using photographing parameters, high-speed searching processing is realized. Since corresponding points are obtained from a large number of images, the problem of occlusion is solved, as described above, and the positional relationship between the photographed objects in the direction of the line of sight is prevented from being reversed since the interpolation method using the number of detected straight lines is used. Since interpolated images obtained as described above are displayed in correspondence with the viewpoint of an observer, the image display apparatus of this embodiment smoothly moves an image with high accuracy upon movement of the viewpoint of the observer.

When the display screen 2601 and the image display unit 2614 comprise a stereoscopic display screen and a stereoscopic image display unit which attains a binocular stereoscopic view by, e.g., a lenticular or glasses system, the viewpoint parameter calculation unit 2607 calculates viewpoint parameters corresponding to the positions of the right and left eyes, and the image generation unit 2608 generates images presented for the right and left eyes, a binocular stereoscopic display apparatus which moves the viewpoint in the back-and-forth, up-and-down, and right-and-left directions is realized.

[Fourth Embodiment]

In an image display apparatus to be exemplified below, the display screen 2601 in the third embodiment comprises a so-called a head-mounted display (HMD) which is fixed to the head portion of a user.

In the arrangement of this embodiment, only the processing contents of the line of sight parameter calculation unit 2610 in the arrangement of the third embodiment are replaced by processing to be described below. In the following description, the parallax in the up-and-down direction is omitted.

Figure 30:
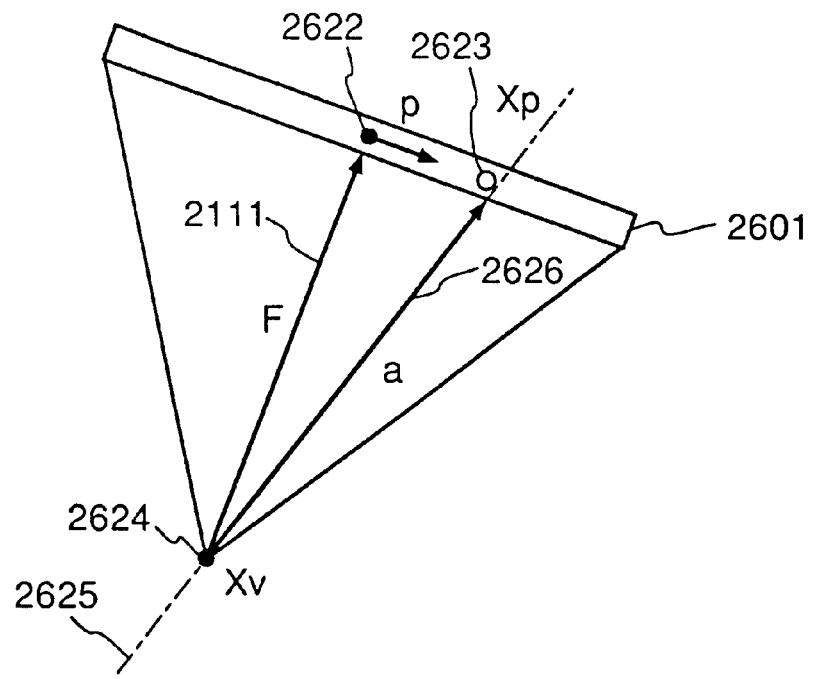
FIG. 30 is a view showing the calculation principle of a line of sight parameter calculation unit 2610 according to the fourth embodiment of the present invention.

FIG. 30 shows the calculation principle of the line of sight parameter calculation unit 2610 of this embodiment. Reference numeral 2601 denotes a display screen; 2622, a vector (display screen vector p) which has a length matching the pixel pitch of the display screen 2601, and an inclination matching that of the display screen 2601; 2623, the position (position vector Xp) of a pixel of interest on the display screen 2601; 2624, the viewpoint position (position vector Xv) of a user; 2111, a vector (front side vector F) from the viewpoint position 2624 to the central point on the display screen 2601; 2625, a line of sight corresponding to the position 2623 of the pixel of interest; and 2626, a line of sight vector (vector a) representing the inclination of the line of sight 2625.

The processing of the line of sight parameter calculation unit 2610 is described below with reference to FIG. 30. In the HMD type display apparatus, the viewpoint detector 2602 detects the inclination in the direction of the front side, i.e., the inclination of the front side vector 2111 in addition to the position of the viewpoint 2624 of the user. The inclination of the display screen 2601 is determined by the inclination of the front side vector 2111 (normally, a right angle). On the other hand, the distance from the viewpoint position 2624 to the display screen 2601, i.e., the length of the front side vector 2111, and the pixel pitch, i.e., the length of the display screen vector 2622 have fixed values determined by the shape of the HMD, and these values are held in the display parameter holding unit 2604. According to the geometry shown in FIG. 30, the position 2623 (vector Xp)

of the pixel of interest and the line of sight vector 2626 (vector a) are calculated using the following formulas:

$$Xp=Xv+F+i\cdot p \quad (10)$$

$$a=Xp-Xv \quad (11)$$

where i is the index signal 2609.

When the pixel position and the line of sight are calculated by the viewpoint parameter calculation unit 2610, as described above, and other arrangement and processing are attained in the same manner as in the second embodiment, an HMD type image display apparatus which can move and display multi-viewpoint image at an arbitrary viewpoint is realized.

In place of the display screen 2601 fixed to the head portion of a user, when the present invention is applied to a cockpit type display apparatus which is fixed in position and in which the relative positional relationship between the display screen 2601 and the viewpoint position 2624 of a user is fixed, an image display apparatus which displays an image moved to an arbitrary viewpoint is realized by the same processing of the visual parameter calculation unit 2601 as in this embodiment. In this case, in place of the viewpoint detector 2602, a viewpoint position input device for moving the viewpoint position 2624 on a reference coordinate system using, e.g., a steering wheel is used.

When interpolated images are generated from a large number of input images using the above-mentioned arrangement and method, corresponding points, which cannot be obtained from two images, are detected, thus improving interpolation accuracy. Upon execution of corresponding point searching processing, since searching parameters are automatically determined using photographing parameters, high-speed searching processing is realized. Since corresponding points are obtained from a large number of images, the problem of occlusion is solved, as described above, and the positional relationship between the photographed objects in the direction of the line of sight is prevented from being reversed since the interpolation method using the number of detected straight lines is used. Since interpolated images obtained as described above are displayed in correspondence with the viewpoint of an observer, an image can be smoothly moved with high accuracy upon movement of the viewpoint of the observer according to the HMD of this embodiment.

In each of the second to fourth embodiments, multi-viewpoint images which are photographed in advance and images interpolated using the stored images are held in the image database 2603. When the image database is replaced by a multi-eye television camera which fetches multi-viewpoint images in real time, an arbitrary viewpoint image real-time photographing/display system is realized.

With the above arrangement, even when the positional relationship between objects in the direction of the line of sight is reversed, the apparatus of each of the above embodiment generates interpolated images with high accuracy. Since corresponding point searching parameters are automatically determined, high-speed interpolation processing is realized. By re-constructing images corresponding to the viewpoint movement in the back-and-forth direction using a large number of images generated by the interpolation processing or multi-viewpoint images photographed by moving a viewpoint at sufficiently fine intervals, a viewpoint movement in the back-and-forth direction, which cannot be realized by the conventional system, is realized.

Note that the present invention may be applied to a stand-alone type image processing apparatus, a system such as a multi-viewpoint television system, a multi-viewpoint video telephone terminal, a multi-viewpoint video meeting system, and the like, or a composite apparatus as a combination of a computer and another image processing apparatus.

[Fifth Embodiment]
<Arrangement of Apparatus>

Figure 31:
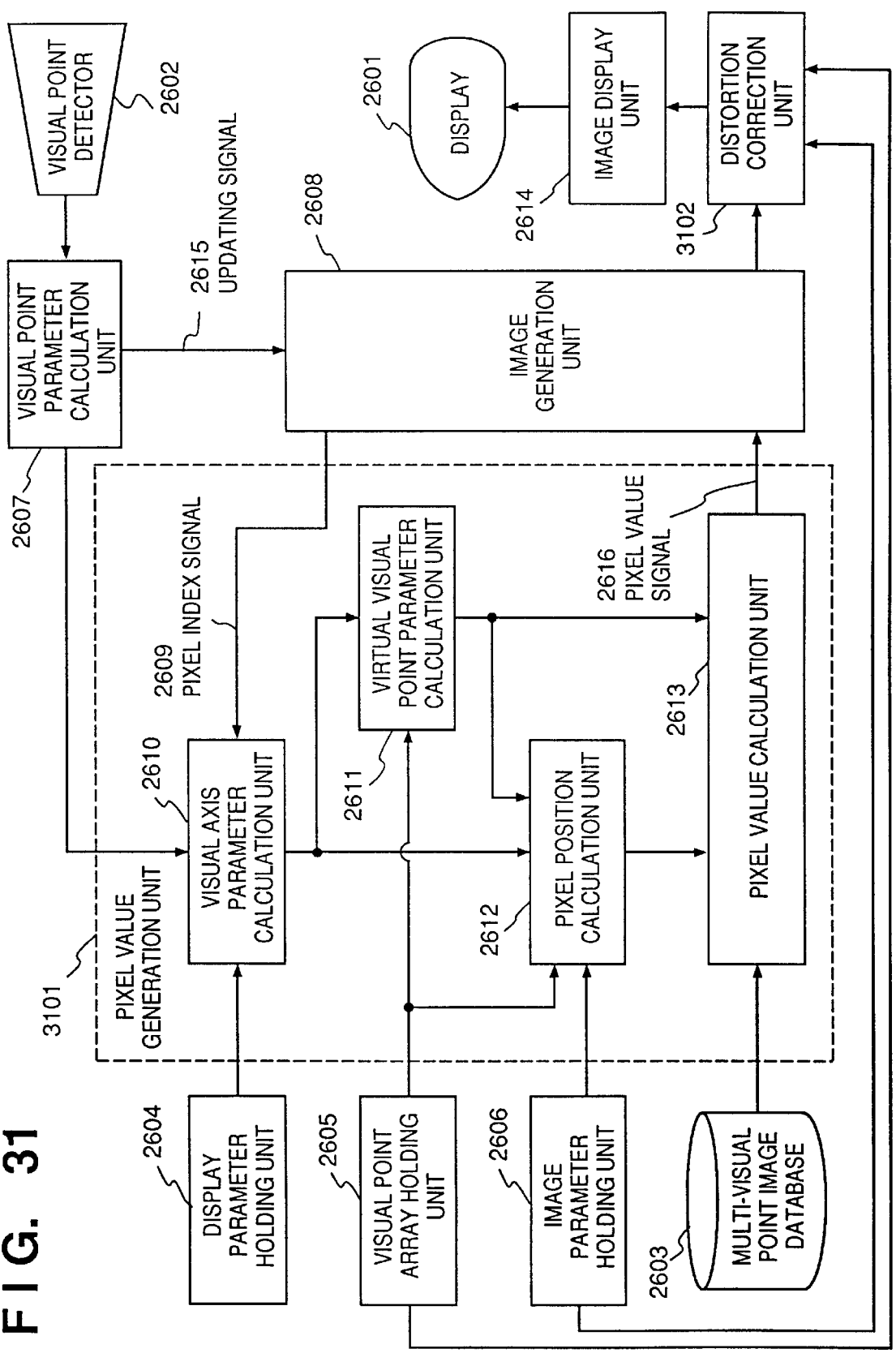
FIG. 31 is a block diagram showing the arrangement of an image processing apparatus according to the fifth embodiment of the present invention.

FIG. 31 is a block diagram showing the arrangement of an image processing apparatus according to the fifth embodiment of the present invention. Referring to FIG. 31, reference numeral 2601 denotes a display screen which is fixed in position, and displays images; 2602, a viewpoint detector for detecting the position of the eye of a user who watches the display screen 2601; and 2603, a multi-viewpoint image database which stores multi-viewpoint images obtained by photographing an object from viewpoints set on a straight line at sufficiently fine intervals. Reference numeral 2604 denotes a display parameter holding unit which holds parameters associated with the display screen 2601; 2605, a viewpoint array holding unit which holds a straight line (to be referred to as a viewpoint array hereinafter) including the viewpoint array upon photographing of images to be stored in the image database 2603; and 2606, an image parameter holding unit which holds image parameters of multi-viewpoint images stored in the image database 2603.

Reference numeral 2607 denotes a viewpoint parameter calculation unit for calculating viewpoint parameters on the basis of a signal from the viewpoint detector 2602; 2608, an image generation unit for generating images corresponding to the movement of the viewpoint; 2609, an index signal indicating a pixel of interest; 2610, a line of sight parameter calculation unit for calculating the direction of the line of sight corresponding to the pixel indicated by the index signal 2609; 2611, a virtual viewpoint parameter calculation unit for calculating the intersecting point (virtual viewpoint) between the line of sight represented by the line of sight parameters and the viewpoint array; 2612, a pixel position calculation unit for calculating a pixel position corresponding to the direction of the line of sight of an image at the virtual viewpoint on the basis of the line of sight parameters, the viewpoint array, the virtual viewpoint parameters, and the image parameters; 2613, a pixel value calculation unit for calculating a corresponding pixel value from the multi-viewpoint images held in the image database 2603 on the basis of the pixel position and the virtual viewpoint parameter; and 2614, an image display unit for displaying images on the display screen 2601. Reference numeral 2615 denotes an updating signal indicating that the viewpoint parameters are updated; and 2616, a pixel value signal. The line of sight parameter calculation unit 2610, the virtual viewpoint parameter calculation unit 2611, the pixel position calculation unit 2612, and the pixel value calculation unit 2613 constitute a pixel value generation unit 3101. Reference numeral 3102 denotes a distortion correction unit for correcting any distortion in the up-and-down direction.

Note that the image database 2603 holds images obtained by photographing an object to be displayed from a large number of viewpoints set on a straight line at sufficiently fine intervals. On the other hand, data held in the viewpoint array holding unit 2605 are those representing the straight line including the viewpoint array upon photographing of these images. The image generation unit 2608 generates an image upon reception of the updating signal 2615. The image generation unit 2608 outputs the index signal 2609 indicating the coordinates of a pixel of interest on a re-constructed image, i.e., an image on the display screen 2601. The index signal 2609 is sequentially output to circulate all pixels of the re-constructed image upon re-construction of an image.

<Operation of Apparatus>

The operation of this embodiment is described below. First, an outline of the operation will be explained below.

When a user who watches the display screen 2601 moves his or her viewpoint by changing his or her head position, a signal from the viewpoint detector 2602 changes, and the viewpoint parameter calculation unit 2607 supplies an updating signal 2615 to the image generation unit 2608 in response to the change in signal. Upon reception of the updating signal 2615, the image generation unit 2608 begins to generate a new image corresponding to the viewpoint movement. The new image is generated as follows. That is, the image generation unit 2608 sequentially outputs index signals 2609 for all the pixels, and the pixel value generation unit 3101 sequentially acquires pixel value signals 2616 in units of pixels. The operation of the pixel value generation unit 3101 described below.

[Operation of Pixel Value Generation Unit]

In the pixel value generation unit 3101, the line of sight parameter calculation unit 2610 acquires viewpoint parameters from the viewpoint parameter calculation unit 2607, and display parameters from the display parameter holding unit 2604, and calculates line of sight parameters corresponding to the input index signal 2609. The virtual viewpoint parameter calculation unit 2611 acquires a viewpoint array from the viewpoint array holding unit 2605, and calculates virtual viewpoint parameters representing the intersecting point (virtual viewpoint) between the line of sight represented by the line of sight parameters, and the viewpoint array. On the other hand, the pixel value calculation unit 2613 acquires image parameters from the image parameter holding unit 2606, and calculates a pixel position, corresponding to the direction of the line of sight, of an image at the virtual viewpoint on the basis of the line of sight parameter, the viewpoint array, and the virtual viewpoint parameters in addition to the acquired image parameters. The pixel value calculation unit 2613 calculates a corresponding pixel value signal 2616 from images in the image database 2603 on the basis of the pixel position and the virtual viewpoint parameters. In this manner, the pixel value generation unit 3101 calculates the pixel value signal 2616 for each input index signal 2609, and outputs the calculated signal to the image generation unit 2608.

[Processing of Generated Pixel Value]

When the image generation unit 2608 obtains the pixel value signals 2616 for all the pixels from the pixel value calculation unit 2613, it sends these signals to the distortion correction unit 3102. The distortion correction unit 3102 enlarges or reduces the image in the up-and-down direction to correct any distortion, in the up-and-down direction of the generated image, and outputs the corrected image to the image display unit 2614. The image display unit 2614 displays the generated image corresponding to the new viewpoint on the display screen 2601. In this manner, a series of image generation operations upon viewpoint movement of a user are completed. As will be apparent from the following description, when a user moves his or her viewpoint in the back-and-forth and right-and-left directions, he or she can watch the image of the object corresponding to the viewpoint movement even if the current viewpoint position deviates from the viewpoints where the images held in the image database 2603 are photographed.

The processing of the respective units is described in detail below with reference to FIGS. 31 to 35 and FIG. 45.

[Calculation of Visual Axis Parameters (Step S431 in FIG. 45)]

The line of sight parameter calculation processing in the line of sight parameter calculation unit 2610 will be described below.

Figure 32:
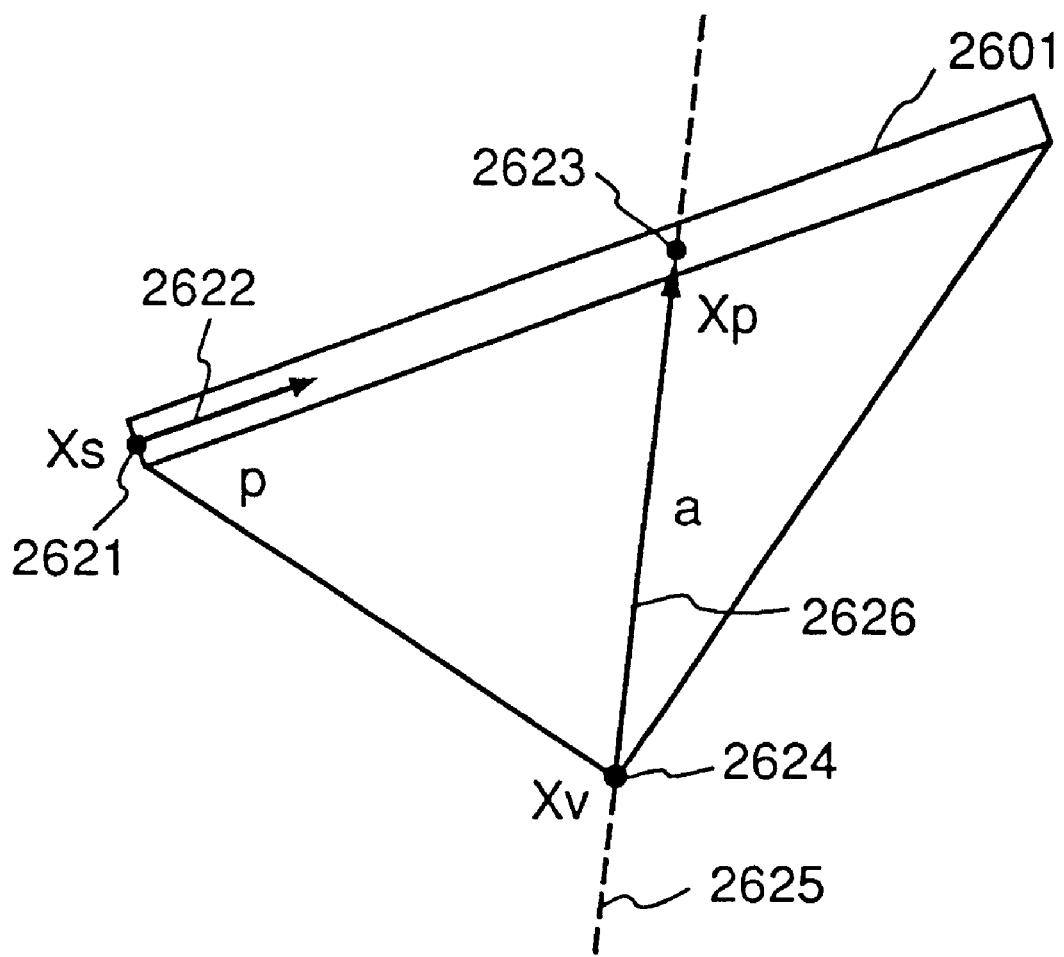
FIG. 32 is a view showing the calculation principle of a line of sight parameter calculation unit 2610 in the image processing apparatus of the fifth embodiment.

FIG. 32 shows the calculation principle of the line of sight parameter calculation unit 2610 in the image processing apparatus of the fifth embodiment. Referring to FIG. 32, reference numeral 2621 denotes an end point of the display screen 2601; 2622, a display screen vector which has a length matching the pixel pitch of the display screen 2601, and an inclination matching that of the display screen 2601; 2623, the position of a pixel of interest on the display screen 2601; 2624, the viewpoint position of a user; 2625, a line of sight corresponding to the position 2623 of the pixel of interest; and 2626, a line of sight vector representing the inclination of the line of sight 2625.

Note that the end point 2621, the position 2623 of the pixel of interest, the viewpoint position 2624 of the user, the display screen vector 2622, and the line of sight vector 2626 are respectively represented by vectors Xs, Xp, Xv, p, and a. Vector components in the up-and-down direction are ignored, and processing is performed in a plane defined by the right-and-left and back-and-forth directions.

Figure 33:
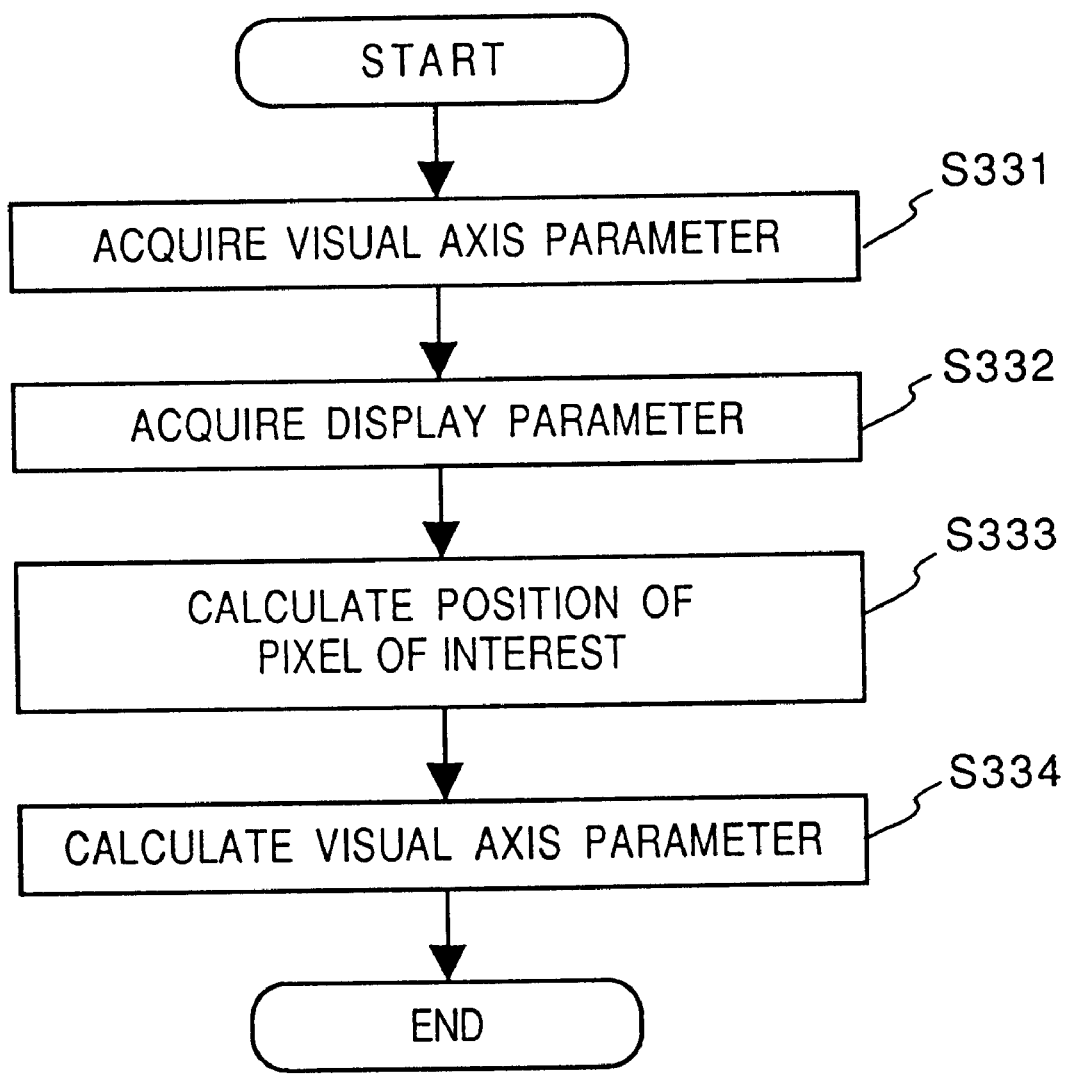
FIG. 33 is a flow chart showing the processing of the line of sight parameter calculation unit 2610 in the image processing apparatus of the fifth embodiment.

FIG. 33 is a flow chart showing the processing of the line of sight parameter calculation unit 2610 in the image processing apparatus of the fifth embodiment.

In step S331, viewpoint parameters are acquired from the viewpoint parameter calculation unit 2607. In this case, the viewpoint parameters include the viewpoint position 2624 of the user shown in FIG. 32.

In step S332, display parameters are acquired from the display parameter holding unit 2604. In this case, the display parameters are expressed by the end point 2621 of the display screen 2601, and the display screen vector 2622. The display screen vector 2622 is determined by the inclination, actual size, and pixel size of the display screen 2601. In step S333, the position 2623 of the pixel of interest on the display screen 2601 corresponding to the index signal 2609 is calculated using formula (12) below on the basis of the arrangement shown in FIG. 32:

$$Xp = Xs + i \cdot p \qquad (12)$$

where i is the index signal 2609.

In step S334, line of sight parameters corresponding to the direction of the pixel position 2623 viewed from the viewpoint position 2624 of the user are calculated. The line of sight parameters are expressed by a set (Xv, a) of the viewpoint position 2624 and the line of sight vector 2626. Since the line of sight 2625 is defined by a straight line passing two points, i.e., the position 2623 of the pixel of interest and the viewpoint position 2624 of the user, the line of sight vector 2626 can be calculated using formula (13) below:

$$a = Xp - Xv \qquad (13)$$

[Calculation of Pixel Position and Virtual Visual Point (Step S452 in FIG. 45)]

The processing of the virtual viewpoint parameter calculation unit 2611 and the pixel position calculation unit 2612 is described below with reference to FIG. 34.

Figure 34:
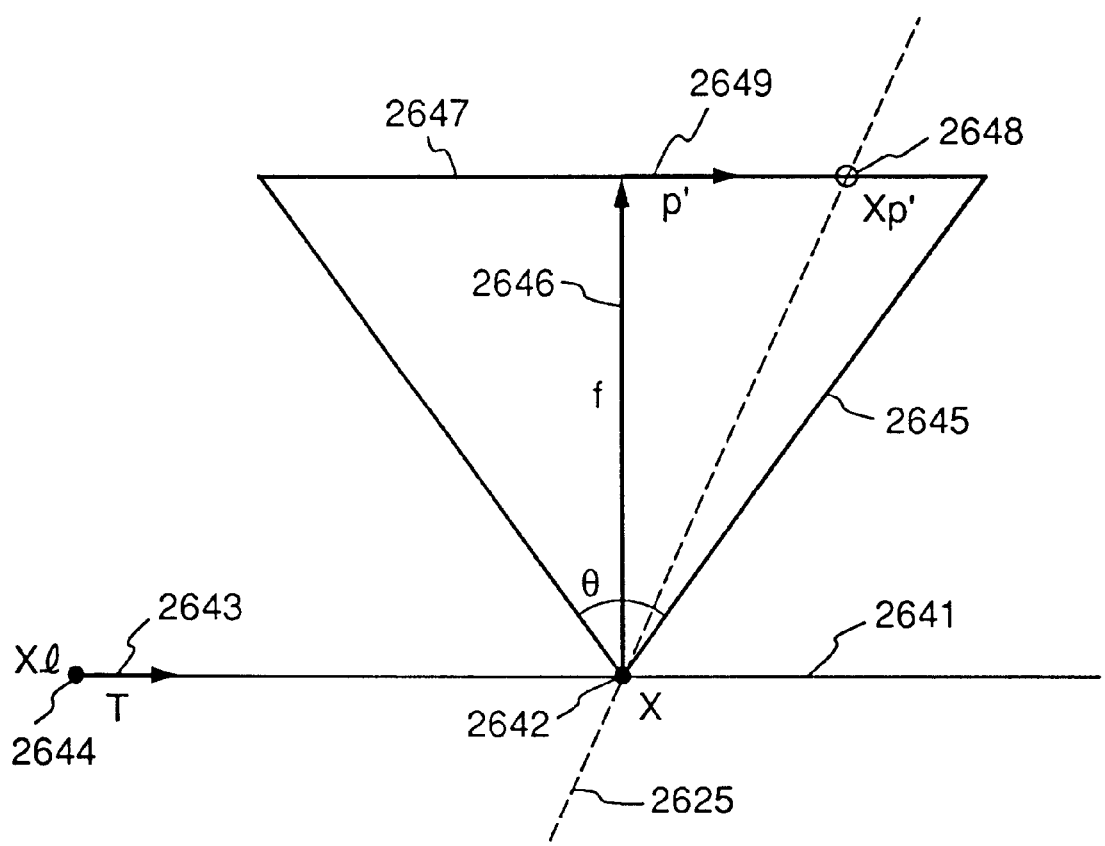
FIG. 34 is a view showing the calculation principle of a virtual viewpoint parameter calculation unit 2611 and a pixel position calculation unit 2612 in the image processing apparatus of the fifth embodiment.

FIG. 34 shows the calculation principle of the virtual viewpoint parameter calculation unit 2611 and the pixel position calculation unit 2612 in the image processing apparatus of the fifth embodiment. Referring to FIG. 34, reference numeral 2641 denotes a straight line including the viewpoint array upon photographing of multi-viewpoint images stored in the image database 2603; 2642, a virtual viewpoint as the intersecting point between the line of sight 2625 and the straight line 2641; 2643, a viewpoint array vector representing the inclination of the straight line 2641; and 2644, an end point of the straight line 2641. Reference numeral 2645 denotes a view field with a field angle θ at the virtual viewpoint 2642; 2646, a focal point vector having a length matching the focal length of the camera which photographs the multi-viewpoint images, and an inclination matching that of the camera; 2647, a virtual imaging plane at the virtual viewpoint 2642; 2648, a pixel position as the intersecting point between the virtual imaging plane 2647 and the line of sight 2625; and 2649, an imaging plane vector which has a length matching the pixel pitch of the virtual imaging plane 2647 and an inclination matching that of the virtual imaging plane 2647 (normally, perpendicular to the focal point vector 2646).

Note that the virtual viewpoint 2642, the virtual point array vector 2643, the end point 2644, the focal point vector 2646, the pixel position 2648, and the imaging plane vector 2649 are respectively expressed by vectors X, T, Xl, f, Xp', and p'. For the sake of simplicity, vector components in the up-and-down direction are ignored, and processing is performed in a plane defined by the right-and-left and back-and-forth directions.

Note that the viewpoint array vector 2643 and the end point 2644 are held in the viewpoint array holding unit 2605 as values representing the straight line 2641. The focal point vector 2646 and the imaging plane vector 2649 are held in the image parameter holding unit 2606 as image parameters. The size of the imaging plane vector 2649 is equal to the cell size (the size of one pixel) of an actual imaging plane. On the other hand, the straight line 2641 is set to be parallel to the display screen vector 2622.

When the respective points and vectors are expressed, as described above, the virtual viewpoint 2642 is expressed by formulas (14) and (15) below:

$$X = Xl + t \cdot T \qquad (14)$$

$$X = Xv + \alpha \cdot a \qquad (15)$$

where t is a virtual viewpoint parameter which uniquely represents the virtual viewpoint, and a is a coefficient of the direction of the line of sight. The virtual viewpoint parameter calculation unit 2611 calculates the virtual viewpoint parameter t by solving formulas (14) and (15) to calculate the virtual viewpoint position vector X.

The pixel position 2648 is expressed by formulas (16) and (17) below:

$$Xp' = X + f + i'' p' \qquad (16)$$

$$Xp' = X + \beta \cdot a \qquad (17)$$

where i' is a pixel position parameter which uniquely represents the pixel position 2648, and β is a coefficient of the direction of the line of sight. The pixel position calculation unit 2612 calculates the pixel position parameter i' by solving formulas (16) and (17), and outputs the calculated parameter.

[Calculation of Pixel Value (Step S453 in FIG. 45)]

The processing of the pixel value calculation unit 2613 is described in detail below.

In this embodiment, the image database 2603 holds multi-viewpoint images photographed from viewpoints set at sufficiently fine intervals. As an approximate image of the image from the virtual viewpoint 2642 represented by the virtual viewpoint parameter t calculated by the virtual viewpoint parameter calculation unit 2611, an image photographed from a viewpoint closest to the virtual viewpoint 2642 is found from the image database 2603. Of this image, the value of a pixel at a position closest to the position 2648 of the pixel of interest calculated by the pixel position calculation unit 2612 is acquired, and is output as the pixel value signal 2616.

[Distortion Correction (Step S454 in FIG. 45)]

The processing of the distortion correction unit 3102 is described in detail below. Since images stored in the image database 2603 are photographed by changing the viewpoint in the right-and-left direction, they have no parallax information in the up-and-down direction. For this reason, the image generation unit 2608 cannot optically perfectly re-construct an image corresponding to viewpoint movement in the back-and-forth direction, and the reconstructed image is distorted in the up-and-down direction. The distortion correction unit 3102 enlarges or reduces the image in the up-and-down direction in correspondence with the viewpoint position 2624 of the user, thereby correcting the distortion of an image of an object separated from the straight line 2641 by a specific distance.

Figure 35:
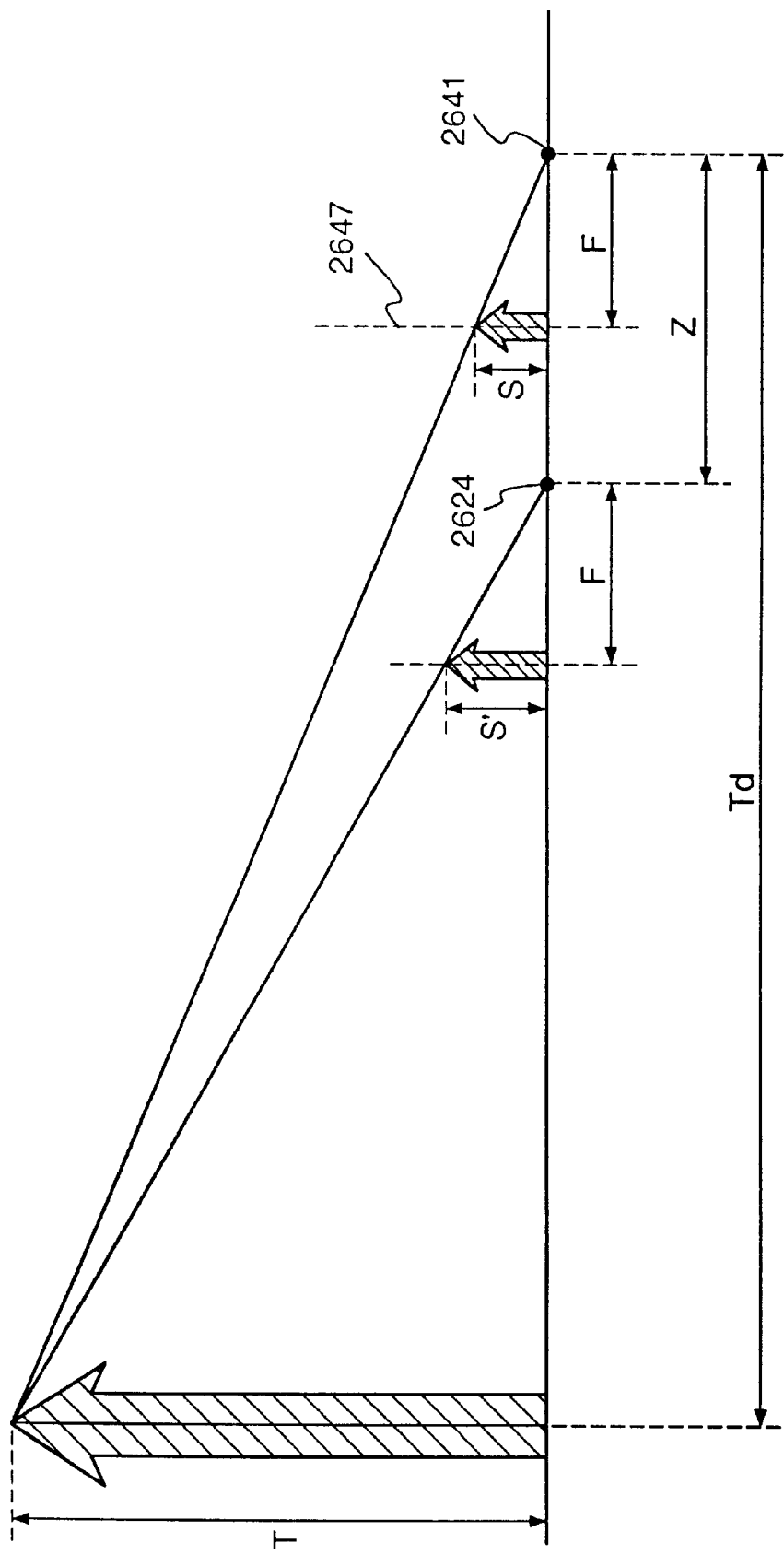
FIG. 35 is a view showing the principle of a distortion correction unit 3102 in the image processing apparatus of the fifth embodiment.

FIG. 35 shows the principle of the distortion correction unit 3102. Referring to FIG. 35, reference symbol T denotes the height of a given object; Td, the distance to the object; F, the focal length of the camera; S (capital letter), the height of a photographed image of the object; z, the viewpoint moving distance in the back-and-forth direction; and S' (capital letter), the height of a re-constructed image of the object.

When the respective values are expressed, as described above, formulas (18) and (19) below are established:

$$S/F = T/Td \qquad (18)$$

$$S'/F = T/(Td - z) \qquad (19)$$

Solving formulas (18) and (19) yields formula (20):

$$K = S'/S = Td/(Td - z) \qquad (20)$$

where k is the degree of distortion representing the distortion in the up-and-down direction. The distortion correction unit 3102 sets, as the viewpoint moving distance z, a difference between the coordinate value, in the back-and-forth direction, of the viewpoint position 2624 of the user obtained from the viewpoint parameter calculation unit 2607, and the coordinate value, in the back-and-forth direction, of the straight line 2641 obtained from the viewpoint array holding unit 2605. On the other hand, the image parameter holding unit 2606 holds the value of a rough distance to the point of interest (or the in-focus point) of the photographed object as the distance Td. The distortion correction unit 3102 acquires this value from the image parameter holding unit 2606. The distortion correction unit 3102 calculates the degree of distortion by solving formula (20), and enlarges or reduces the image received from the image generation unit 2608 by a factor of the degree of distortion. The distortion correction unit 3102 outputs the corrected image to the image display unit 2614.

As described above, the image processing apparatus of this embodiment can display an image corresponding to the viewpoint position even when the viewpoint position of an observer moves not only in a direction parallel to the straight line including the viewpoint array but also in the back-and-forth direction.

More specifically, when the position of the eye of an observer is detected, and an image viewed from the observer is re-constructed using a plurality of images, an image corresponding to movement of the viewpoint of the observer is smoothly output. Furthermore, a viewpoint movement in the back-and-forth direction, which cannot be realized by the conventional system, is realized.

When the display screen 2601 and the image display unit 2614 comprise a stereoscopic display screen and a stereoscopic image display unit which attains a binocular stereoscopic view by, e.g., a lenticular or glasses system, the viewpoint parameter calculation unit 2607 calculates viewpoint parameters corresponding to the positions of the right and left eyes, and the image generation unit 2608 generates images presented for the right and left eyes, a binocular stereoscopic display apparatus which moves the viewpoint in the back-and-forth and right-and-left directions is realized.

In addition, not only the distortion, in the up-and-down direction of an image, but also the distortion, in the right-and-left direction of an image is corrected in correspondence with the viewpoint position by the above-mentioned method.

[Sixth Embodiment]

An image display apparatus which freely displays images corresponding to line of sight movement even when the viewpoint interval of images held in the image database 2603 is not sufficiently fine is explained below.

Figure 36:
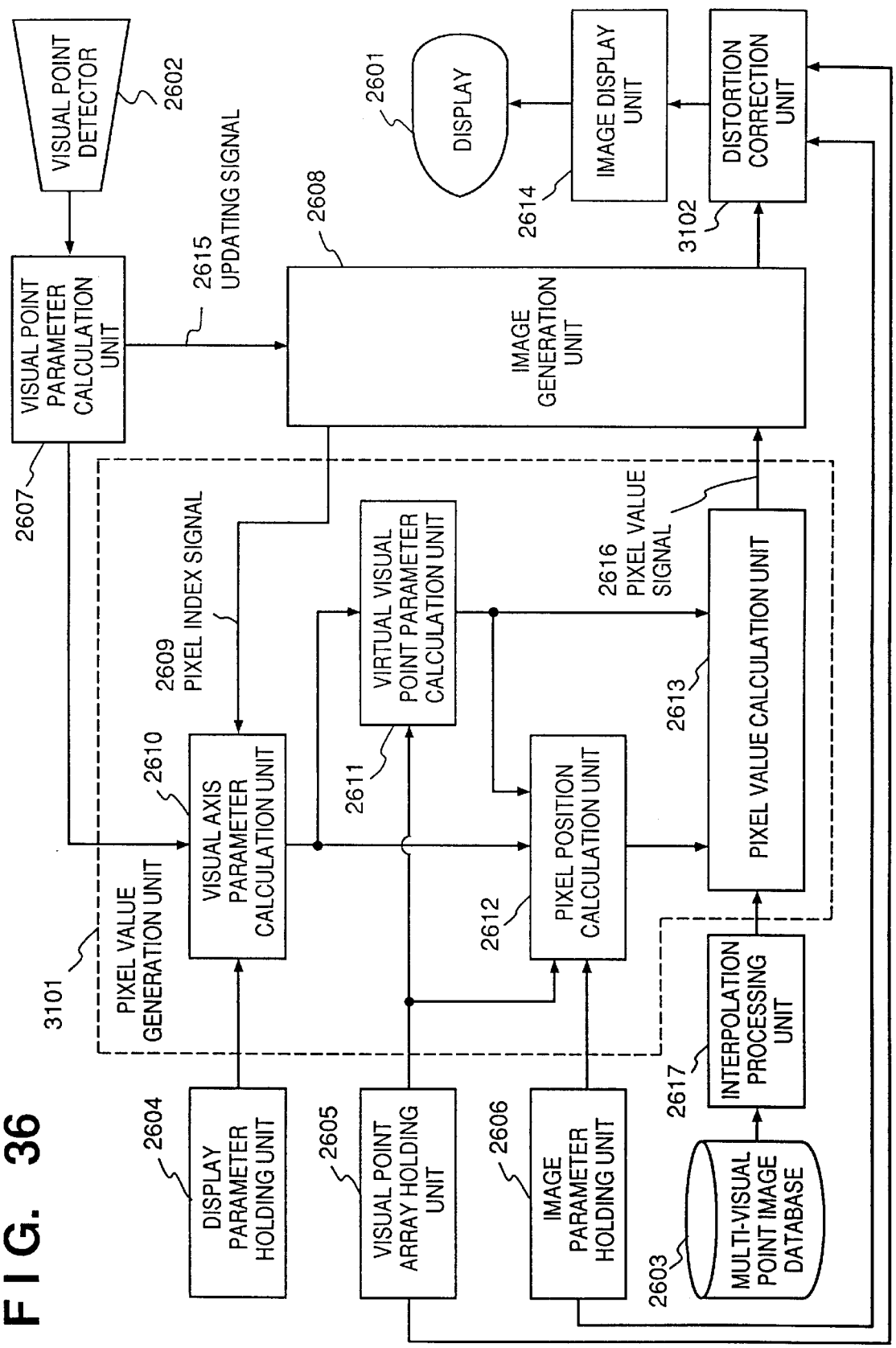
FIG. 36 is a block diagram showing an image processing apparatus according to the sixth embodiment of the present invention.

FIG. 36 is a block diagram showing the arrangement of an image processing apparatus of this embodiment. The same reference numerals in FIG. 36 denote the same parts as in the fifth embodiment, and a detailed description thereof is omitted. In this image processing apparatus, an interpolation processing unit 2617 is arranged between the image database 2603 and the pixel value calculation unit 2613. The interpolation processing unit 2617 generates a group of images with sufficiently fine viewpoint intervals by executing interpolation processing using images which are photographed from viewpoints set at coarse intervals and stored in the image data base 2603. Using the interpolated images with sufficiently fine viewpoint intervals, an image corresponding to a change in viewpoint of a user is generated as in the fifth embodiment. The image database 2603 holds images from photographing viewpoints aligned on a straight line in the right-and-left direction. The interpolation processing unit 2617 is described in detail below with reference to FIGS. 37 to 42.

Figure 37:
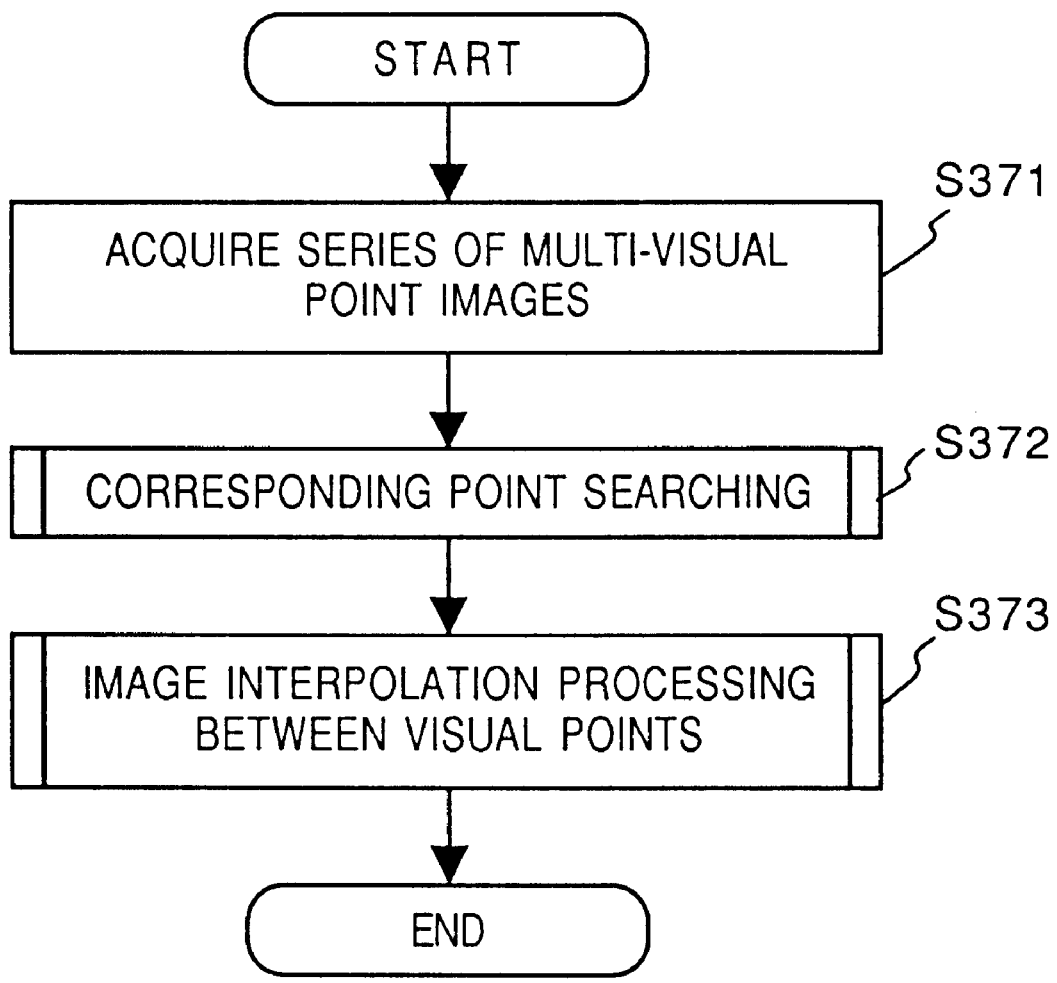
FIG. 37 is a flow chart showing the processing of a viewpoint interpolation processing unit in the image processing apparatus of the sixth embodiment.

FIG. 37 is a flow chart showing the flow of the processing of the interpolation processing unit 2617 of this embodiment.

In step S371, a group of images photographed at coarse viewpoint intervals are acquired from the image database 2603. In step S372, corresponding point searching (motion vector detection) processing among images is performed. Upon completion of the corresponding point searching processing, the flow advances to step S373 to perform interpolation processing of images between viewpoints, thus obtaining multi-viewpoint images with sufficiently fine viewpoint intervals.

Figure 38:
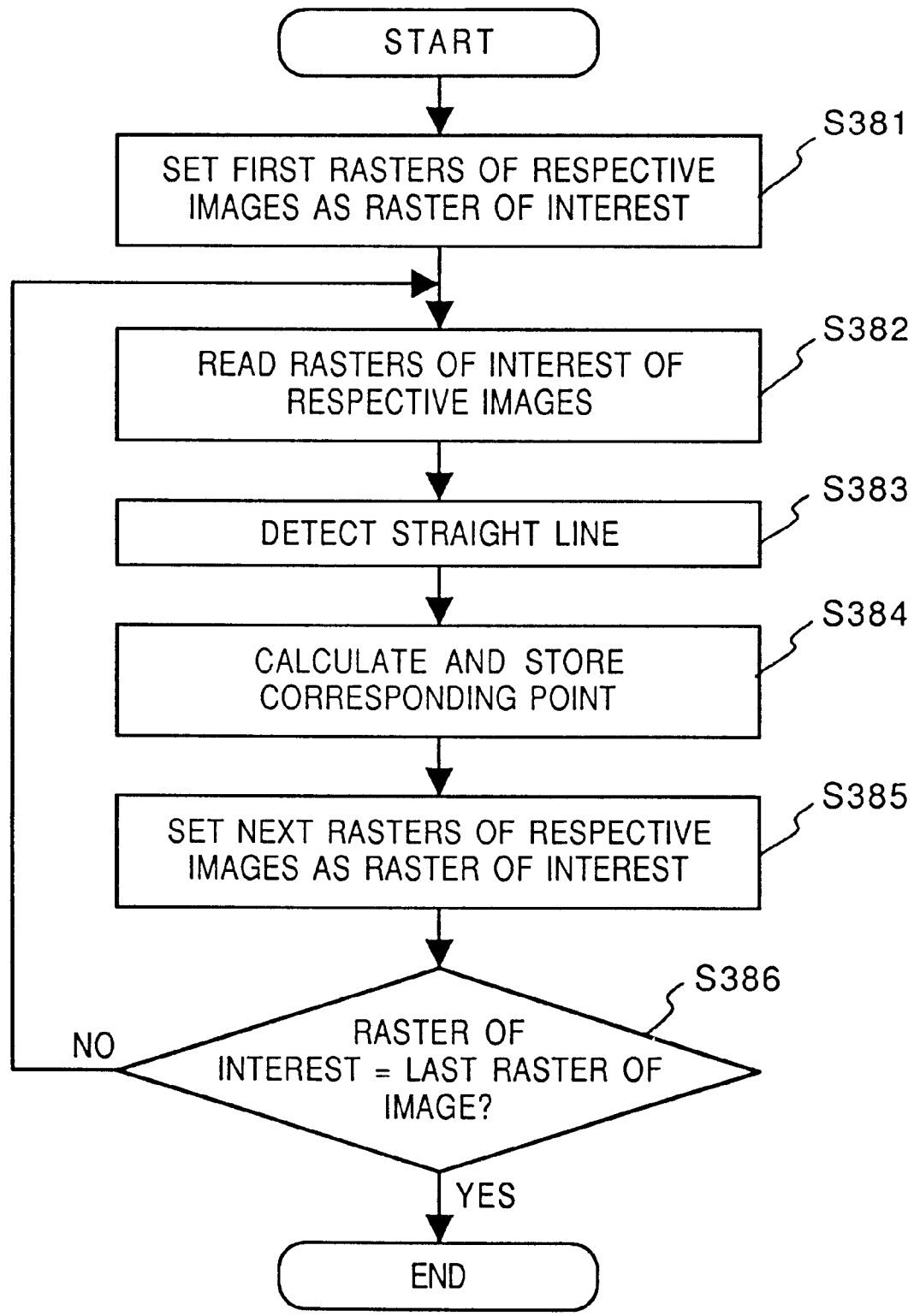
FIG. 38 is a flow chart showing corresponding point searching processing by the image processing apparatus of the sixth embodiment.

FIG. 38 is a flow chart showing the corresponding point searching processing in step S372.

Figure 39:
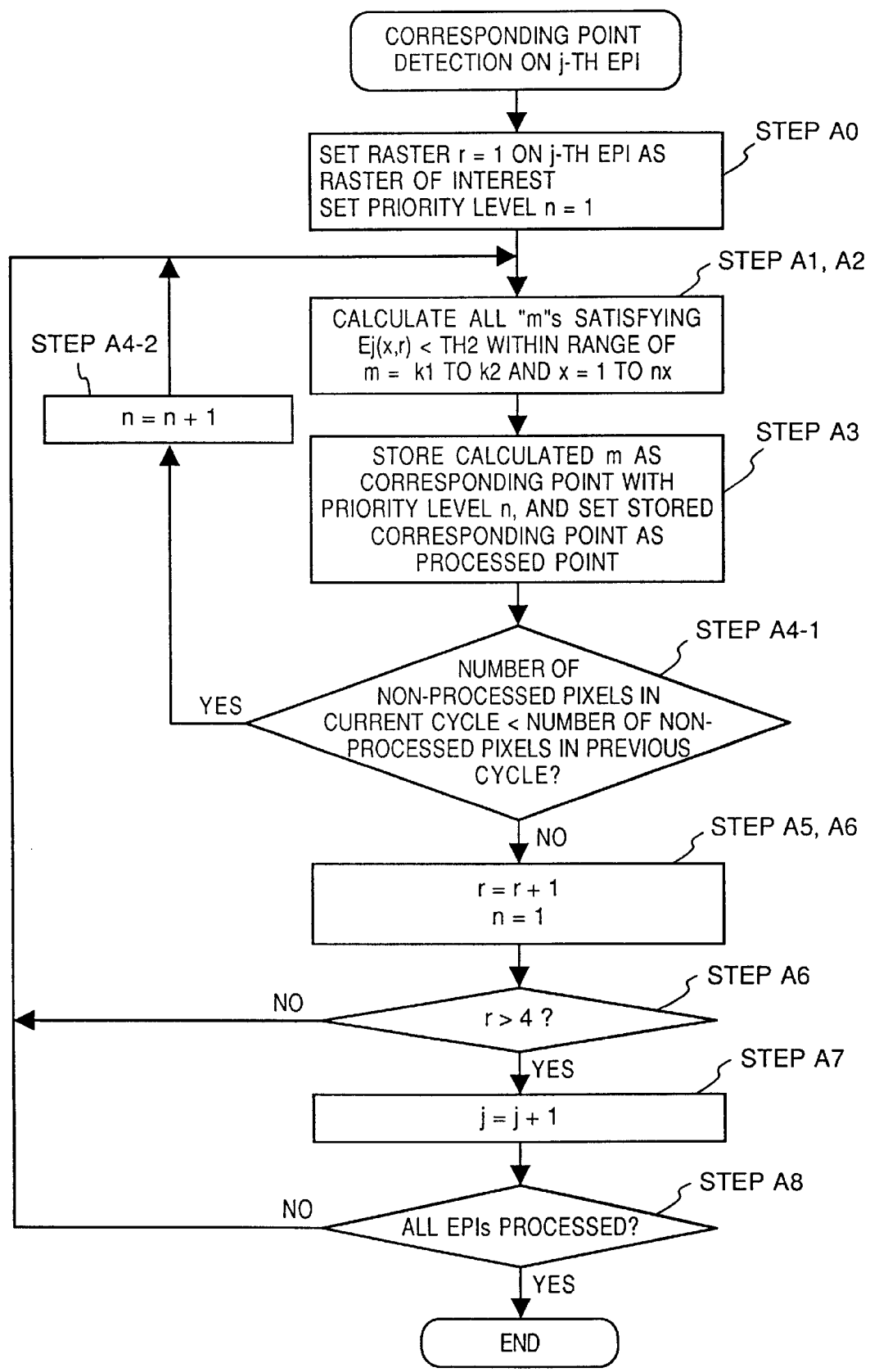
FIG. 39 is a flow chart showing the corresponding point searching processing by the image processing apparatus of the sixth embodiment.

In step S381, the first raster of each image is initially set to be the raster of interest. In step S382, the rasters of interest of the respective images are read out onto a work memory to virtually constitute a j-th epipolar plane. The j-th epipolar plane is a set of points EPj(x,i) on an image plane, as shown in FIG. 4, which satisfy:

$$EPj(x,i) = Ni(x,j)$$

where Ni(x,j) represents an x-th pixel value on a j-th line of an i-th image (i=1 to 4 in this embodiment), i.e., the value of a pixel whose coordinates are expressed by (x,j) in the i-th image. When input devices (cameras) are set parallel to each other at equal intervals, all the corresponding points on the epipolar plane image align on straight lines. Therefore, image interpolation can be performed on the straight lines. In step S383, straight lines on which corresponding points are present are extracted. In step S384, the corresponding points are calculated from the extracted straight lines, and the calculated points are stored. The above-mentioned processing is repeated for all the rasters in steps S385 and S386. FIG. 39 shows the detailed algorithm of the corresponding point detection on the j-th EPI.

(Step A0)

A raster r=1 is set as the raster of interest and a priority level n=1 is set.

(Step A1)

The pixel of interest is represented by EPj(x,r), and all "m"s which satisfy the following formula within a range of m=0 to k1 are calculated:

$$Ej(x, r) = \sum_{i=r+1}^{4} \{EPj(x + m \times (i - r), i) - Epj(x, r)\}^2 < TH2$$

for r=1. TH2 is a threshold value for finding the corresponding points, and is set in correspondence with an allowable error amount between corresponding pixels. In this embodiment, TH2=1200 (=3×20×20) is set. On the other hand, k1 is a value determined by the camera interval and the distance to an object, and is set to be 20 (i.e., assume that a movement exceeding 20 pixels is not made) in this embodiment.

(Step A2)

Step A1 is repeated for all "x"s within a range of x=1 to nx, and all the values m corresponding to the values x are held.

Note that nx is the number of pixels, in the main scanning direction, of an image. If EPj(x+m×(i−r),i) is not present, it is determined that no corresponding point for this m is present, and the processing is continued.

(Step A3)

A corresponding point with priority level 1 is obtained from the straight line with the inclination m obtained in steps A1 and A2, and is stored in the memory. If a plurality of corresponding points are obtained, all the points are stored as corresponding points of priority level 1 for the sake of simplicity. Pixels obtained as the corresponding points are set to be processed pixels.

(Step A4)

A cycle of steps A1, A2, and A3 is repeated for non-processed pixels. If EPj(x+m×(i−r), i) has already been processed in step A1, EPj(x+m×(i−r), i)−EPj(x,r)=0 is set, and the processing is continued. If the corresponding point calculated based on the straight line of the inclination m in step A3 has already been processed, this point is excluded from the corresponding points. Corresponding points obtained in the n-th cycle are stored as those of the priority level n.

(Step A5)

If the number of non-processed pixels ceases to decrease even after the processing in step A4, r=2 is set, the pixel of interest is represented by EPj(x,r), and the same processing as in steps A1 to A4 is performed. Note that x=1 to nx.

(Step A6)

If the number of non-processed pixels ceases to decrease even after the processing in step A5, r=3 is set, the pixel of interest is represented by EPj(x,r), and the same processing as in steps A1 to A4 is performed. Note that x=1 to nx. Also, the same processing is performed for r=4.

(Step A7)

The value j is incremented by one, and the flow returns to step A1. More specifically, processing starting from step A1 is repeated for the next raster line.

(Step A8)

If the processing is completed up to the last raster, the corresponding point searching processing ends.

With the above-mentioned processing, corresponding points, which cannot be obtained from two images, can be obtained, and occlusion or the like also taken into account, thus improving accuracy of corresponding point searching processing.

Upon completion of the processing in step S372, the flow advances to step S373 to perform image interpolation processing. The image interpolation processing is performed using the corresponding points calculated in step S372. The detailed algorithm is described below while taking FIG. 40 as an example.

Figure 40:
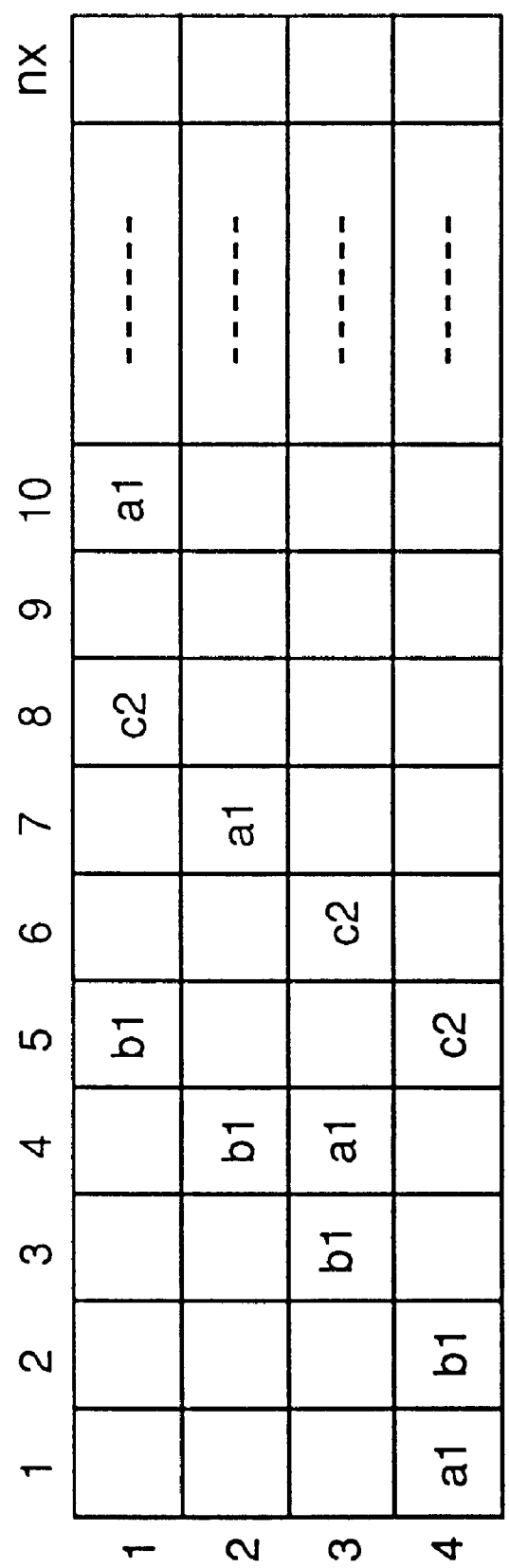
FIG. 40 is a view for explaining an interpolation processing algorithm by the corresponding point searching processing by the image processing apparatus of the sixth embodiment.
Figure 42:
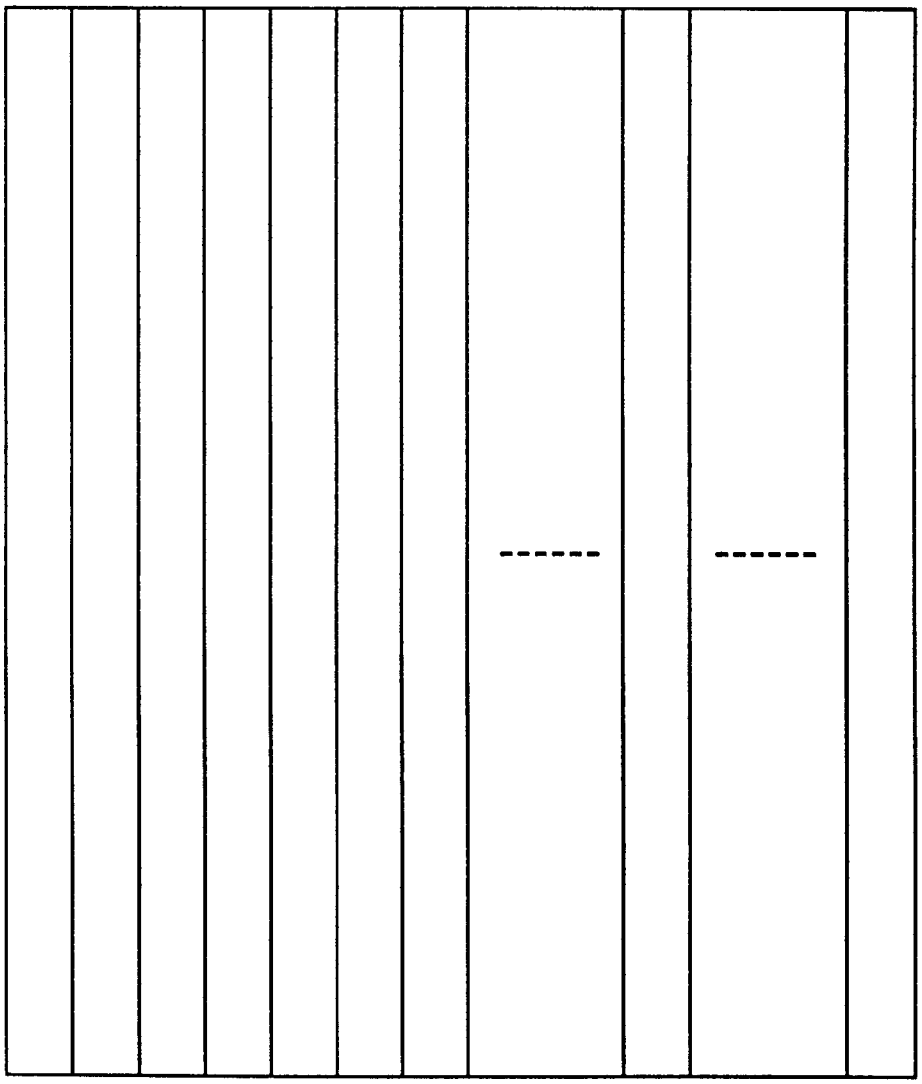
FIG. 42 is a view for explaining the interpolation processing algorithm by the corresponding point searching processing by the image processing apparatus of the sixth embodiment.
Figure 43:
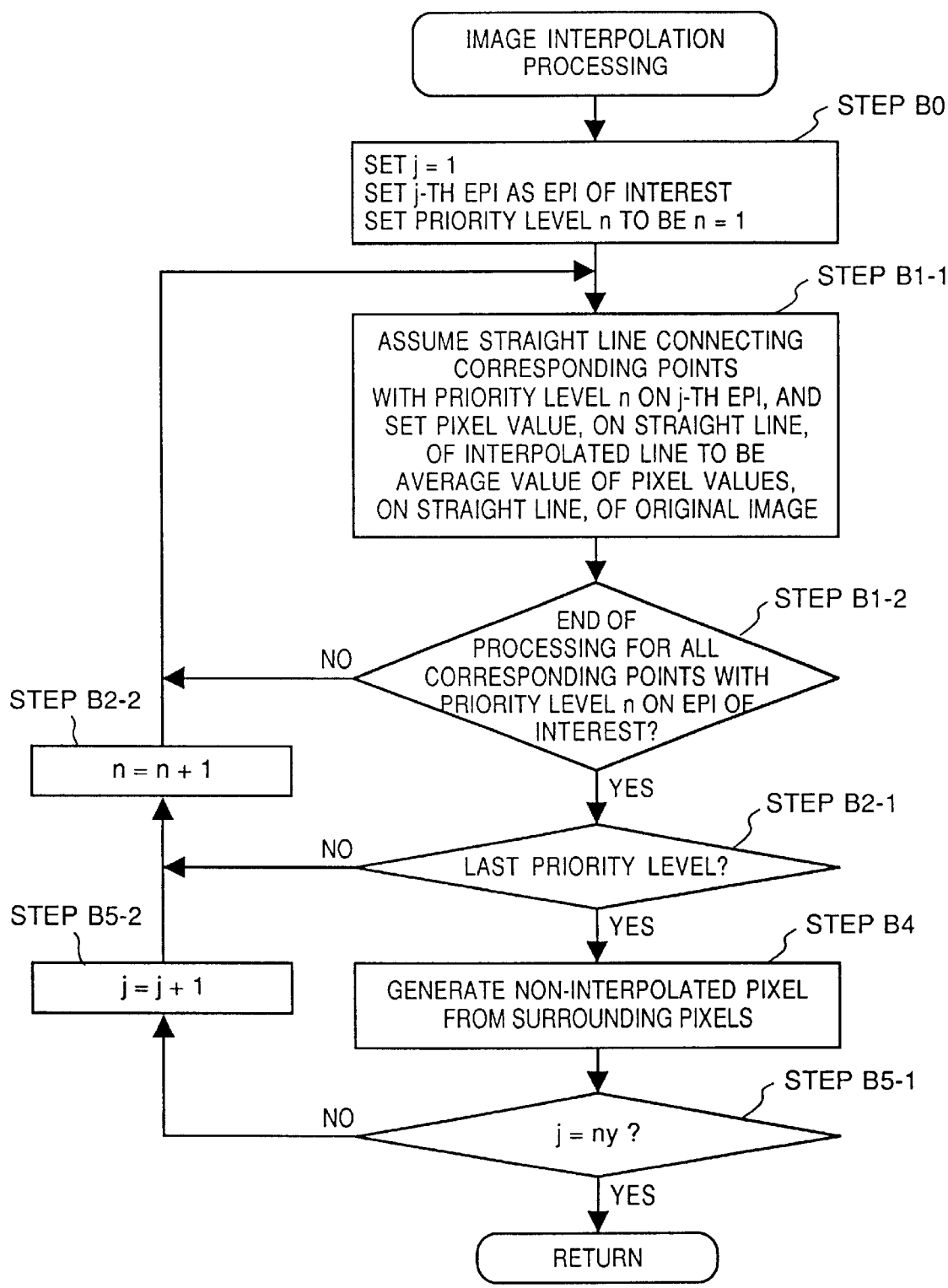
FIG. 43 is a flow chart showing interpolation processing by the image processing apparatus of the sixth embodiment.

FIG. 40 shows the j-th epipolar plane. a1 and b1 represent the corresponding points of priority level 1, and c2 represents corresponding points of priority level 2. A case is examined below wherein n images are interpolated at equal intervals between input images. For the sake of simplicity, n=2. When such interpolation is to be performed on the j-th epipolar plane, as shown in FIG. 41, two lines are interpolated between each two adjacent lines of the epipolar plane, and the pixel values of the interpolated lines, which are present on straight lines connecting the corresponding points on the original epipolar plane, are set to be an average value of the corresponding points. More specifically, the algorithm is as shown in FIG. 43.

(Step B0)

j=1 is set, i.e., the j-th EPI is set as an EPI of interest.

(Step B1)

A straight line connecting the corresponding points of the priority level 1 on the j-th EPI is assumed, and the pixel values of interpolated lines, which are present on this straight line, are set to be an average value of pixel values on the original images present on the straight line. When the corresponding point a1 shown in FIG. 41 are taken as an example, the pixel value of point a on the straight line connecting the corresponding point is set to be an average value of the pixel value of the point a1.

With concerning to an intersecting point on straight lines which connect the corresponding points having the same priority levels, the point is interpolated based on a line having the most moderate slope.

(Step B2)

Upon completion of the processing for the corresponding point with priority level 1, processing for corresponding points with priority level 2 is performed. This processing is basically the same as that in step B1. However, pixels which have already been interpolated in step B1 are not processed. This processing is described below with reference to FIG. 41. Pixels (3, 8) and (2, 9) are normally interpolated by the corresponding points c2. However, since these points have already been interpolated by the corresponding points a1 with priority level 1, no processing is performed for pixels (3, 8) and (2, 9). Therefore, pixels interpolated by the corresponding points b2 are four pixels (5, 2), (4, 3), (4, 5), and (3, 6). In the example shown in FIG. 41, occlusion occurs on this portion. However, the above processing can solve the problem of occlusion.

(Step B3)

Upon completion of the processing for the corresponding points with priority level 2, processing for corresponding points with priority level 3 is performed. As in step B2, already interpolated pixels are not processed. Similarly, processing is performed up to corresponding points with the last priority level.

(Step B4)

Pixels which are not interpolated after the processing in steps B1 to B3 are interpolated based on surrounding pixels. As a method to be used in this case, a method using an average value of surrounding pixels, a method of directly using the value of a pixel closest to the pixel of interest, and the like are available.

(Step B5)

The processing in steps B1 to B4 is performed for j=1 to ny, and interpolated images are obtained using j2, j3, j5, j6, j8, and j9. Note that the lines interpolated by the above processing in steps B1 to B4 are represented by j2, j3, j5, j6, j8, and j9, as shown in FIG. 41. For example, interpolated image 2 can be constituted by juxtaposing interpolated lines j2 (j=1 to ny) (see FIG. 42). The same applies to interpolated images 3, 5, 6, 8, and 9.

Since interpolated images are generated based on images in the image database 2603, as described above, an image from a viewpoint other than the photographing viewpoints on the straight line including the viewpoint array is obtained. Thus, an image from an arbitrary viewpoint is generated. Therefore, the image database 2603 need not store multi-viewpoint images with sufficiently fine viewpoint intervals, and the storage capacity of the image database 2603 is greatly reduced.

When the interpolation processing is performed by the method of each of the first to fourth embodiments, clear interpolated images are obtained.

[Seventh Embodiment]

In the fifth and sixth embodiments, in order to calculate the degree of distortion in the distortion correction unit 3102, the image parameter holding unit 2606 must hold the value of a rough distance to the point of interest (or the in-focus point) on the photographed object as the distance Td. This embodiment develops the image processing apparatus of the sixth embodiment, and an image processing apparatus which can automatically discriminate the value of the degree of distortion in the distortion correction unit 3102 is explained. The arrangement of the image processing apparatus of this embodiment is substantially the same as that shown in FIG. 36.

In this embodiment, the distortion correction unit 3102 automatically discriminates the degree of distortion in cooperation with the interpolation processing unit 2617. The interpolation correction unit 2617 supplies, to the distortion correction unit 3102, the inclination m of the straight line extracted in the straight line detection processing (step S783 in FIG. 38) in the corresponding point searching processing (step S372 in FIG. 37). The distortion correction unit 3102 calculates, based on the inclination m of the straight line, a distance Tdi from the camera to the detected corresponding point (spot of an object) using formula (21) below:

$$Tdi = W \cdot A / (2 \cdot m \cdot \tan(\theta/2)) \tag{21}$$

where W is the width (in units of pixels) of an image, and θ is the field angle of the camera, which are held in the image parameter holding unit 2606. In addition, A is the viewpoint interval of images stored in the image database 2603, which interval is held in the viewpoint array holding unit 2605.

Figure 44:
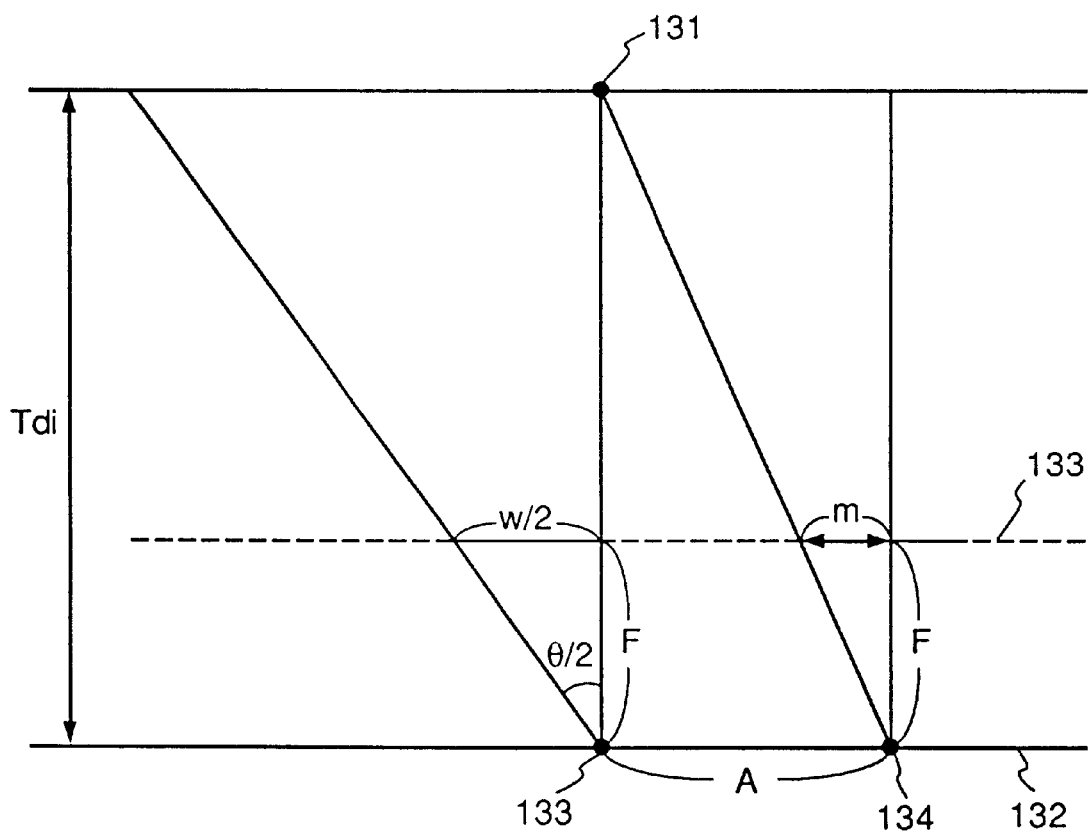
FIG. 44 is a view for explaining the principle for calculating the distance to an object by an image processing apparatus according to the seventh embodiment of the present invention.

Formula (21) is apparent from FIG. 44. A case will be examined below wherein a single object 131 is viewed from two viewpoints 133 and 134 on a viewpoint array straight line 132, which are separated by the distance A. The relationship among the field angle θ, the focal length F, a pixel size S, and the width W of an image is given by:

$$S \cdot W/2 = F \cdot tan(\theta/2)$$

On the other hand, the inclination m of the detected straight line is a value representing the deviation amount between corresponding points of interest on two adjacent images by the number of pixels. Therefore, FIG. 44 also provides:

$$Tdi/A = F/(m \cdot S\text{(capital letter)})$$

As can be understood from these two relationships, formula (21) is established.

Then, the distortion correction unit 3102 calculates a degree ki of distortion of each corresponding point using formula (22) below on the basis of formula (20):

$$Ki = Tdi/(Tdi - z) \tag{22}$$

In place of formula (20), an average value of the values ki of all the corresponding points in an image is estimated and calculated as a degree k of distortion.

With the above-mentioned processing, in this embodiment, the distance between the camera and object need not be detected in advance, thus providing an effect unique to this embodiment.

As the calculation method of the estimated degree k of distortion, a method of performing the above-mentioned calculation after an average value of inclinations m is calculated, a method of performing the calculation after an image is weighted in units of regions to estimate an object as the center, and the like are available in addition to the above-mentioned method.

In each of the above embodiments, multi-viewpoint images which are photographed in advance are held in the image database 2603. When the image database is replaced by a multi-eye television camera which fetches multi-viewpoint images in real time, an arbitrary viewpoint image real-time photographing/display system is realized.

Note that the present invention may be applied to a stand-alone type image processing apparatus, a system such as a multi-viewpoint television system, a multi-viewpoint video telephone terminal, a multi-viewpoint video meeting system, and the like, or a composite apparatus as a combination of a computer and another image processing apparatus.

Since the image processing apparatus of each of the above embodiments detects the position of the eye of an observer and re-constructs an image viewed from the observer on the basis of a plurality of images, it smoothly output an image corresponding to not only right-and-left movement but also back-and-forth movement of the viewpoint of the observer.

As multi-viewpoint image data including a plurality of images with different viewpoint positions, a large number of images obtained from at least one camera, and a large number of images stored in a database are used. In order to re-construct an image, the multi-viewpoint image data preferably include images whose photographing positions are changed at sufficiently fine intervals. However, even when the multi-viewpoint image data include images whose photographing position intervals are coarse, an image having a desired position between two adjacent photographing positions as a viewpoint position can be generated by interpolating photographed images, and an image can be re-constructed using the photographed images and generated images as multi-viewpoint image data.

Furthermore, an image is re-constructed in such a manner that parameters required for re-constructing an image are calculated on the basis of the eye position of an observer and the type of an image output apparatus, corresponding pixels between an image to be re-constructed and multi-viewpoint images are calculated on the basis of the calculated parameters, and the corresponding pixels are extracted from the multi-viewpoint images. In this case, even when the eye position of the observer does not match any of viewpoint positions of photographed images, corresponding pixels is calculated, and hence, an image can be re-constructed satisfactorily.

As an image output apparatus, a stereoscopic display, a lenticular display, and the like is used in addition to a normal display.

As described above, the image processing method and apparatus according to the present invention provides an effect of displaying an image in correspondence with movement of the eye position of an observer in directions including the back-and-forth direction.

The present invention is not limited to the above embodiments and various changes and modifications can be made within the spirit and scope of the present invention. Therefore, to apprise the public of the scope of the present invention the following claims are made.

What is claimed is:

1. An image processing method comprising:
   a detection step, of detecting correspondences of pixels among multi-viewpoint images;
   a first generation step, of generating pixels constituting an interpolated image on a basis of the detected correspondences;
   a construction step, of constructing the interpolated image on a basis of the pixels generated in the first generation step;
   an estimation step, of estimating correspondences of non-processed pixels, from which correspondences cannot be detected in the detection step, among the multi-viewpoint images on the basis of the interpolated images; and
   a second generation step, of further generating pixels constituting the interpolated image on a basis of the correspondences estimated in the estimation step,
   wherein the estimation step includes detecting a line segment consisting of pixels having a value closest to a value of the non-processed pixels from line segments passing the non-processed pixel on an epipolar plane image constituted by the multi-viewpoint images, and the second generation step includes setting an average value of the pixels constituting the line segment to be the value of the non-processed pixels.

2. The method according to claim 1, wherein the estimation step includes detecting, from line segments each having a length of five pixels and having a non-processed pixel as a center, a line segment which has a minimum sum of differences between pixels constituting the line segment and the non-processed pixel.

3. The method according to claim 1, wherein the detection step includes the step of generating an epipolar plane image from the multi-viewpoint images, and detecting pixels constituting a linear image passing a pixel of interest on the epipolar plane image, and the first generation step includes the step of inserting an interpolated line between each two adjacent lines of the epipolar plane image, and assigning, to a pixel located at an intersecting point between a straight line connecting pixels detected in the detection step, and the interpolated line, an average value of the linear image passing the pixel.

4. The method according to claim 3, wherein the detection step includes the step of detecting a straight line passing the pixel of interest as the linear image when a pixel with a value which has a square of a difference from a value of the pixel of interest falling within a predetermined value is present on the straight line.

5. The method according to claim 4, wherein the detection step includes the step of detecting the linear image while increasing the predetermined value stepwise.

6. The method according to claim 3, wherein the detection step includes the step of storing pixels together with priority levels corresponding to a detection order of the pixels when the pixels constituting the linear image are detected, and the first generation step includes the step of generating pixels constituting the interpolated image in the order from pixels with lower priority levels.

7. An image processing apparatus comprising:

detection means for detecting correspondences of pixels among multi-viewpoint images;

first generation means for generating pixels constituting an interpolated image on a basis of the detected correspondences;

construction means for constructing the interpolated image on a basis of the pixels generated by said first generation means;

estimation means for estimating correspondences of non-processed pixels, from which correspondences cannot be detected by said detection means, among the multi-viewpoint images by interpolating on the basis of an epipolar plane; and second generation means for further generating pixels constituting the interpolated image on a basis of the correspondences estimated by said estimation means, wherein said estimation means detects a line segment consisting of pixel having a value closest to a value of a non-processed pixel from line segments passing the non-processed pixel on an epipolar plane image constituted by the multi-viewpoint images, and said second generation means sets an average value of the pixels constituting the line segment to be the value of the non-processed pixel.

8. The apparatus according to claim 7, wherein said estimation means detects, from line segments each having a length of five pixels and having a non-processed pixel as a center, a line segment which has a minimum sum of differences between pixels constituting the line segment and the non-processed pixel.

9. The apparatus according to claim 7, wherein said detection means generates an epipolar plane image from the multi-'viewpoint images, and detects pixels constituting a linear image passing a pixel of interest on the epipolar plane image, and said first generation means inserts an interpolated line between each two adjacent lines of the epipolar plane image, and assigns, to a pixel located at an intersecting point between a straight line connecting pixels detected by said detection means, and the interpolated line, an average value of the linear image passing the pixel.

10. The apparatus according to claim 9, wherein said detection means detects a straight line passing the pixel of interest as the linear image when a pixel with a value which has a square of a difference from a value of the pixel of interest falling within a predetermined value is present on the straight line.

11. The apparatus according to claim 10, wherein said detection means detects the linear image while increasing the predetermined value stepwise.

12. The apparatus according to claim 9, wherein said detection means stores pixels together with priority levels corresponding to a detection order of the pixels when the pixels constituting the linear image are detected, and said first generation means generates pixels constituting the interpolated image in the order from pixels with lower priority levels.

13. The apparatus according to claim 7, further comprising an image database for storing the multi-images.

* * * * *

UNITED STATES PATENT AND TRADEMARK OFFICE
CERTIFICATE OF CORRECTION

PATENT NO.    : 6,628,820 B2
DATED         : September 30, 2003
INVENTOR(S)   : Takahiro Oshino et al.

It is certified that error appears in the above-identified patent and that said Letters Patent is hereby corrected as shown below:

Title page,
Item [57], ABSTRACT, please insert:
   -- A method and apparatus for processing an image that includes detecting correspondences of pixels among multi-viewpoint images, and first generating pixels constituting an interpolated image on the basis of the detected correspondences, constructing the interpolated image on the basis of the pixels generated, estimating correspondences of non-processed pixels, from which correspondences cannot be detected, among the multi-viewpoint images on the basis of the interpolated images, and further generating pixels constituting the interpolated image on the basis of the correspondences estimated. The estimation includes detecting a line segment consisting of pixels having a value closest to a value of the non-processed pixels from the line segments passing the non-processed pixel on an epipolar plane image constituted by the multi-viewpoint images. Further as part of generating pixels constituting the interpolated image on the basis of the correspondences estimated, an average value of the pixels constituting the line segment is set to be the value of the non-processed pixels. --.

Drawings,
Sheet 19, Figure 18, "SERCHING" should read -- SEARCHING --.
Sheet 22, Figure 21, "PONT" should read -- POINT --.
Sheet 29, Figure 28, "PAPRAMETER" should read -- PARAMETER --.
Sheet 45, Figure 45, "RE-CONSTRUCITON" should read -- RE-CONSTRUCTION --.

Column 3,
Line 8, "images" should read -- image --.

Column 6,
Line 15, "A Position" should read -- ¶A Position --.

Column 7,
Line 53, "calorimetric" should read -- colorimetric --; and
Line 61, "direction," should read -- direction --.

UNITED STATES PATENT AND TRADEMARK OFFICE
CERTIFICATE OF CORRECTION

PATENT NO.    : 6,628,820 B2
DATED         : September 30, 2003
INVENTOR(S)   : Takahiro Oshino et al.

It is certified that error appears in the above-identified patent and that said Letters Patent is hereby corrected as shown below:

Column 8,
Line 37, "n P," should read -- n=P, --.

Column 9,
Line 51, "J-th" should read -- j-th --.

Column 12,
Line 12, "precessing" should read -- processing --.

Column 13,
Line 4, "images" should read -- image --;
Line 11, "by" should read -- by the --;
Line 29, "pi" should read --p 1 --; and
Line 54, "s181," should read -- S 181, --.

Column 14,
Line 25, "x+m+(i-r)." should read -- x+mx(i-r). --.

Column 21,
Line 27, "$XP' = x + f = i'\cdot p$" should read -- $XP' = x + f = i \cdot p'$ --.

Column 22,
Line 30, "head-mounted" should read -- head-mounted --.

Column 25,
Line 16, "described" should read -- is described --.

Column 27,
Line 42, "and a" should read -- and α --.

Column 28,
Line 41, "where k" should read -- where K --.

UNITED STATES PATENT AND TRADEMARK OFFICE
CERTIFICATE OF CORRECTION

PATENT NO. : 6,628,820 B2
DATED : September 30, 2003
INVENTOR(S) : Takahiro Oshino et al.

It is certified that error appears in the above-identified patent and that said Letters Patent is hereby corrected as shown below:

Column 30,
Line 23, "$Epj(x, r)\}^2$" should read -- $EPj(x, r)\}^2$ --.

Column 36,
Line 15, "multi-'viewpoint" should read -- multi-viewpoint --.

Signed and Sealed this

Twenty-seventh Day of July, 2004

JON W. DUDAS
*Acting Director of the United States Patent and Trademark Office*